(12) United States Patent
Yokoyama et al.

(10) Patent No.: US 11,941,177 B2
(45) Date of Patent: Mar. 26, 2024

(54) INFORMATION PROCESSING DEVICE AND INFORMATION PROCESSING TERMINAL

(71) Applicant: SONY GROUP CORPORATION, Tokyo (JP)

(72) Inventors: Ryo Yokoyama, Tokyo (JP); Takeshi Ogita, Kanagawa (JP); Osamu Ito, Tokyo (JP); Yohei Fukuma, Chiba (JP); Ayumi Nakagawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 139 days.

(21) Appl. No.: 17/619,141

(22) PCT Filed: Jan. 15, 2021

(86) PCT No.: PCT/JP2021/001365
§ 371 (c)(1),
(2) Date: Dec. 14, 2021

(87) PCT Pub. No.: WO2021/145452
PCT Pub. Date: Jul. 22, 2021

(65) Prior Publication Data
US 2023/0152891 A1    May 18, 2023

Related U.S. Application Data

(63) Continuation-in-part of application No. PCT/JP2020/035882, filed on Sep. 23, 2020.
(Continued)

(30) Foreign Application Priority Data
Sep. 23, 2020    (WO) .................. PCT/JP2020/035882

(51) Int. Cl.
*G06F 3/16*    (2006.01)
*G06F 3/01*    (2006.01)
(Continued)

(52) U.S. Cl.
CPC .............. *G06F 3/016* (2013.01); *G06F 3/011* (2013.01); *G06F 3/0484* (2013.01); *G06F 3/14* (2013.01)

(58) Field of Classification Search
CPC ........................................................ G06F 3/016
(Continued)

(56) References Cited

U.S. PATENT DOCUMENTS

| 11,600,383 B2 * | 3/2023 | Wersland ............. G06Q 20/326 |
| 2010/0016990 A1 * | 1/2010 | Kurtz ........................ A61F 2/58 623/24 |

(Continued)

FOREIGN PATENT DOCUMENTS

| CN | 102262476 A | 11/2011 |
| CN | 104922899 A | 9/2015 |

(Continued)

*Primary Examiner* — Ruay Ho
(74) *Attorney, Agent, or Firm* — Paratus Law Group, PLLC

(57) ABSTRACT

An information processing device is provided which includes a first acquisition unit (214) configured to acquire a control command, inputted by a first user, including positional information for designating a presentation position at which to present a tactile stimulus by a tactile presentation device and mode information for designating a mode of the tactile stimulus, a generation unit (218) configured to generate a tactile control signal for presenting the tactile stimulus to the presentation position in response to the control command, and a first distribution unit (222) configured to distribute the tactile control signal to the tactile presentation device worn on a body of a second user, in which the first distribution unit distributes, according to a predetermined rule, the tactile control signal related to the control command inputted by each of a plurality of the first users to the tactile presentation device.

15 Claims, 36 Drawing Sheets

Related U.S. Application Data

(60) Provisional application No. 62/962,353, filed on Jan. 17, 2020.

(51) Int. Cl.
*G06F 3/0484* (2022.01)
*G06F 3/14* (2006.01)

(58) Field of Classification Search
USPC .................................. 715/702; 623/24; 482/8
See application file for complete search history.

(56) References Cited

U.S. PATENT DOCUMENTS

| | | | | |
|---|---|---|---|---|
| 2015/0190669 A1* | 7/2015 | Matsuura | ............ | A63B 21/4039 |
| | | | | 482/8 |
| 2017/0109980 A1* | 4/2017 | Engels | .................... | G01C 21/20 |
| 2019/0220039 A1* | 7/2019 | Wu | ......................... | B64D 47/08 |

FOREIGN PATENT DOCUMENTS

| | | | |
|---|---|---|---|
| CN | 105278746 | A | 1/2016 |
| CN | 105981003 | A | 9/2016 |
| CN | 107430440 | A | 12/2017 |
| JP | 2005-328270 | A | 11/2005 |
| JP | 2017-509935 | A | 4/2017 |
| JP | 2019-003708 | A | 1/2019 |
| JP | 2019-144629 | A | 8/2019 |
| WO | WO 2018/008217 | A1 | 1/2018 |
| WO | WO 2018/012062 | A1 | 1/2018 |
| WO | WO 2019/229936 | A1 | 12/2019 |

\* cited by examiner

INFORMATION PROCESSING DEVICE AND INFORMATION PROCESSING TERMINAL

CROSS REFERENCE TO PRIOR APPLICATION

This application is a National Stage Patent Application of PCT International Patent Application No. PCT/JP2021/001365 (filed on Jan. 15, 2021) under 35 U.S.C. § 371, which is a continuation-in-part of PCT International Patent Application No. PCT/JP2020/035882 (filed on Sep. 23, 2020), which claims priority to U.S. Provisional Patent Application No. 62/962,353 (filed on Jan. 17, 2020), which are all hereby incorporated by reference in their entirety.

FIELD

The present disclosure relates to an information processing device and an information processing terminal.

BACKGROUND

In recent years, consumers' consumption activities have shifted from "material consumption", which is mere purchase of goods, to "experiential consumption" in which consumers pay for value-added experiences. For example, in the field of entertainment such as music and animations, consumers are demanding higher value-added experiences that are real-time and interactive, such as interactions between artists and fans, in addition to unidirectional experiences such as watching live performances by artists and so on.

Examples of this kind of experience include transmission of data such as illustrations and text to an artist or the like who distributes content on the Internet from viewers of the content, and "social tipping" of sending money along with the data transmission. The artist and the viewers communicate with each other via such "social tipping", which provides higher value-added experiences to the viewers. This increases the viewers' satisfaction with the content and increases their appetite for purchasing such "experiences".

CITATION LIST

Patent Literature

Patent Literature 1: WO 2018/008217 A

SUMMARY

Technical Problem

Meanwhile, devices for presenting tactile stimuli such as vibrations to users have conventionally been proposed. Examples of such devices include a jacket-type tactile presentation device described in Patent Literature 1 above. A user wears such a tactile presentation device in movie theaters, theme park attractions, and so on, and the tactile presentation device is controlled to synchronize with reproduction content viewed by the user, which increases the realistic sensation of the reproduction content provided.

Accordingly, the present disclosure proposes an information processing device and an information processing terminal that use such a tactile presentation device to provide viewers with real-time, interactive, and value-added experiences.

Solution to Problem

According to the present disclosure, an information processing device is provided. The information processing device includes: a first acquisition unit configured to acquire a control command, inputted by a first user, including positional information for designating a presentation position at which to present a tactile stimulus by a tactile presentation device and mode information for designating a mode of the tactile stimulus; a generation unit configured to generate a tactile control signal for presenting the tactile stimulus to the presentation position in response to the control command; and a first distribution unit configured to distribute the tactile control signal to the tactile presentation device worn on a body of a second user. In the information processing device, the first distribution unit distributes, according to a predetermined rule, the tactile control signal related to the control command inputted by each of a plurality of the first users to the tactile presentation device.

Also, according to the present disclosure, an information processing terminal is provided. The information processing terminal includes: an input unit configured to receive an input of a control command including positional information for designating a presentation position at which to present a tactile stimulus by a tactile presentation device and mode information for designating a mode of the tactile stimulus; and a transmission unit configured to send the control command inputted to an information processing device that generates a tactile control signal according to the control command and distributes the tactile control signal to the tactile presentation device.

DESCRIPTION OF EMBODIMENTS

Figure 1:
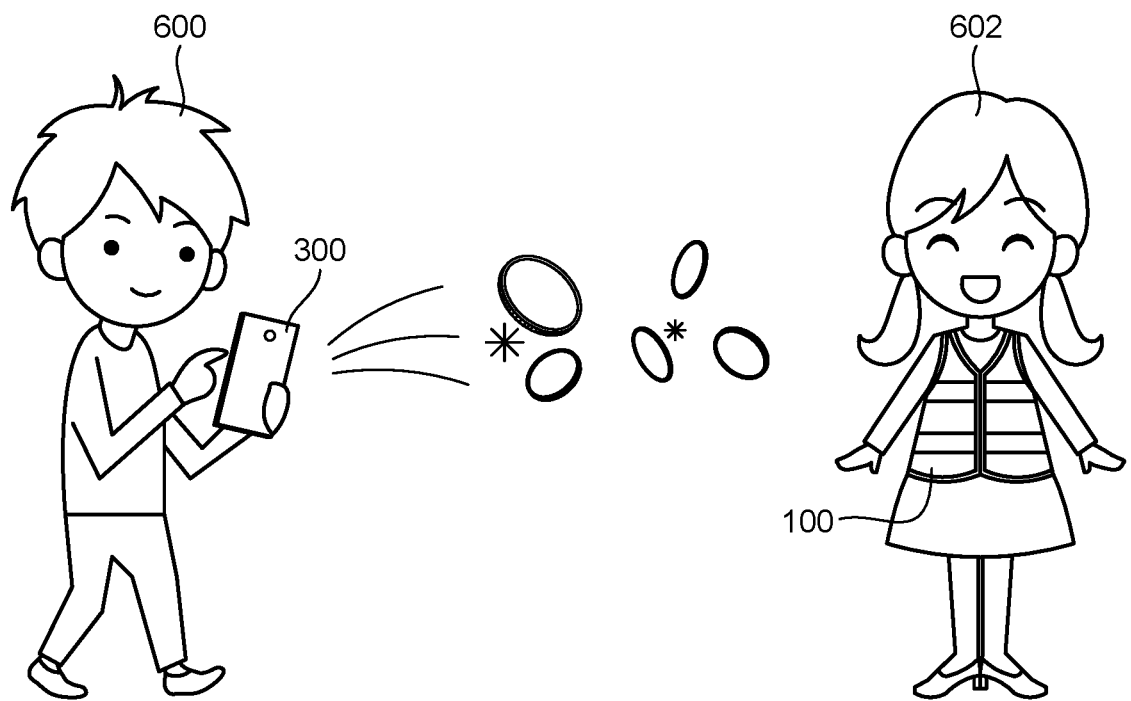
FIG. 1 is an explanatory diagram (No. 1) for explaining an outline of an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted. Furthermore, in this specification and the drawings, similar constituent elements in different embodiments are sometimes distinguished by adding different alphabets after the same reference numerals. However, in a case where it is not necessary to particularly distinguish the similar constituent elements from one another, only the same reference numerals are given.

Figure 2:
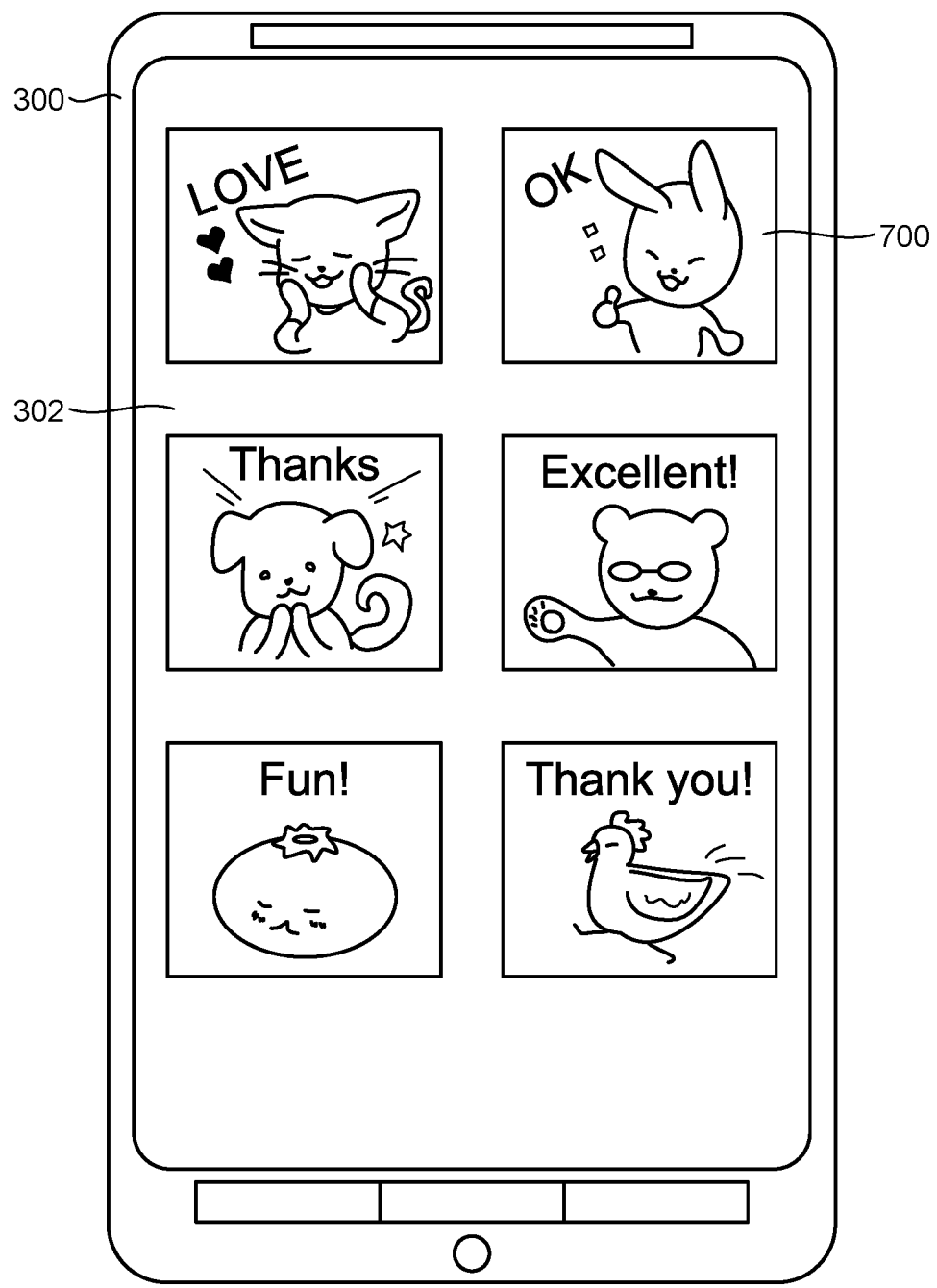
FIG. 2 is an explanatory diagram (No. 2) for explaining an outline of an embodiment of the present disclosure.

The descriptions are given in the following order.
1. Outline of embodiment of present disclosure
2. First Embodiment
 2.1 Outline of information processing system 10
 2.2 Detailed configuration of tactile presentation device 100
 2.3 Detailed configuration of server 200
 2.3 Detailed configuration of user terminal 300
 2.4 Information processing method
 2.5 Modification example
3. Second Embodiment
4. Third Embodiment
5. Fourth Embodiment
 5.1 Detailed configuration of server 200a
 5.2 Information processing method
 5.3 Example
6. Fifth Embodiment
7. Sixth Embodiment
 7.1 Detailed configuration of server 200b
 7.2 Embodiment
 7.3 Modification example 1
 7.4 Modification example 2
 7.5 Modification example 3
8. Modification example to information processing system 10 of present disclosure
9. Summary
10. About hardware configuration
11. Supplements 1. Outline of Embodiment of Present Disclosure First, before the embodiments of the present disclosure are detailed, the outline of the embodiments of the present disclosure created by the present inventors are described with reference to FIGS. 1 and 2. FIGS. 1 and 2 are explanatory diagrams for explaining the outline of the embodiments of the present disclosure.

As described earlier, consumers' consumption activities have recently shifted from "material consumption" to "experiential consumption". In particular, in the field of entertainment, consumers are demanding higher value-added experiences that are real-time and interactive, such as interactions with artists, in addition to unidirectional experiences such as watching live performances by artists and so on.

Therefore, in light of such a situation, the inventors have been diligently studying the possibility of providing viewers with higher value-added experiences, and came up with the idea of using a tactile presentation device (haptic device) that presents tactile stimuli such as vibrations to a person who wears the device. According to the inventors' consideration, the use of such a tactile presentation device enables the viewers to obtain higher value-added experiences.

In embodiments of the present disclosure created on the basis of such an idea, as illustrated in FIG. 1, an artist 602 whose performance or content is to be watched or distributed wears, for example, a vest-type tactile presentation device 100. The tactile presentation device 100 includes a plurality of tactile stimulus units (for example, actuators or the like) therein. Furthermore, in response to a predetermined signal received, the tactile stimulus units can present tactile stimuli to the wearer. Then, as illustrated in FIG. 2, a viewer 600 selects one stamp 700 with tactile stimulus effect from the stamps 700 with tactile stimulus effect displayed on a display unit 302 of the user terminal 300 to send the selected stamp 700 with tactile stimulus effect; thereby, a predetermined tactile control signal corresponding to the tactile stimulus given to the stamp 700 is sent to the tactile stimulus unit (so-called "social tipping" with the tactile stimulus effect is made). Furthermore, the tactile stimulus unit presents, to the wearer, the tactile stimulus corresponding to the selected stamp 700 with tactile stimulus effect on the basis of the predetermined tactile control signal received. Therefore, if the artist 602 perceives the presented tactile stimulus and takes action, the viewer 600 can confirm, in real time, the action induced by the tactile stimulus presented by the stamp 700 that the viewer 600 has sent. Then, if the viewer 600 can confirm, in real time, the action induced by the tactile stimulus related to the stamp 700 that he/she has sent, then the viewer 600 can feel as if he/she directly interacts with the artist 602, that is, the viewer 600 can obtain a higher value-added experience.

As described above, in the embodiments of the present disclosure created by the inventors, the viewer 600 can send, to the artist 602, not only visual information such as illustrations, animations, and text and auditory information such as music, but also tactile information. Therefore, according to the embodiments of the present disclosure, it is possible to provide the viewer 600 with a real-time, interactive, and value-added experience, which increases his/her satisfaction with the performance and the content, and increases his/her appetite for purchasing such "experiences". The details of the embodiments of the present disclosure created by the inventors are sequentially described below.

2. First Embodiment

2.1 Outline of Information Processing System 10

Figure 3:
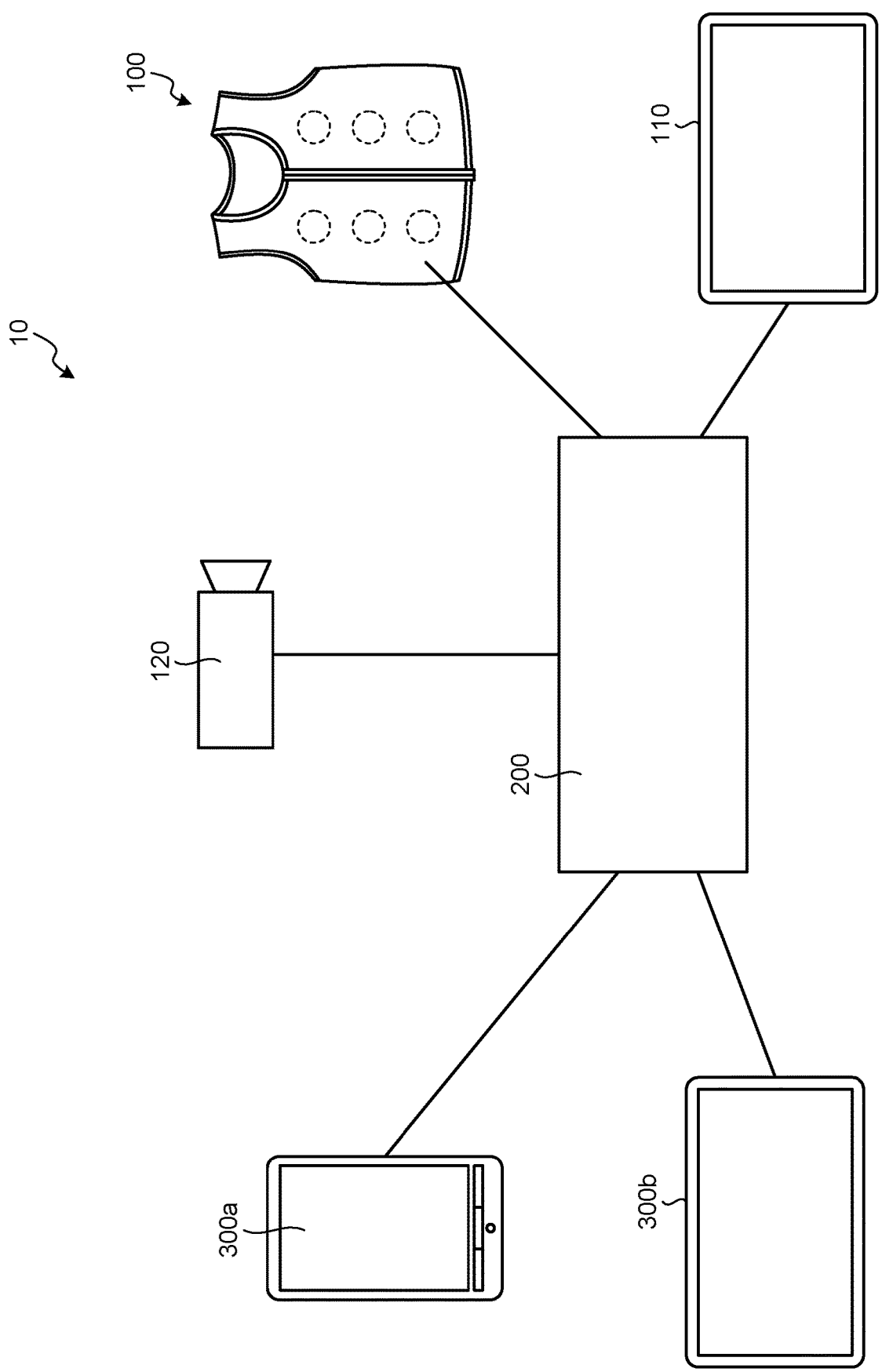
FIG. 3 is a system diagram illustrating an example of a schematic configuration of an information processing system 10 according to a first embodiment of the present disclosure.

First, the outline of the information processing system 10 according to the first embodiment of the present disclosure is described with reference to FIG. 3. FIG. 3 is a system diagram illustrating an example of a schematic configuration of an information processing system 10 according to the first embodiment of the present disclosure. In the following description, it is assumed that an artist (second user) 602 and a viewer (first user) 600 are present in different spaces or the same space. Specifically, in the information processing system 10, the viewer 600 may, for example, directly views the artist 602, or may view video of the artist 602 distributed.

Specifically, as illustrated in FIG. 3, the information processing system 10 according to the embodiment can include, for example, a tactile presentation device 100, a monitor 110, a camera 120, a server (information processing device) 200, and a smartphone 300a and a tablet terminal 300b as an example of the user terminal (information processing terminal) 300. The server 200 and other devices can send and receive data via various communication networks, such as a wired/wireless local area network (LAN), Wi-Fi (registered trademark), Bluetooth (registered trademark), a mobile communication network (long term evolution (LTE), and 5G (5th generation mobile communication system). Note that the number of devices included in the information processing system 10 is not limited to the number illustrated in FIG. 3, and may be further greater. Furthermore, the information processing system 10 may include a device that is not illustrated in FIG. 3. For example, the information processing system 10 may include a general-purpose personal computer (PC), a game machine, a cell phone, a portable media player, a speaker, a projector, a display (digital signage, etc.), a wearable device such as headphones, smart glasses, or a smart watch. The outline of the individual devices included in the information processing system 10 according to the embodiment is described below.

(Tactile Presentation Device 100)

The tactile presentation device 100 is implemented by, for example, a device that can be worn on the body. In the embodiment, the tactile presentation device 100 is assumed to be of a vest-type (sleeveless outwear shape) worn by the artist 602, for example. As described early, the vest-type tactile presentation device 100 includes a plurality of tactile stimulus units therein. For example, a predetermined number (for example, six) of tactile stimulus units may be arranged, inside the tactile presentation device 100, on each of the front side and the back side of the artist 602. As an example, the individual tactile stimulus units arranged on the front side and the individual tactile stimulus units arranged on the back side are arranged in a facing positional relationship.

In the embodiment, the shape of the tactile presentation device 100 is not limited to the vest-type, and may have an outwear shape with sleeves. In such a case, one or more tactile stimulus units may be placed not only on the chest and abdomen of the artist 602 but also at positions corresponding to both arms of the artist 602. Furthermore, in the embodiment, the tactile presentation device 100 is not limited to the outerwear shape, and may be trousers, shoes, a belt, a hat, gloves, a mask, or the like.

Furthermore, one microphone (hereinafter, referred to as a "microphone") (not illustrated) may be placed on each side of the shoulder part of the tactile presentation device 100, or one microphone may be placed on one of the left and right sides thereof, or three or more microphones may be placed. Furthermore, the microphone may be placed around the artist 602 as another device independent of the tactile presentation device 100. Furthermore, the tactile presentation device 100 may include a worn state detection sensor (for example, a zipper-type sensor, a pressure sensor, etc.)

(not illustrated) for detecting the worn state of the tactile presentation device 100, an inertial sensor (inertial measurement unit (IMU)) (not illustrated) for detecting action and posture of the artist 602, a biometric information sensor for detecting biometric information of the artist 602 (for example, sensor for sensing heartbeat, pulse, brain waves, respiration, sweating, myoelectric potential, skin temperature, skin electrical resistance, eye movement, or pupil diameter, etc.) (not illustrated). The detailed configuration of the tactile presentation device 100 is described later.

(Monitor 110)

The monitor 110 can display, for the artist 602, an image of the artist 602 captured by the camera 120 described later for example, and the monitor 110 further can superimpose text, an icon, an animation, or the like on the image of the artist 602. The monitor 110 is implemented by, for example, a liquid crystal display (LCD) device and an organic light emitting diode (OLED) device. Furthermore, in the embodiment, a display unit (not illustrated) of the monitor 110 may be provided as a unit integrated with an input unit (not illustrated), and in such a case, the input unit is implemented by a touch panel superimposed on the display unit. Furthermore, in the embodiment, the monitor 110 may be provided with a speaker (not illustrated) for outputting a sound to the artist 602.

(Camera 120)

The camera 120 is one or more visible light cameras that capture images of the artist 602 from one or multiple viewpoints, and an image captured is sent to the user terminal 300 or the monitor 110 of the viewer 600 via the server 200. The camera 120 may capture an image of the surroundings of the artist 602 or a real object that is present around the artist 602. Specifically, the camera 120 includes a lens system having an image pickup lens, a diaphragm, a zoom lens, and a focus lens, and a drive system that causes the lens system to perform a focus operation and a zoom operation. The camera 120 also includes a solid-state imaging element array that photoelectrically converts imaging light captured by the lens system to generate an imaging signal. The solid-state imaging element array may be implemented by, for example, a charge coupled device (CCD) sensor array or a complementary metal oxide semiconductor (CMOS) sensor array.

(Server 200)

The server 200 can receive a stamp (control command) 700 with tactile stimulus effect inputted by the viewer 600, generate a tactile control signal in accordance with the stamp 700, and send the generated tactile control signal to the tactile presentation device 100. Each stamp 700 with tactile stimulus effect is correlated with each predetermined control command, and each control command includes information for designating a perceptual location where a vibration stimulus is to be presented (positional information), and information for designating a waveform type and intensity of the vibration stimulus for example (mode information). Specifically, the server 200 generates a tactile control signal (waveform data) to be inputted to the individual tactile stimulus units of the tactile presentation device 100 so as to present a vibration stimulus with the intensity and waveform designated in the control command at the perceptual location designated therein, and sends the tactile control signal to the tactile presentation device 100. Note that, in the specification, the "perceptual location" includes a movement path of the perceptual location and a perceptual range having a predetermined size.

Furthermore, in the embodiment, the server 200 may be implemented by a single device as illustrated in FIG. 3 or a plurality of devices, and the present disclosure is not particularly limited to this example. For example, the server 200 may be implemented by a server (not illustrated) dedicated for the tactile presentation device 100 and a distribution server (not illustrated) for distributing content. In such a case, the server dedicated for the tactile presentation device 100 authenticates via a web application programming interface (web API), monitors the stamp 700 with tactile stimulus effect sent by the viewer 600 and the like, and controls the tactile presentation device 100. On the other hand, the distribution server distributes, to the user terminal 300, an image of the artist 602 or the like, an image for selecting the stamp 700 with tactile stimulus effect, or the like. Furthermore, the server 200 may include, for example, a settlement server (not illustrated) that performs payment for the use of the information processing system 10. Detailed configuration of the server 200 is described later.

(User Terminal 300)

The user terminal 300 is a terminal that is used by the viewer 600 or installed in the vicinity of the viewer 600, and is used for the viewer 600 to input the stamp 700 with tactile stimulus effect or the like. The user terminal 300 receives the stamp (control command) 700 with tactile stimulus effect inputted by the viewer 600, and sends the received stamp 700 to the server 200. For example, the user terminal 300 can be the smartphone 300a, the tablet personal computer (PC) 300b, a cell phone, a laptop PC, or a wearable device such as a head mounted display (HMD). Detailed configuration of the user terminal 300 is described later.

2.2 Detailed Configuration of Tactile Presentation Device 100

Figure 4:
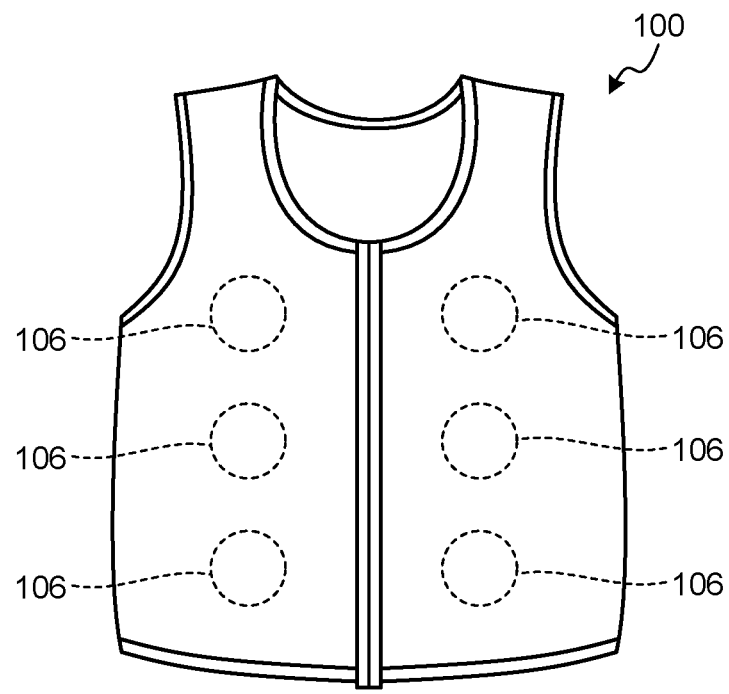
FIG. 4 is a diagram illustrating an example of the exterior configuration of a tactile presentation device 100 according to the first embodiment of the present disclosure.
Figure 5:
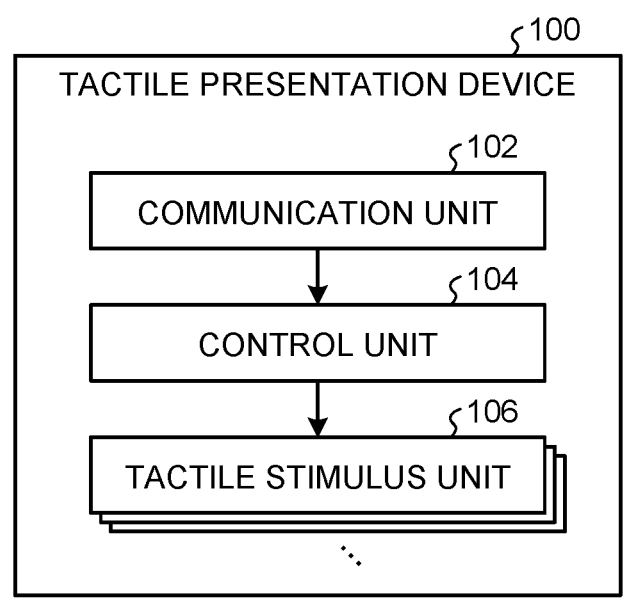
FIG. 5 is a diagram illustrating an example of the functional configuration of the tactile presentation device 100 according to the first embodiment of the present disclosure.

Next, the detailed configuration of the tactile presentation device 100 is described with reference to FIGS. 4 and 5. FIG. 4 is a diagram illustrating an example of the exterior configuration of the tactile presentation device 100 according to the embodiment, and FIG. 5 is a diagram illustrating an example of the functional configuration of the tactile presentation device 100 according to the embodiment. As described above, the tactile presentation device 100 is a device that is attached to a part of the body of the artist 602 and vibrates in accordance with a control command to give a tactile stimulus to the artist 602.

As illustrated in FIG. 4, for example, the vest-type tactile presentation device 100 includes a plurality of tactile stimulus units 106 therein as described early. The tactile stimulus unit 106 includes, for example, an actuator, is driven by a tactile control signal generated by the server 200 to generate vibrations, and presents such vibrations as a tactile stimulus. Examples of the actuator include an eccentric motor, a linear vibrator, a piezoelectric element, and the like.

As illustrated in FIG. 5, the tactile presentation device 100 includes a communication unit 102, a control unit 104, and the tactile stimulus unit 106. The communication unit 102 is connected to the server 200 by wire or wirelessly, and sends/receives information to/from the server 200. The control unit 104 is a controller, and drives the tactile stimulus unit 106 on the basis of a tactile control signal inputted via the communication unit 102. The control unit 104 is implemented, for example, in response to various programs, stored in read only memory (ROM) or the like of the tactile presentation device 100, executed by a central processing unit (CPU), a micro processing unit (MPU), or the like using random access memory (RAM) as a work area. Alternatively, the control unit 104 can be implemented, for example, by an integrated circuit such as an application specific integrated circuit (ASIC) or a field programmable gate array (FPGA).

Although the detailed configuration of the tactile presentation device 100 according to the embodiment has been specifically described above, the detailed configuration of the tactile presentation device 100 according to the embodiment is not limited to the examples illustrated in FIGS. 4 and 5.

Furthermore, the tactile presentation device 100 is not limited to the wearable type device as described above, and may also be configured as an on-hand type device that is mounted on a device held by the artist 602, for example, a smartphone, a game controller, a portable music player, or the like. Alternatively, the tactile presentation device 100 is not limited to the wearable type device and the on-hand type device, and may also be configured as a slate/floor type device that is mounted on furniture such as a bed or a chair or various facilities.

2.3 Detailed Configuration of Server 200

Figure 6:
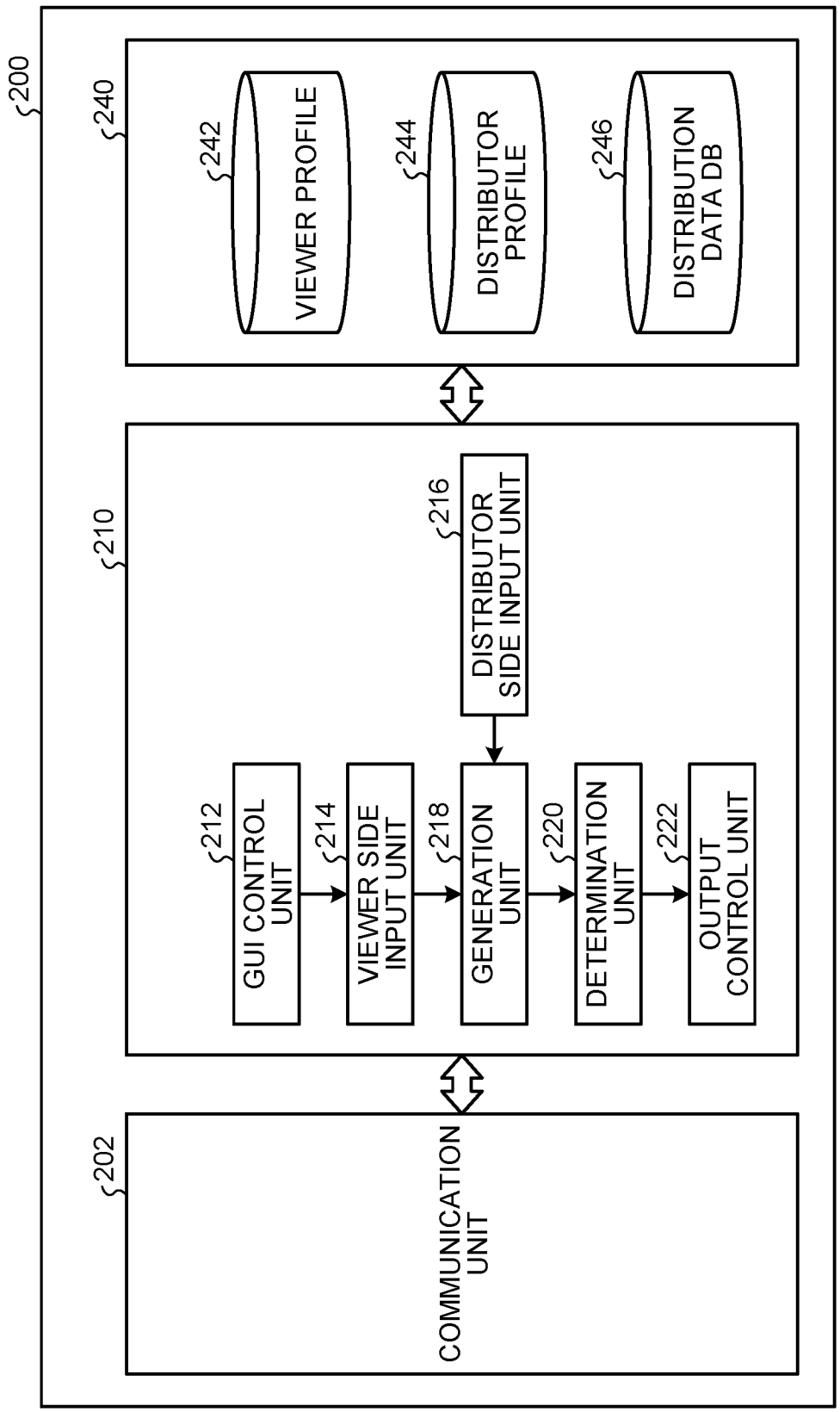
FIG. 6 is a diagram illustrating an example of the functional configuration of a server 200 according to the first embodiment of the present disclosure.

Next, the detailed configuration of the server 200 according to the embodiment of the present disclosure is described with reference to FIG. 6. FIG. 6 is a diagram illustrating an example of the functional configuration of the server 200 according to the embodiment. As illustrated in FIG. 6, the server 200 mainly includes a communication unit 202, a control unit 210, and a storage unit 240. Hereinafter, the functional blocks of the server 200 are described sequentially.

(Communication Unit 202)

The communication unit 202 can send and receive information to and from the tactile presentation device 100, the monitor 110, the camera 120, and the user terminal (information processing terminal) 300. The communication unit 202 is a communication interface having a function to send and receive data, and is implemented by a communication device (not illustrated) such as a communication antenna, a transmission/reception circuit, and a port.

(Control Unit 210)

The control unit 210 is a controller, and is implemented, for example, in response to various programs, stored in ROM or the like of the server 200, executed by a CPU, an MPU, or the like using RAM as a work area. Specifically, as illustrated in FIG. 6, the control unit 210 may include a GUI control unit 212, a viewer side input unit (first acquisition unit) 214, a distributor side input unit 216, a generation unit 218, a determination unit 220, and an output control unit (first distribution unit) 222.

The graphical user interface (GUI) control unit 212 controls the user terminal 300 of the viewer 600 to display a screen to which the stamp (control command) 700 with tactile stimulus effect is inputted. Specifically, the GUI control unit 212 causes the display unit 302 of the user terminal 300 to display the screen as illustrated in FIG. 2 as a screen on which to select the stamp 700 with tactile stimulus effect. A large number of stamps 700 with tactile stimulus effect are displayed on the selection screen (stamp selection screen). Each stamp 700 with tactile stimulus effect is correlated with a control command for the tactile presentation device 100, and the viewer 600 can select the stamp 700 displayed on the selection screen to input a control command. In the embodiment, it is preferable that an image of the stamp 700 with tactile stimulus effect intuitively evokes the tactile stimuli, thoughts (message), and so on that the viewer 600 wishes to send to the artist 602.

The viewer side input unit 214 acquires a control command including positional information for designating a presentation position at which to present the tactile stimulus by the tactile presentation device 100 and mode information for designating a mode of the tactile stimulus, the control command being correlated with the stamp 700 with tactile stimulus effect inputted by the viewer 600, and outputs the control command to the generation unit 218 described later.

The distributor side input unit 216 acquires, for example, sensing data or the like acquired by a worn state detection sensor (not illustrated) for detecting a worn state of the tactile presentation device 100, and outputs the sensing data or the like to the generation unit 218 described later.

The generation unit 218 generates a tactile control signal for controlling the tactile presentation device 100 on the basis of the control command correlated with the stamp 700 with tactile stimulus effect inputted by the viewer 600, and outputs the tactile control signal to the determination unit 220 described later. Specifically, the generation unit 218 generates, on the basis of the control command including a perceptual location of a vibration stimulus (positional information), a waveform type of the vibration stimulus, and intensity information on the vibration stimulus (mode information), waveform data to be inputted to the individual tactile stimulus units of the tactile presentation device 100 so as to present a vibration stimulus with the intensity and waveform designated in the control command at the perceptual location designated therein. Note that the tactile control signal may include information for giving a command to present the vibration stimulus at a presentation timing, frequency, interval, and presentation time of a tactile stimulus based on the control command. If the frequency and intensity of the vibration stimulus designated in the control command has a wide band (e.g., 50 to 500 Hz), then the generation unit 218 may compress it to a narrow band (e.g., 100 Hz) according to the function of the tactile presentation device 100, and generate waveform data.

The generation unit 218 may also adjust the tactile control signal according to the worn state of the tactile presentation device 100 of the artist 602. For example, the generation unit 218 adjusts the tactile control signal according to a contact rate between the tactile presentation device 100 and the body of the artist 602. More specifically, the generation unit 218 adjusts the tactile control signal so that the tactile vibration is not presented for the tactile stimulus unit 106 at a location where the contact rate is low. The generation unit 218 may also adjust the tactile control signal according to attribute information (age, gender, height, weight, physique, and so on, for example) and biometric information of the artist 602. For example, the generation unit 218 may adjust the perceptual location, intensity, and the like according to the age of the artist 602. More specifically, in a case where the artist 602 is six years old, the generation unit 218 may adjust the tactile control signal so that the intensity of the tactile stimulus to be presented is a half of the intensity for a case where the artist 602 is an adult.

Furthermore, the generation unit 218 may generate, together with the tactile control signal, a presentation control signal (for example, a control signal when not worn or the like) for presenting a predetermined image or a predetermined sound to the viewer 600 or the artist 602. For example, the predetermined image can be a virtual object such as an icon, an animation, or text that is superimposed on an image of the artist 602 or an image of the real space around the artist 602, or is projected onto the artist 602; and more specifically, the predetermined image can be a trajectory of a social tip moving from the viewer 600 to the artist

602, an animation that looks like a bomb exploding, which is displayed at the same time as the tactile stimulus is presented, or an icon corresponding to the stamp 700 with tactile stimulus effect inputted by the viewer 600. Furthermore, the predetermined image or the predetermined sound can be, for example, an image or sound that is outputted to the viewer 600 instead of a tactile stimulus in a case where the tactile stimulus cannot be presented to the artist 602 because the tactile presentation device 100 is not worn on the body of the artist 602.

The determination unit 220 determines whether or not to send a tactile control signal to the tactile presentation device 100 on the basis of the content of the control command and the tactile control signal, the attribute information of the viewer 600 or the artist 602, and so on. For example, in a case where the control command inputted by the viewer 600 designates the presentation position and intensity restricted by the artist 602 in advance, the determination unit 220 determines that a tactile control signal generated on the basis of the control command is not sent to the tactile presentation device 100. Furthermore, in a case where different viewers 600 designate the same presentation position consecutively, or in a case where the same viewer 600 inputs control commands continuously, the determination unit 220 may determine that the tactile control signal generated is not sent to the tactile presentation device 100. Furthermore, in such a case, the generation unit 218 may change the presentation position of the tactile stimulus.

The output control unit 222 sends the generated tactile control signal to the tactile presentation device 100 worn on the body of the artist 602 via the communication unit 202.

(Storage Unit 240)

The storage unit 240 is implemented by a storage device such as ROM that stores programs and operation parameters used for processing of the control unit 210, RAM that temporarily stores parameters changing as appropriate, and a hard disk drive (HDD) that stores various databases (DBs). As illustrated in FIG. 6, for example, the storage unit 240 can include a viewer profile 242, a distributor profile 244, and a distribution data DB 246. The viewer profile 242 and the distributor profile 244 store attribute information of the viewer 600 and the artist 602, respectively. Furthermore, the viewer profile 242 may store, in correlation with the identification information of the viewer 600, information on control commands that the viewer 600 has acquired or used in the past, and the distributor profile 244 may store, in correlation with the identification information of the artist 602, information on control commands that the artist 602 has received in the past. Furthermore, the distribution data DB 246 stores a tactile data library (vibration waveform pattern, and so on) generated in advance in correlation with the identification information of each stamp 700, and the generation unit 218 uses the tactile data library to generate a tactile control signal. Furthermore, the distribution data DB 246 may store, as the profile information of the tactile presentation device 100, for example, information such as the number of tactile stimulus units 106 of the tactile presentation device 100, the locations thereof, frequency characteristics, and maximum input voltage. The generation unit 218 can adjust the tactile control signal with reference to the profile information.

Although the detailed configuration of the server 200 according to the embodiment has been specifically described above, the detailed configuration of the server 200 according to the embodiment is not limited to the example illustrated in FIG. 6. For example, the server 200 may further include a recommendation unit (not illustrated) that refers to the viewer profile 242 and the distributor profile 244 to select a control command that the viewer 600 or the artist 602 uses frequently, or conversely, a control command that the viewer 600 or the artist 602 uses less frequently, and recommends, to the viewer 600, a stamp 700 with tactile stimulus effect that is correlated with the selected control command. Furthermore, the recommendation unit may recommend, to the viewer 600, a stamp 700 with tactile stimulus effect recommended by the artist 602.

2.3 Detailed Configuration of User Terminal 300

Figure 7:
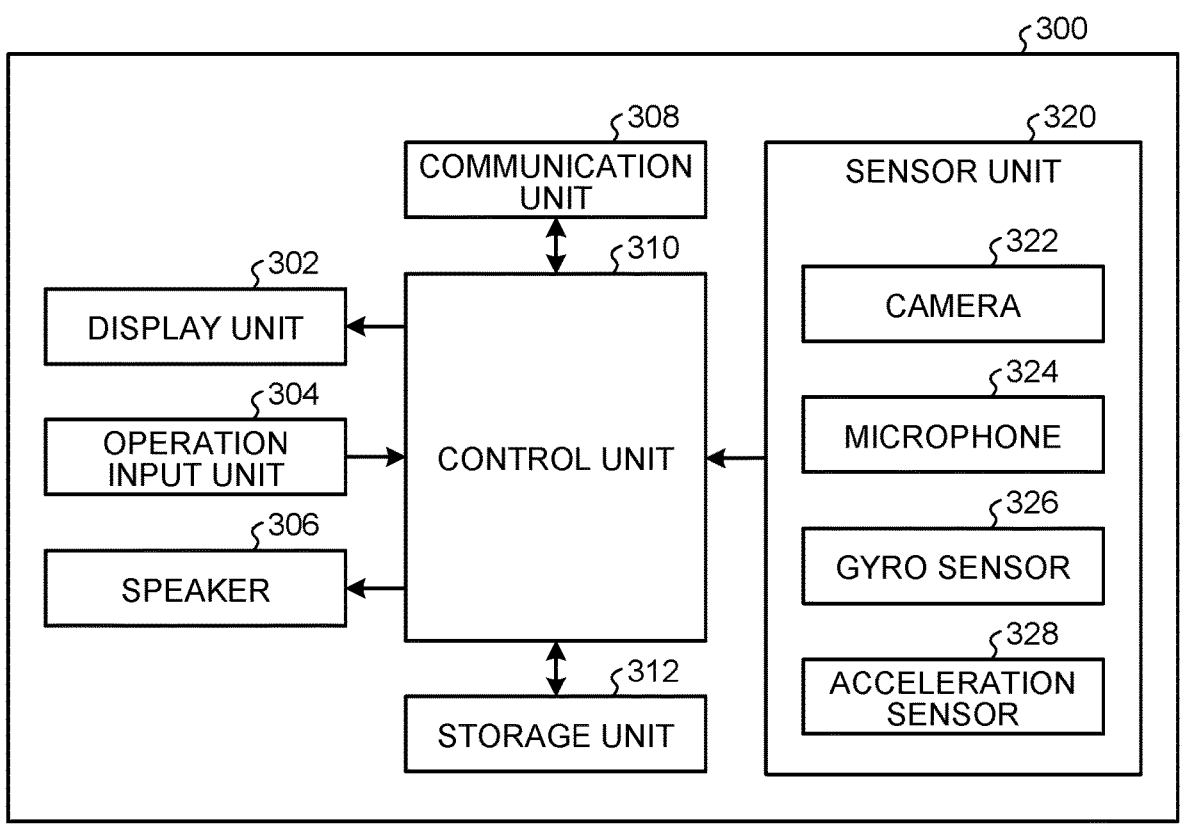
FIG. 7 is a diagram illustrating an example of the functional configuration of a user terminal 300 according to the first embodiment of the present disclosure.

Next, the detailed configuration of the user terminal 300 according to the embodiment of the present disclosure is described with reference to FIG. 7. FIG. 7 is a diagram illustrating an example of the functional configuration of the user terminal 300 according to the embodiment. As illustrated in FIG. 7, the user terminal 300 mainly includes the display unit 302, an operation input unit 304, a speaker 306, a communication unit (transmission unit) (price acquisition unit) 308, a control unit 310, a storage unit 312, and a sensor unit 320. Hereinafter, the functional blocks of the user terminal 300 are described sequentially.

(Display Unit 302)

The display unit 302 can display, for the viewer 600, a selection screen for selecting a stamp (control command) 700 with tactile stimulus effect, an image of the artist 602, and so on for example. The display unit 302 can also superimpose text, an icon, an animation, or the like on the image of the artist 602. The display unit 302 is implemented by a liquid crystal display device, an OLED device, or the like.

(Operation Input Unit 304)

The operation input unit 304 receives, from the viewer 600, a selection result of the stamp 700 with tactile stimulus effect that is correlated with a control command including positional information for designating a presentation position at which to present a tactile stimulus and mode information for designating a mode of the tactile stimulus. Alternatively, the operation input unit 304 may directly receive an input of the control command. For example, the operation input unit 304 is implemented by a switch, a button, a touch panel, a lever, or the like. Furthermore, the content of the operation inputted by the operation input unit 304 may be displayed on the display unit 302. Furthermore, the operation input unit 304 can receive information on input operation (e.g., positional information) that the viewer 600 enters on a position selection screen that is provided so as to be superimposed on the display unit 302 and is to designate a presentation position displayed on the display unit 302.

(Speaker 306)

The speaker 306 reproduces an audio signal or the like under the control of the control unit 310 described later. Note that the speaker 306 may be provided in the user terminal 300, or may be a device separated from the user terminal 300, such as a pair of earphone speakers (not illustrated).

(Communication Unit 308)

The communication unit 308 can send and receive information to and from the server 200, and specifically, can send, to the server 200, information on a stamp (control command) 700 with tactile stimulus effect inputted by the viewer 600. Furthermore, the communication unit 308 can receive information (for example, information such as a price of the stamp (control command) 700 with tactile stimulus effect) sent from the server 200. For example, the communication unit 308 is a communication interface having a function to send and receive data, and is implemented by a communication device (not illustrated) such as a communication antenna, a transmission and reception circuit, and a port.

(Control Unit 310)

The control unit 310 is a controller of the user terminal 300, and is implemented, for example, in response to various programs, stored in ROM or the like of the user terminal 300, executed by a CPU, an MPU, or the like using RAM as a work area.

(Storage Unit 312)

The storage unit 312 is implemented by a storage device such as ROM that stores programs, operation parameters, and the like used for the processing of the control unit 310, and RAM that temporarily stores parameters and the like changing as appropriate.

(Sensor Unit 320)

The sensor unit 320 can acquire sensing data on operation (vibrations or the like given to the user terminal) from the viewer 600. For example, as illustrated in FIG. 7, the sensor unit 320 mainly includes a camera 322, a microphone 324, a gyro sensor 326, and an acceleration sensor 328. Note that the sensors are examples, and the embodiment is not limited thereto.

For example, the camera 322 captures an image of motion or the like of the viewer 600 to output the captured image to the control unit 310. The control unit 310 can then extract predetermined motion of the viewer 600 from the image captured by the camera 322 and acquire a control command related to the extracted motion. Specifically, the camera 322 includes a lens system having an image pickup lens, a diaphragm, a zoom lens, and a focus lens, and a drive system that causes the lens system to perform a focus operation and a zoom operation. The camera 322 also includes a solid-state imaging element array that photoelectrically converts imaging light captured by the lens system to generate an imaging signal. Note that the solid-state imaging element array may be implemented by, for example, a CCD sensor array or a CMOS sensor array. Furthermore, the camera 322 may include a time of flight (ToF) sensor (not illustrated). The ToF sensor, for example, irradiates an object with irradiation light having a predetermined cycle, detects reflected light reflected from the object, and detects a phase difference and a time difference between the irradiation light and the reflected light, thereby acquiring depth information of the object. Here, the depth information of the object is depth information which is one piece of the information of the distance from the ToF sensor to each point on the surface of the object. Then, by aggregating the depth information on the plurality of points on the surface of the object, shape information on the unevenness of the surface of the object, i.e., the outer shape information on the object can be obtained.

The microphone 324 collects a sound of the viewer 600 to output the collected sound information to the control unit 310. The control unit 310 can then extract a predetermined sound pattern of the viewer 600 from the sound collected by the microphone 324 and acquire a control command related to the extracted sound pattern.

The gyro sensor 326 is implemented by, for example, a three-axis gyro sensor, and detects an angular velocity (rotation speed) of the movement of the user terminal 300 by the viewer 600. Furthermore, the acceleration sensor 328 is implemented by, for example, a three-axis acceleration sensor (also called a G sensor), and detects the acceleration of the movement of the user terminal 300 by the viewer 600. In the embodiment, the sensing data from these sensors can be used to recognize the operation performed by the viewer 600 on the user terminal 300, leading to the acquisition of a control command related to the recognized operation.

Although the detailed configuration of the user terminal 300 according to the embodiment has been specifically described above, the detailed configuration of the user terminal 300 according to the embodiment is not limited to the example illustrated in FIG. 7, and may further include, for example, a vibration device (not illustrated) for making a notification to the viewer 600 through vibration.

2.4 Information Processing Method

Figure 8:
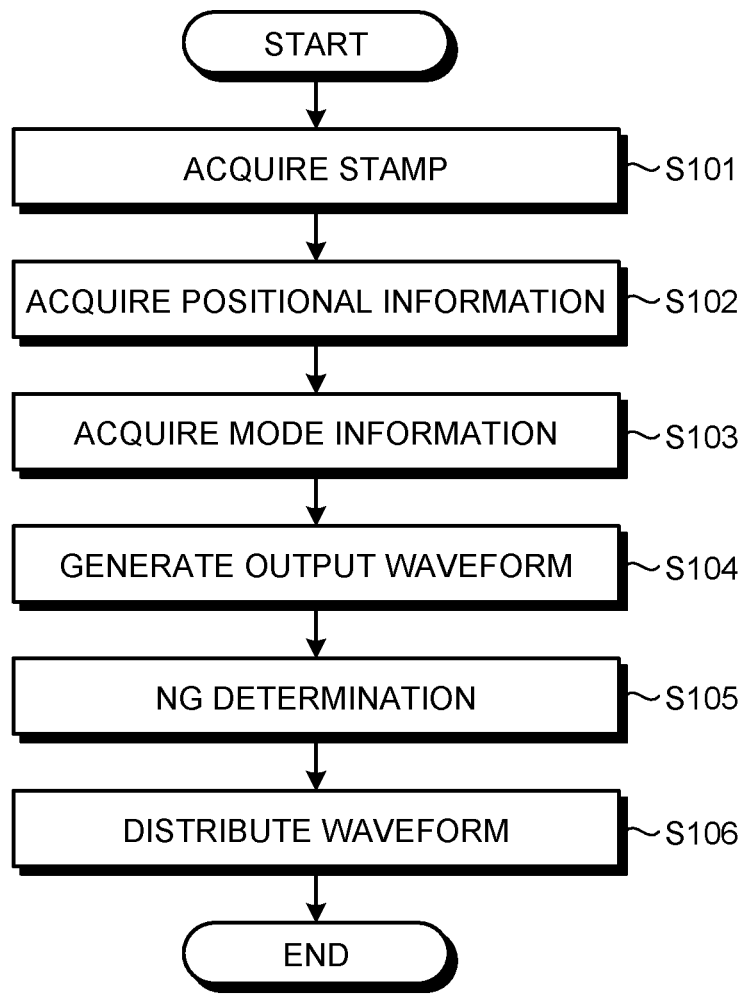
FIG. 8 is a flowchart depicting an example of an information processing method according to the first embodiment of the present disclosure.

The devices of the information processing system 10 according to the embodiment has been detailed above. Next, an example of the information processing method according to the embodiment is described with reference to FIGS. 8 to 12. FIG. 8 is a flowchart depicting an example of the information processing method according to the embodiment. FIGS. 9 to 12 are explanatory diagrams for explaining a display example according to the embodiment. As illustrated in FIG. 8, an example of the information processing method according to the embodiment includes a plurality of steps from Step S101 to Step S106. The details of the steps included in the example of the information processing method according to the embodiment are described below.

First, the viewer 600 selects one stamp 700 with tactile stimulus effect from the stamps 700 with tactile stimulus effect displayed on the display unit 302 of the user terminal 300, and sends the selected stamp 700 to the server 200. In the embodiment, before sending, the viewer 600 may tap the displayed stamp 700 to reproduce a tactile stimulus corresponding to the control command correlated with the stamp 700 for example, and in such a case, the user terminal 300 vibrates so as to correspond to the tactile stimulus, for example.

The server 200 then acquires information on the stamp 700 with tactile stimulus effect that is sent from the user terminal 300, selected by the viewer 600, and is correlated with the control command (Step S101).

Next, the server 200 acquires, with reference to the distribution data DB 246 and the like, positional information for designating a presentation position at which to present the tactile stimulus included in the control command correlated with the acquired stamp 700 (Step S102).

Furthermore, the server 200 acquires, with reference to the distribution data DB 246 and the like, mode information for designating a mode of the tactile stimulus included in the control command correlated with the acquired stamp 700 (Step S103).

The server 200 then generates waveform data as a tactile control signal for controlling the tactile presentation device 100 on the basis of the positional information and the mode information acquired in Step S102 and Step 3103 (Step S104).

Next, the server 200 determines whether or not to send the generated tactile control signal to the tactile presentation device 100, for example, on the basis of the attribute information of the artist 602 (NG determination) (Step S105).

In a case where it is determined, in Step S105, that the tactile control signal is to be sent to the tactile presentation device 100, the server 200 sends the generated tactile control signal to the tactile presentation device 100 worn on the body of the artist 602 (Step S106), and the processing ends. On the other hand, in a case where it is determined, in Step S105, that the tactile control signal is not to be sent to the tactile presentation device 100, the server 200 may notify the viewer 600 via the user terminal 300 that the tactile control signal is not to be sent.

The artist 602 then perceives the tactile stimulus presented via the tactile presentation device 100 and takes action. The viewer 600 can check, in real time, the action of the artist 602 induced by the tactile stimulus presented by the stamp 700 that the viewer 600 has sent. If the viewer 600 can confirm, in real time, the action induced by the tactile stimulus related to the stamp 700 that he/she has sent, then the viewer 600 can feel as if he/she is in direct contact with the artist 602, and can feel a sense of unity with the artist 602.

Figure 9:
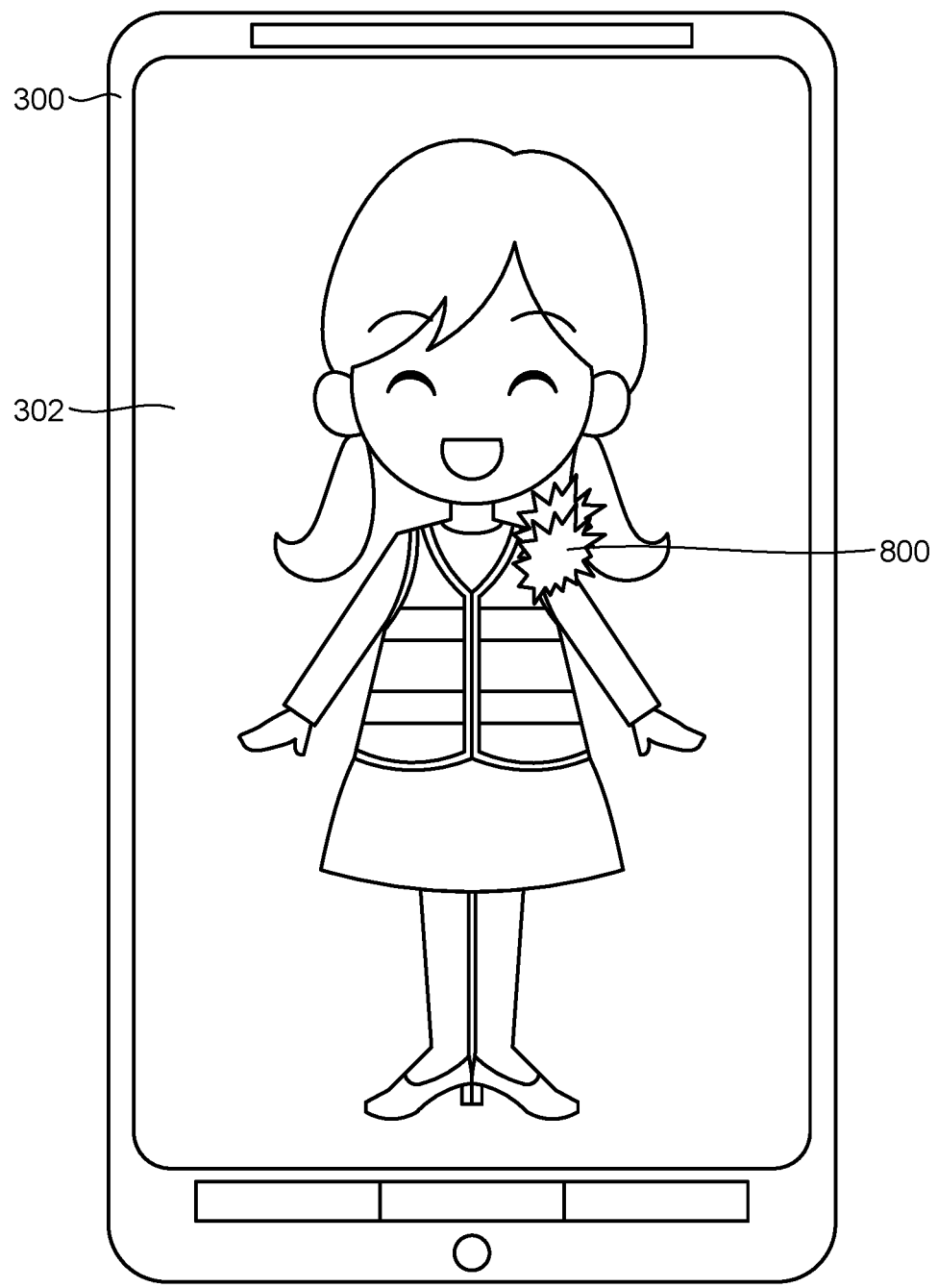
FIG. 9 is an explanatory diagram (No. 1) for explaining a display example according to the first embodiment of the present disclosure.

Note that, in the embodiment, not only the tactile stimulus is presented by the tactile presentation device 100 worn on the body of the artist 602, but also, for example, as illustrated in FIG. 9, a display 800 or the like may be superimposed on the image of the artist 602 or the like on the display unit 302 of the user terminal 300. At this time, the display 800 is preferably superimposed at a position where the tactile stimulus is presented. Furthermore, in the embodiment, the display 800 may have a design corresponding to the design of the stamp 700 with tactile stimulus effect selected by the viewer 600. For example, if the stamp 700 is designed to arrow through heart, then the display 800 can also be designed to arrow through heart. Furthermore, in the embodiment, at the time of presentation of a tactile stimulus, an image displayed on the display unit 302 of the user terminal 300 may move up, down, left, and right in accordance with the tactile stimulus. Furthermore, in the embodiment, at the time of presentation of a tactile stimulus by the tactile presentation device 100 worn on the body of the artist 602, the user terminal 300 of the viewer 600 who has sent the corresponding tactile stimulus may be vibrated, or the user terminals 300 of the artist 602 or other viewers 600 who are present around that viewer 600 may also be vibrated.

Figure 10:
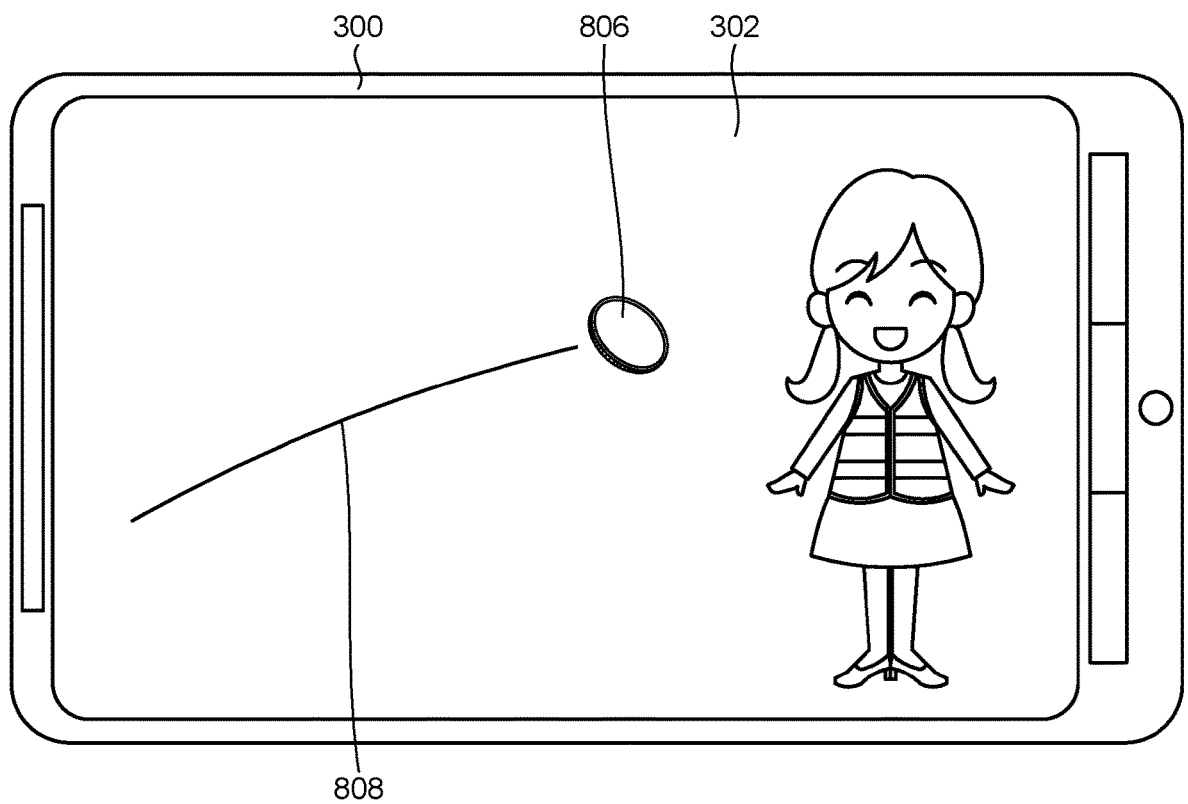
FIG. 10 is an explanatory diagram (No. 2) for explaining a display example according to the first embodiment of the present disclosure.

Furthermore, in the embodiment, in a case where the generated tactile control signal is sent to the tactile presentation device 100, as illustrated in FIG. 10, an icon (predetermined icon) 806 such as a coin and a trajectory 808 of the icon 806 moving from the viewer 600 side to the artist 602 may be displayed on the display unit 302 of the user terminal 300, a display unit (not illustrated) of the monitor 110, or the like. Display of such a trajectory 808 allows the viewer 600 to realize that the stamp 700 sent by himself/herself is being sent to the artist 602.

Figure 11:
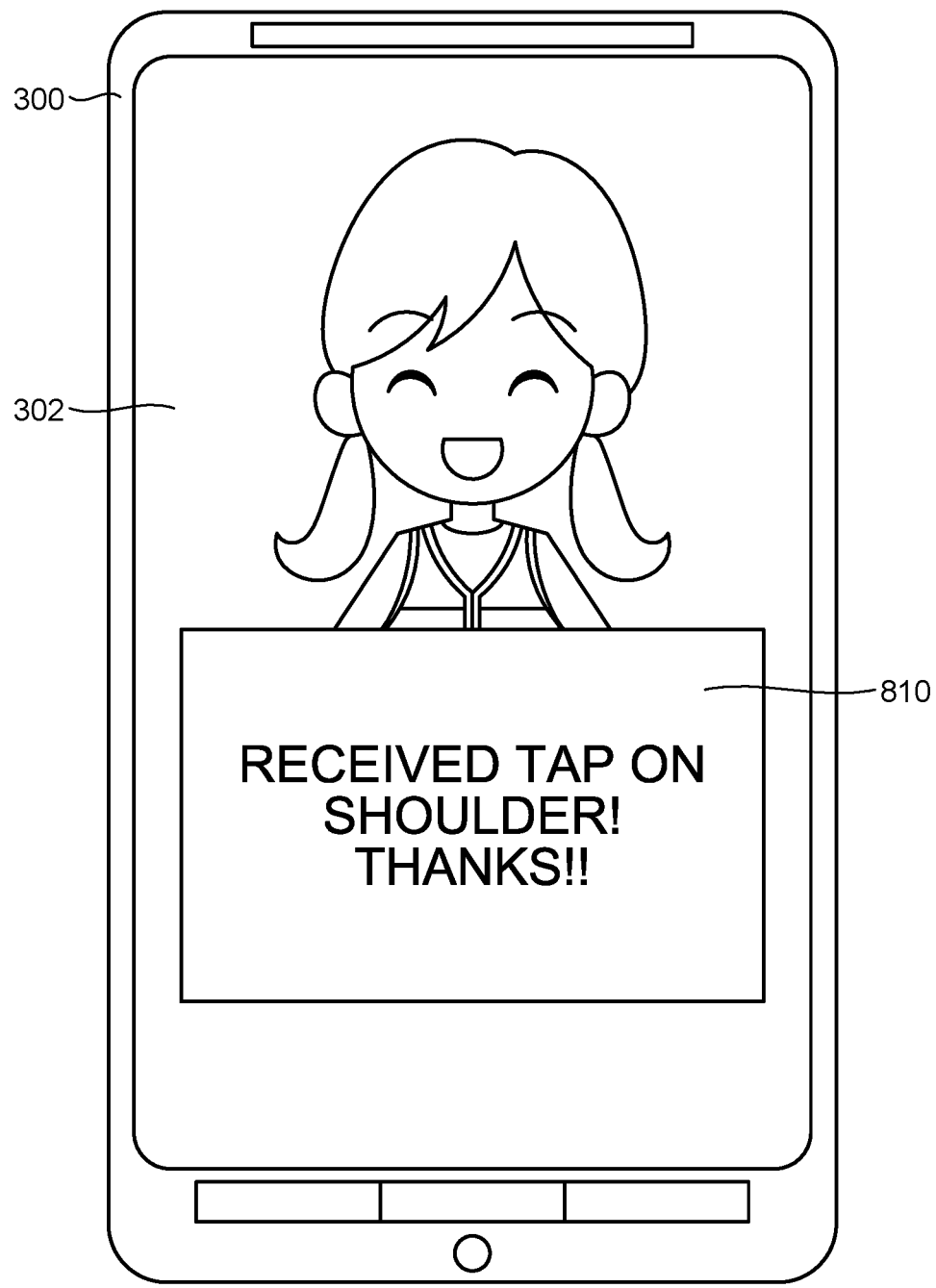
FIG. 11 is an explanatory diagram (No. 3) for explaining a display example according to the first embodiment of the present disclosure.

Furthermore, in the embodiment, as illustrated in FIG. 11, the artist 602 who has perceived the tactile stimulus may display a comment 810 inputted via a distributor terminal (not illustrated) on the display unit 302 of the user terminal 300 or the like, for example.

Furthermore, in the embodiment, in a case where the artist 602 does not wear the tactile presentation device 100, the server 200 may stop sending a tactile control signal, and in such a case, the server 200 may send the tactile control signal in a case where the attachment of the tactile presentation device 100 to the artist 602 wears is newly detected. Furthermore, in a case where the transmission of the tactile control signal is stopped, as illustrated in FIG. 12, a notification 804 indicating the stop may be displayed on, for example, the display unit 302 of the user terminal 300 or the like, or the user terminal 300 may be vibrated for the notification.

Figure 12:
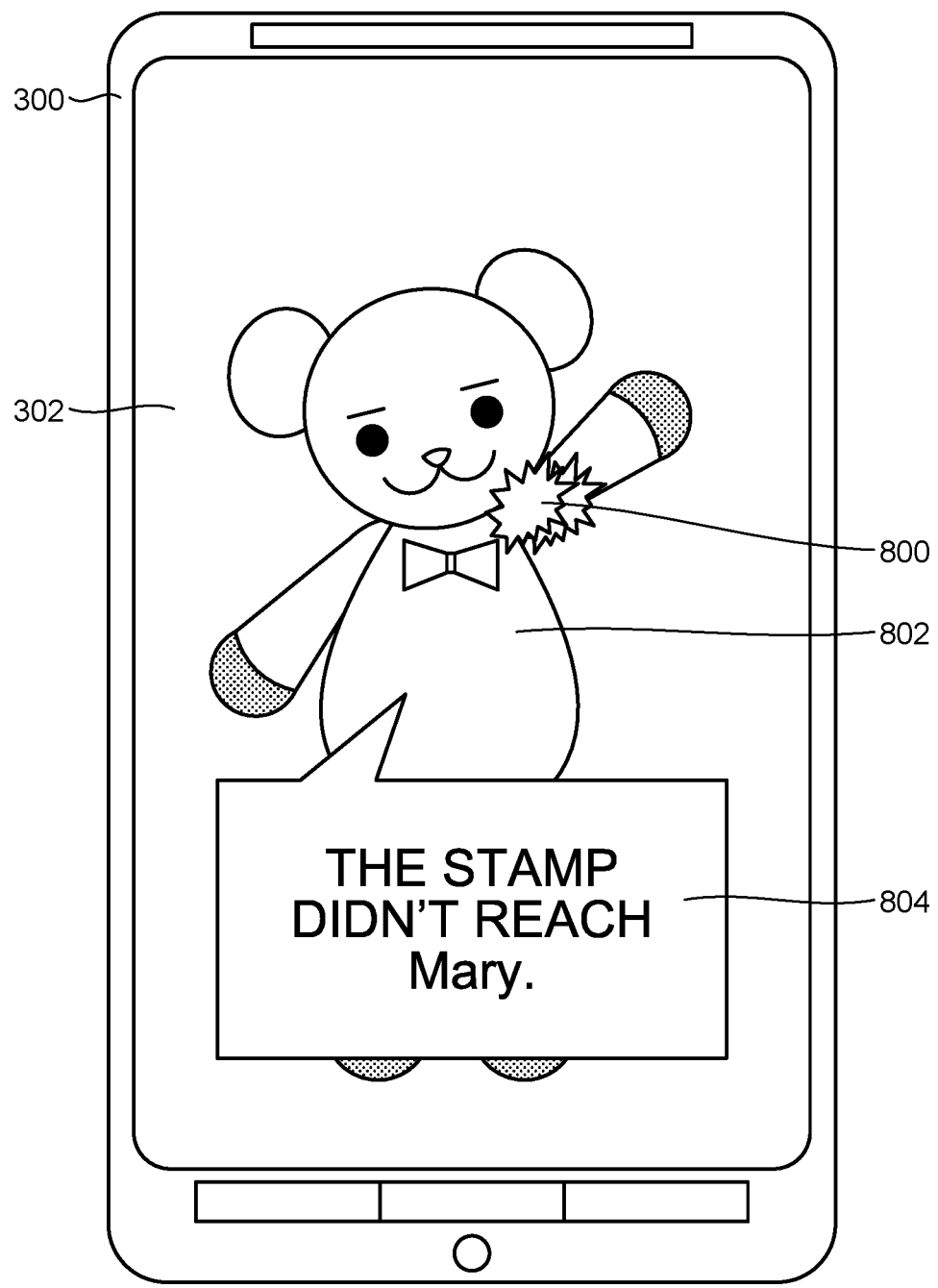
FIG. 12 is an explanatory diagram (No. 4) for explaining a display example according to the first embodiment of the present disclosure.

Furthermore, in the embodiment, in a case where the artist 602 does not wear the tactile presentation device 100, as illustrated in FIG. 12, an animation showing that a tactile stimulus is presented to avatar 802 as a substitute for the artist 602 may be displayed on the display unit 302 of the user terminal 300 or the like by an in-wearing control signal. At this time, the display 800 is preferably superimposed at a position on the avatar 802 corresponding to the position where the tactile stimulus is presented.

As described above, according to the embodiment, the tactile stimulus corresponding to the stamp 700 with tactile stimulus effect selected by the viewer 600 can be presented to the artist 602. Therefore, in the embodiment, if the artist 602 perceives the presented tactile stimulus and takes action, then the viewer 600 can confirm, in real time, the action induced by the tactile stimulus presented by the stamp 700 that the viewer 600 has sent. Then, according to the embodiment, if the viewer 600 can confirm, in real time, the action induced by the tactile stimulus related to the stamp 700 that he/she has sent, then the viewer can feel as if he/she directly interacts with the artist 602, that is, the viewer 600 can obtain a real-time, interactive, and value-added experience.

2.5 Modification Example

Furthermore, in the embodiment, in a case where the tactile presentation device 100 is worn on the body of the viewer 600, "throwback" by the artist 602, in other words, a tactile stimulus corresponding to a stamp 700 with tactile stimulus effect selected by the artist 602 may be presented to the viewer 600. According to the modification example, in a case where the tactile stimulus presented by the stamp 700 sent by the viewer 600 serves as a start point and the artist 602 returns the tactile stimulus to the viewer 600, the viewer 600 can feel as if he/she directly communicates with the artist 602.

In the modification example, for example, as with the first embodiment, when the artist 602 selects and sends the stamp 700 with tactile stimulus effect, the tactile presentation device 100 of the viewer 600 presents the tactile stimulus also to the viewer 600. Specifically, in the modification example, the server 200 acquires the stamp 700 with tactile stimulus effect inputted by the artist 602, generates a tactile control signal according to a control command correlated with the acquired stamp 700, and sends the generated tactile control signal to the tactile presentation device 100 worn on the body of the viewer 600.

Furthermore, in the modification example, in a case where the tactile presentation device 100 is not worn on the body of the viewer 600 at the time of "throwback" by the artist 602, the user terminal 300 may be used instead of the tactile presentation device 100.

In the modification example, for example, the server 200 controls the user terminal 300 to output a sound, vibrate, blink, or the like in response to the control command correlated with the stamp 700 with tactile stimulus effect inputted by the artist 602. Specifically, in the modification example, in such a case, the server 200 acquires the stamp 700 with tactile stimulus effect inputted by the artist 602, generates a control signal for user terminal on the basis of the control command correlated with the acquired stamp 700 and the functional information (attribute information) of the user terminal 300, and sends the generated control signal for user terminal to the user terminal 300.

3. Second Embodiment

Figure 13:
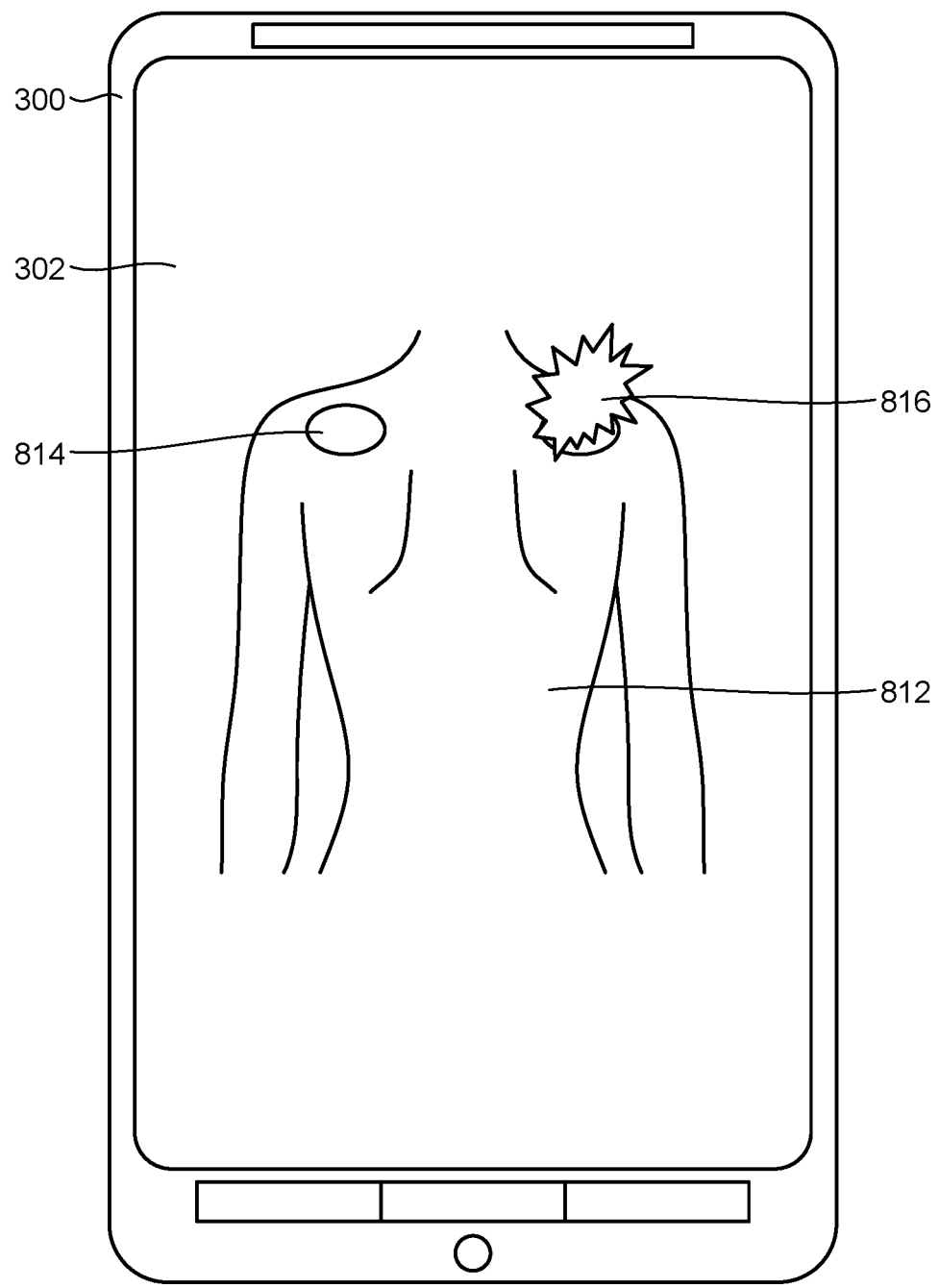
FIG. 13 is an explanatory diagram (No. 1) for explaining a display example according to a second embodiment of the present disclosure.
Figure 14:
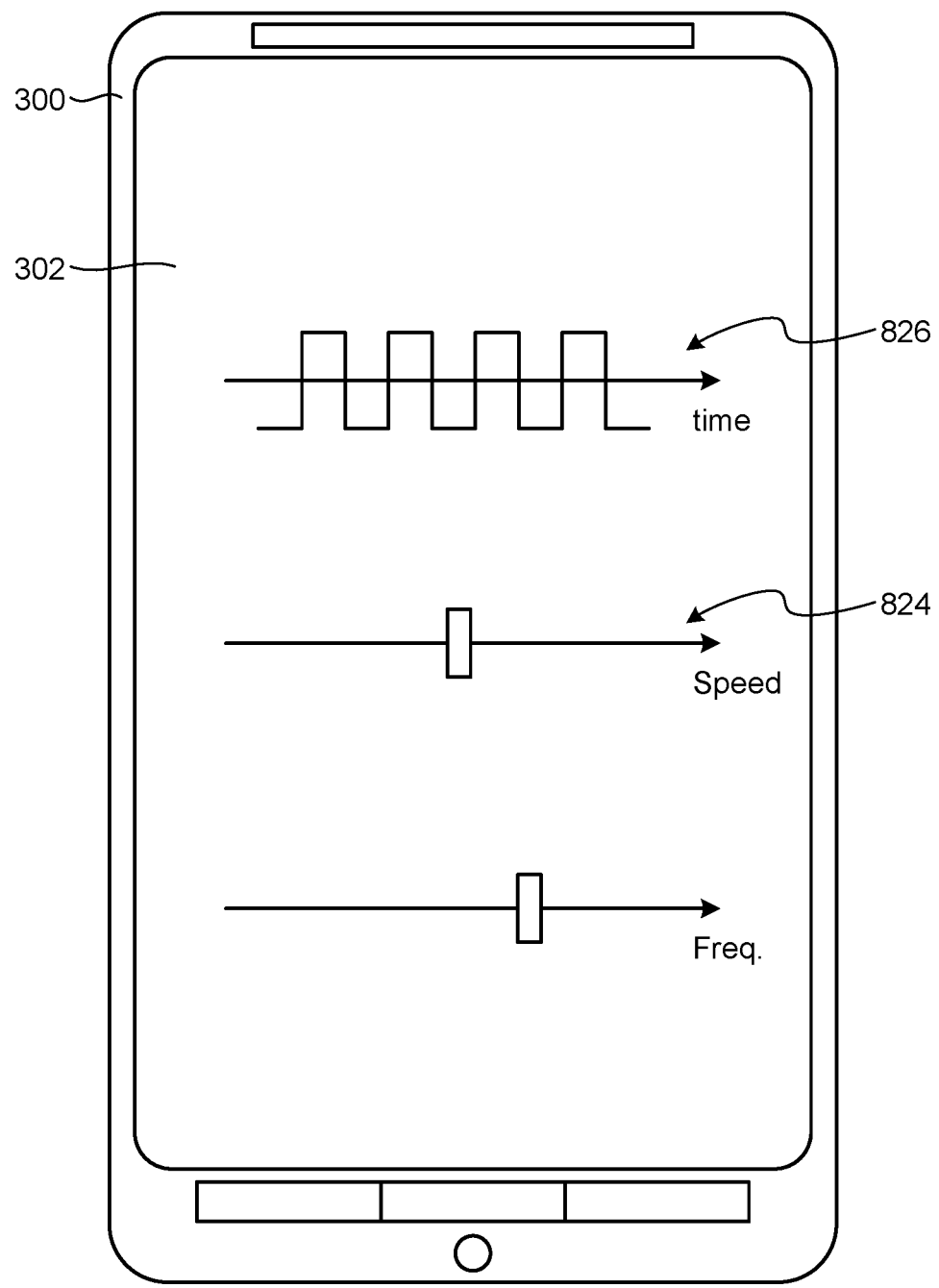
FIG. 14 is an explanatory diagram (No. 2) for explaining a display example according to the second embodiment of the present disclosure.

In the first embodiment, the viewer 600 inputs a control command by selecting a stamp 700 correlated with a control command determined in advance; however, the embodiment of the present disclosure is not limited to such a form, and for example, the viewer 600 can freely edit a tactile stimulus (control command) itself. In this way, if the viewer 600 can freely edit the tactile stimulus, for example, the viewer 600 can confirm, in real time, the action of the artist 602 induced by the tactile stimulus that the viewer 600 has edited, and can feel as if he/she is in direct contact with the artist 602. In view of this, an embodiment according to such an editing method is described below as the second embodiment with reference to FIGS. 13 and 14. FIGS. 13 and 14 are explanatory diagrams for explaining a display example according to the second embodiment of the present disclosure.

First, the viewer 600 can perform operation on a position selection screen displayed on the display unit 302 of the user terminal 300 as illustrated in FIG. 13 to input positional information for designating a perceptual location at which to present a tactile stimulus.

Specifically, as illustrated in FIG. 13, a human body model display 812 is shown in the position selection screen, and a plurality of regions 814 is further shown, on the human body model display 812, at positions corresponding to the tactile stimulus units 106 of the tactile presentation device 100. The viewer 600 can move a marker 816 over a region 814 corresponding to the perceptual location to be selected to set and input the perceptual location. Note that, the embodiment is not limited to pinpointing the perceptual location and setting and inputting the same, and for example, a movement path of the perceptual location may be set and inputted by tracing the human body model display 812, or a perceptual range having a predetermined size may be set and inputted. Then, the viewer side input unit 214 of the server 200 acquires the positional information inputted on the position selection screen.

In the embodiment, even if the installation location and the number of the tactile stimulus units 106 are limited, a tactile stimulus can be presented at a perceptual location desired by the viewer 600 according to the following principle. Specifically, an illusory phenomenon called phantom sensation is medically known. Phantom sensation is an illusory phenomenon in which, when stimuli are presented simultaneously at different locations on the skin, a human perceives only one stimulus between the presented stimulus locations. Therefore, in the embodiment, by using such phantom sensation, for example, when tactile stimuli are simultaneously presented to the two tactile stimulus units 106, the location at which the tactile stimulus is perceived can be a location between the two tactile stimulus units 106. Furthermore, in the embodiment, by changing the output intensity of the plurality of tactile stimulus units 106, the range of the tactile stimulus that can be presented by the plurality of tactile stimulus units 106 can be expanded without changing the arrangement interval between the tactile stimulus units 106.

In addition, the embodiment is not limited to the setting and inputting on the position selection screen as illustrated in FIG. 13. For example, in a case where a vest-type sensor (first sensor) similar to the tactile presentation device 100 is worn on the body of the viewer 600 and the sensor can detect a touch operation by the viewer 600, the viewer 600 may perform an operation on the sensor to set and input a perceptual location. The viewer side input unit 214 of the server 200 acquires positional information inputted to the sensor. Furthermore, the sensor is not limited to being worn on the body of the viewer 600, and may be worn on, for example, a doll (not illustrated).

Furthermore, in the embodiment, it is possible to edit and set also a waveform type, intensity, presentation timing, frequency, interval, presentation time, and the like of the vibration stimulus. For example, it is possible to edit the waveform type, intensity, presentation timing, frequency, interval, presentation time, and the like of the tactile stimulus by performing an operation on an edit screen (mode selection screen) displayed on the display unit 302 of the user terminal 300 as illustrated in FIG. 14. Specifically, as illustrated in FIG. 14, a waveform 826 is displayed on the time axis in the edit screen, and the viewer 600 can edit the waveform 826 by performing an operation on the waveform 826. Furthermore, a cursor or the like is displayed in the edit screen, and the viewer 600 can set the intensity, frequency, and the like of the tactile stimulus by moving a cursor 824 (FIG. 14 illustrates, for example, an edit screen where the velocity (speed) of throwing the stamp 700 with tactile stimulus effect and the frequency of the tactile stimulus can be set). The viewer side input unit 214 of the server 200 acquires mode information inputted into the mode selection screen.

In the embodiment, a range of values or the like that the viewer 600 can edit may be set in advance on the basis of the attribute information of the artist 602. For example, for a male artist 602, the intensity can be set in a wide range of values, and for a female artist 602, the intensity can be set in a narrow range of values.

Furthermore, perceptual sensitivity varies depending on the position of the body, and in addition, the perceptual sensitivity varies from person to person. In view of this, in the embodiment, data (for example, a sensitivity coefficient) or the like indicating the perceptual sensitivity for each position of the body of the artist 602 is stored as the distributor profile 244, and the generation unit 218 refers to the information on the distributor profile 244 and appropriately adjusts the intensity or the like set by the viewer 600 as appropriate for the artist 602. In this way, it is possible to avoid causing discomfort to the artist 602 due to the tactile stimulus edited by the viewer 600.

Furthermore, in the embodiment, the viewer 600 can also set the control command so as to present a tactile stimulus in a case where a predetermined condition is satisfied. For example, in a case where a predetermined condition is satisfied, such as a case where a predetermined time designated in the control command is reached, a case where the artist 602 utters a predetermined keyword designated in the control command (for example, the utterance of the artist 602 is detected by a microphone of the tactile presentation device 100), or a case where the artist 602 performs a predetermined operation designated in the control command (for example, the movement of the artist 602 is detected by the camera 120), the server 200 may distribute a tactile control signal related to the control command to the tactile presentation device 100. The predetermined conditions can be set by the viewer 600, for example. Furthermore, in the embodiment, the viewer 600 can also set the form, size, display speed, animation display speed, and the like of a virtual object displayed at the time of the presentation of the tactile stimulus.

Furthermore, in the embodiment, not only the tactile stimulus is edited and set by the operation on the position selection screen, the edit screen, or the like as described above, but also, various sensors (second sensors) or other devices built in the user terminal 300 may be used, for example.

In the embodiment, for example, the viewer 600 may edit the waveform, intensity change, or the like of the tactile stimulus by performing a touch operation such as vibrating the user terminal 300 or a motion operation such as changing the held angle of the user terminal 300. Specifically, in the embodiment, the gyro sensor 326 and the acceleration sensor 328 built in the user terminal 300 detects the motion operation, and the viewer side input unit 214 of the server 200 acquires the detected sensing data. Furthermore, the generation unit 218 of the server 200 generates a waveform or the like on the basis of the acquired sensing data.

More specifically, for example, the viewer 600 causes the gyro sensor 326 and the acceleration sensor 328 built in the user terminal 300 to detect motion having predetermined rhythm. The server 200 then sets the frequency of the tactile stimulus on the basis of the rhythm extracted from the sensing data detected by the gyro sensor 326 and the acceleration sensor 328. Furthermore, for example, the viewer 600 utters a voice with predetermined rhythm to the user terminal 300, and causes the microphone (sound sensor) 324 built in the user terminal 300 to detect the utterance. The server 200 then uses the sensing data detected by the microphone 324 to set the frequency of the tactile stimulus. Furthermore, for example, the viewer 600 causes the camera (imaging device) 322 built in the user terminal 300 to capture an image of his/her motion. The server 200 may analyze the image captured by the camera 322, extract predetermined motion, and generate waveform data of the tactile stimulus by using the extracted motion.

Furthermore, in the embodiment, the camera 322 built in the user terminal 300 captures an image of a part of the body, and the server 200 may set a perceptual location according to a location contained in the captured image, and, in such case, the location of the body may be identified on the basis of the outer shape information by the ToF sensor (not illustrated) included in the camera 322. Furthermore, at this time, the intensity of the tactile stimulus may be set according to the angle of view of the captured image. For example, the intensity is set high for a narrow angle of view, and the intensity is set low for a wide angle of view. Furthermore, in a case where, for example, the camera 322 captures an image of a hand of the viewer 600 moving on a part (e.g., arm) of the body of the viewer 600, the arm may be set as the perceptual location.

Furthermore, in the embodiment, the setting terminal is not limited to the user terminal 300, and the setting terminal may be an electronic musical instrument having a musical instrument digital interface (MIDI), a turntable, a game interface (stick type or the like), for example.

In a case where a plurality of viewers 600 intends to simultaneously perform editing and inputting, the server 200 may restrict the plurality of viewers 600 to sequentially perform editing and inputting, or may restrict the plurality of viewers 600 to sequentially perform editing and inputting according to the order in which the viewers 600 have started editing or the order of the amount the viewers 600 have paid. Furthermore, the server 200 may notify the viewers 600 waiting for their turn to perform editing and inputting about how long it will take for the corresponding viewer 600 to have his/her turn (see FIG. 16).

Furthermore, in a case where the server 200 refers to the information of the distributor profile 244 and determines that the tactile stimulus edited by the viewer 600 is a tactile stimulus that the artist 602 refuses to receive or is close thereto (NG determination), the server 200 may stop sending the tactile control signal. In such a case, the server 200 can notify the corresponding viewer 600, an operator of the information processing system 10, or the like that the tactile stimulus edited by the viewer 600 corresponds to the tactile stimulus that the artist 602 refuses to receive, or can give money back to the corresponding viewer 600. Alternatively, in such a case, the server 200 may adjust the perceptual location, intensity, and the like such that the tactile stimulus edited by the viewer 600 no longer corresponds to the tactile stimulus that the artist 602 refuses to receive.

Furthermore, in the embodiment, in a case where the viewer 600 intends to check the tactile stimulus edited by himself/herself, the viewer 600 may check the tactile stimulus before transmission to the tactile presentation device 100 worn by the artist 602.

For example, in a case where the tactile presentation device 100 is worn on the body of the viewer 600, the server 200 sends, to the tactile presentation device 100, a tactile control signal that is identical to the tactile control signal related to the edited tactile stimulus, which enables the viewer 600 to check the tactile stimulus edited by himself/herself via the tactile presentation device 100 worn by the viewer 600.

Furthermore, in a case where the tactile presentation device 100 is not worn on the body of the viewer 600, the user terminal 300 may be used for the check. In such a case, the server 200 generates a control signal (user terminal control signal) corresponding to the tactile control signal related to the edited tactile stimulus on the basis of the functional information (attribute information) of the user terminal 300, and sends the control signal to the user terminal 300. The user terminal 300 can then, according to the control signal received, output a sound from the speaker (sound output device) 306, cause light to blink in the display unit (blinking device) 302, or cause a vibration device (not illustrated) to vibrate, which enables checking by the viewer 600.

Furthermore, in the embodiment, the tactile stimulus edited by the viewer 600 may be exchanged between the plurality of viewers 600 as the stamp 700 with tactile stimulus effect.

4. Third Embodiment

Figure 15:
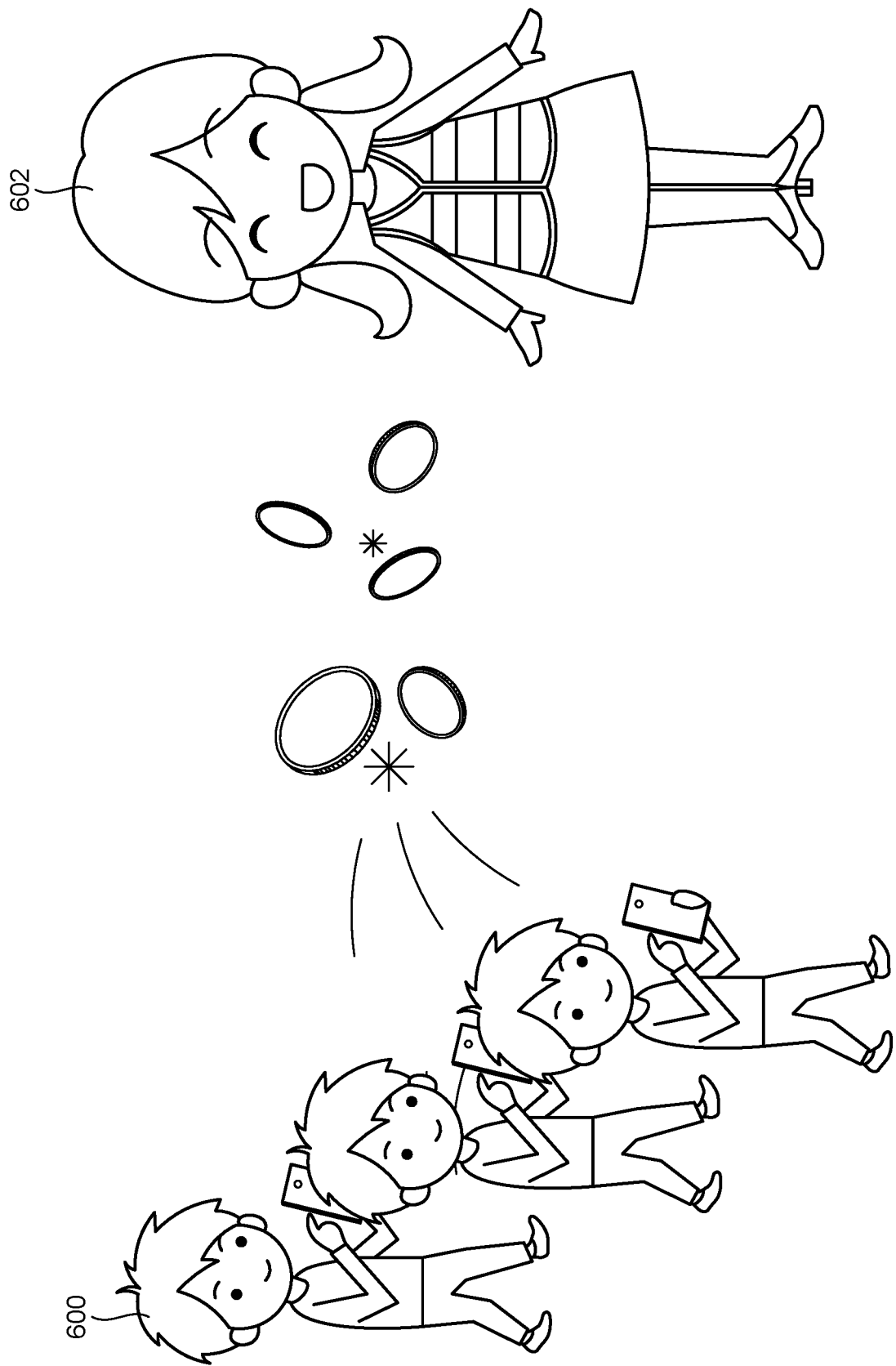
FIG. 15 is an explanatory diagram (No. 1) for explaining a third embodiment of the present disclosure.

Meanwhile, as illustrated in FIG. 15 which is an explanatory diagram for explaining the third embodiment of the present disclosure, a plurality of viewers 600 sometimes sends, to one artist 602, stamps 700 with tactile stimulus effect simultaneously. In such a case, in a case where a plurality of tactile stimuli is simultaneously presented to the artist 602 according to the stamps 700 sent simultaneously, the artist 602 may experience discomfort due to the plurality of tactile stimuli. Furthermore, if tactile stimuli are given at the same time, the artist 602 cannot perceive the tactile stimuli individually and cannot take action for each tactile stimulus. This makes it difficult for the viewer 600 to feel as if he/she directly interacts with the artist 602 via the tactile stimulus by the stamp 700 that the viewer 600 has sent.

Figure 16:
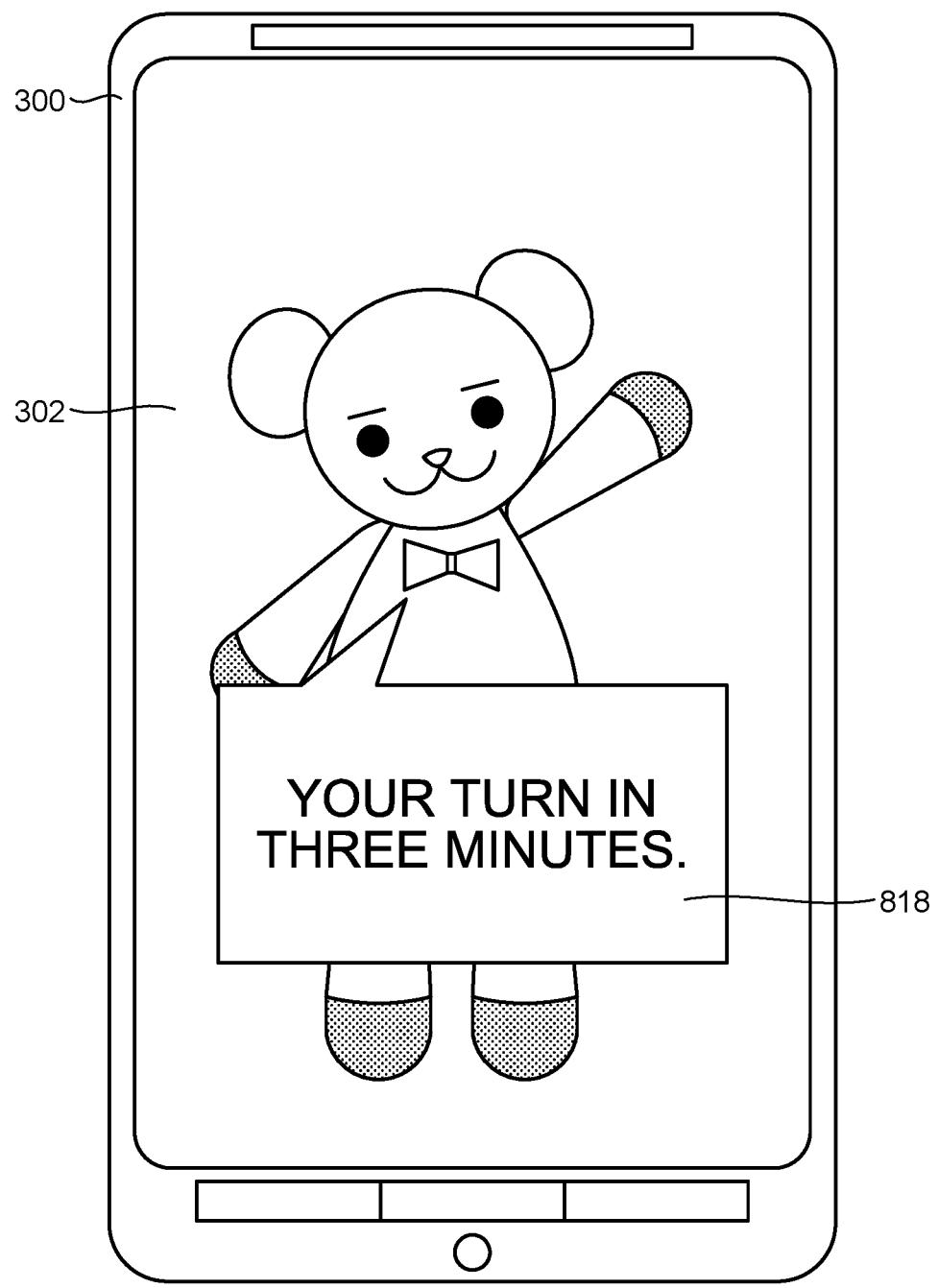
FIG. 16 is an explanatory diagram for explaining a display example according to the third embodiment of the present disclosure.

In view of this, in the third embodiment of the present disclosure, in order to avoid the discomfort and the situation where the individual tactile stimuli cannot be perceived, in a case where a plurality of viewers 600 simultaneously sends a plurality of stamps 700 with tactile stimulus effect, processing as described below is performed. The processing according to the embodiment is described with reference to FIGS. 16 to 20. FIG. 16 is an explanatory diagram for explaining a display example according to the third embodiment of the present disclosure, and FIGS. 17 to 20 are explanatory diagrams for explaining the third embodiment of the present disclosure.

Figure 17:
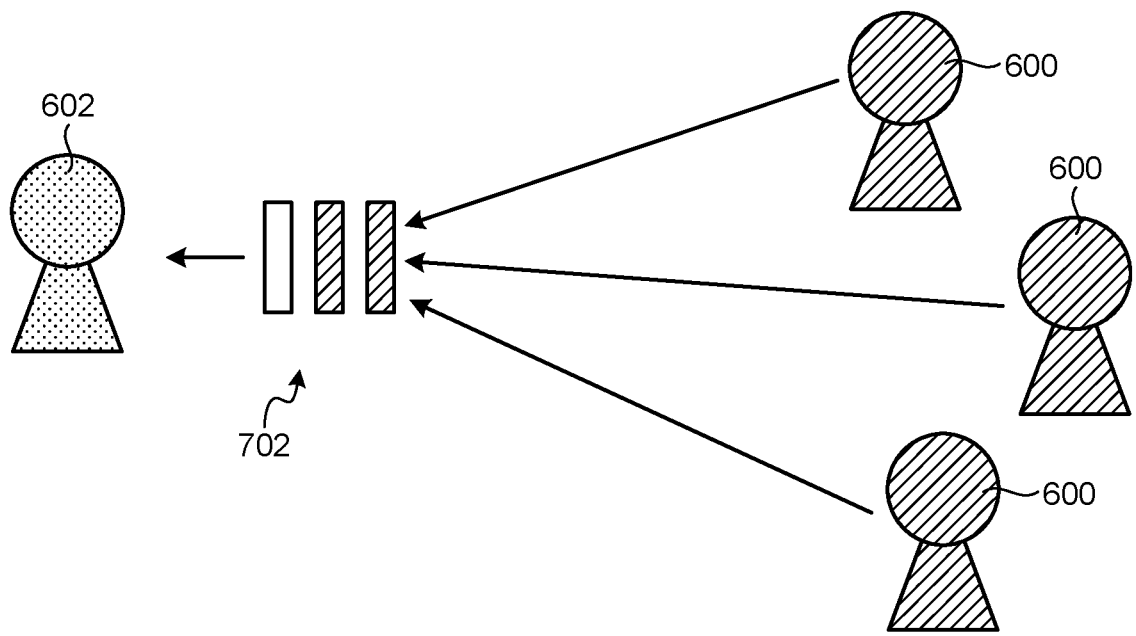
FIG. 17 is an explanatory diagram (No. 2) for explaining the third embodiment of the present disclosure.

For example, in the embodiment, as illustrated in FIG. 17, in a case where a plurality of viewers 600 sends a plurality of control commands 702 (or, stamps 700), the server 200 temporarily stores the control commands 702, sequentially performs processing in the order that the control commands 702 have been inputted (predetermined rule), generates a tactile control signal, and sends the tactile control signal to the tactile presentation device 100. In the embodiment, in a case where the plurality of viewers 600 sends the plurality of control commands 702, the server 200 may temporarily stop acquiring the plurality of control commands 702 and sequentially acquire the control commands 702 in the order that the control commands 702 have been inputted. In such a case, as illustrated in FIG. 16, the server 200 may display, for the viewer 600 waiting for his/her turn, a display 818 for notifying the viewer 600 about how long it will take for the viewer 600 to have his/her turn via the display unit 302 of the user terminal 300.

As described above, in the embodiment, since the tactile stimuli are sequentially presented to the artist 602, the artist 602 can avoid experiencing discomfort, and since the tactile stimuli can be individually perceived, action can be taken for each tactile stimulus.

Figure 18:
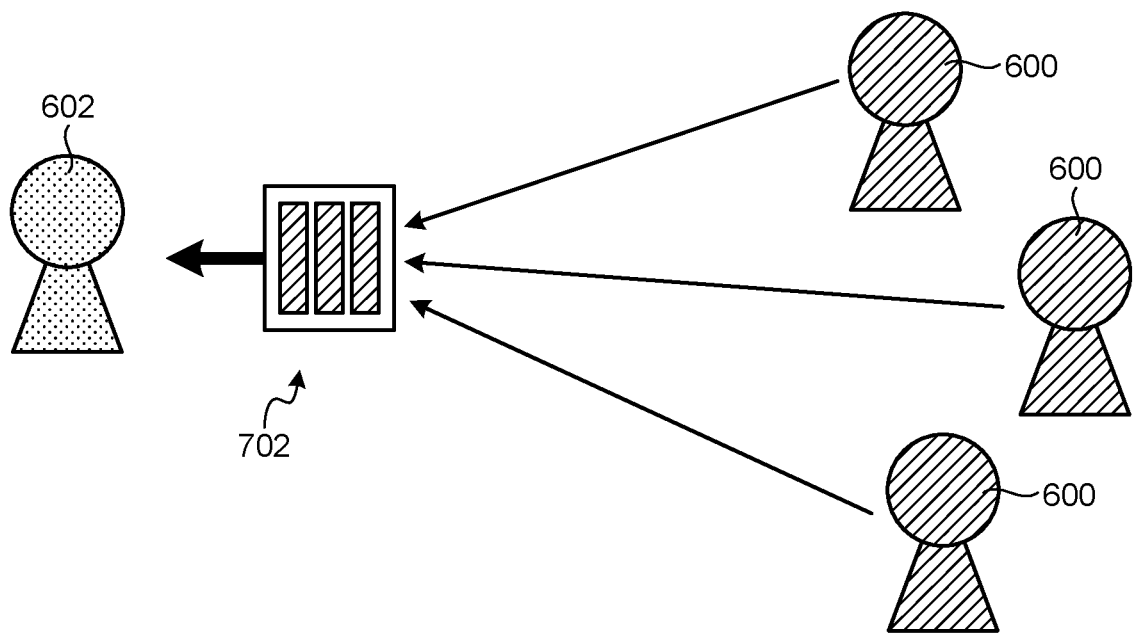
FIG. 18 is an explanatory diagram (No. 3) for explaining the third embodiment of the present disclosure.

Furthermore, in the embodiment, as illustrated in FIG. 18, in a case where a plurality of control commands 702 (or, stamps 700) is acquired within a predetermined time, the server 200 may adjust, for example, the intensity of the tactile stimulus or the like according to the number of control commands 702 acquired, generate a tactile control signal as one tactile stimulus, and send the tactile control signal to the tactile presentation device 100. For example, the server 200 increases the intensity of the tactile stimulus as the number of identical control commands 702 acquired (for example, identical in perceptual location, waveform type, and so on) increases. In addition to simply increasing the intensity in accordance with the number of control commands 702 acquired, an upper limit of the intensity may be set or the intensity may be processed by subtraction in consideration of the burden on the artist 602 or the like.

Furthermore, in the embodiment, the server 200 may change the waveform of the tactile stimulus, may adjust the presentation time, or may adjust the perceptual location according to the number of acquired control commands 702, and the present disclosure is not particularly limited to this example. Furthermore, in the embodiment, on the basis of the perceptual locations designated in the control commands 702 continuously acquired for example, the perceptual location may be adjusted to one perceptual location and a tactile control signal as one tactile stimulus may be generated. More specifically, in a case where the right shoulder and the left shoulder are designated as the perceptual locations in the control commands 702 continuously acquired, the server 200 sets a neck line between the right shoulder and the left shoulder as the perceptual location in the generated tactile control signal.

Figure 19:
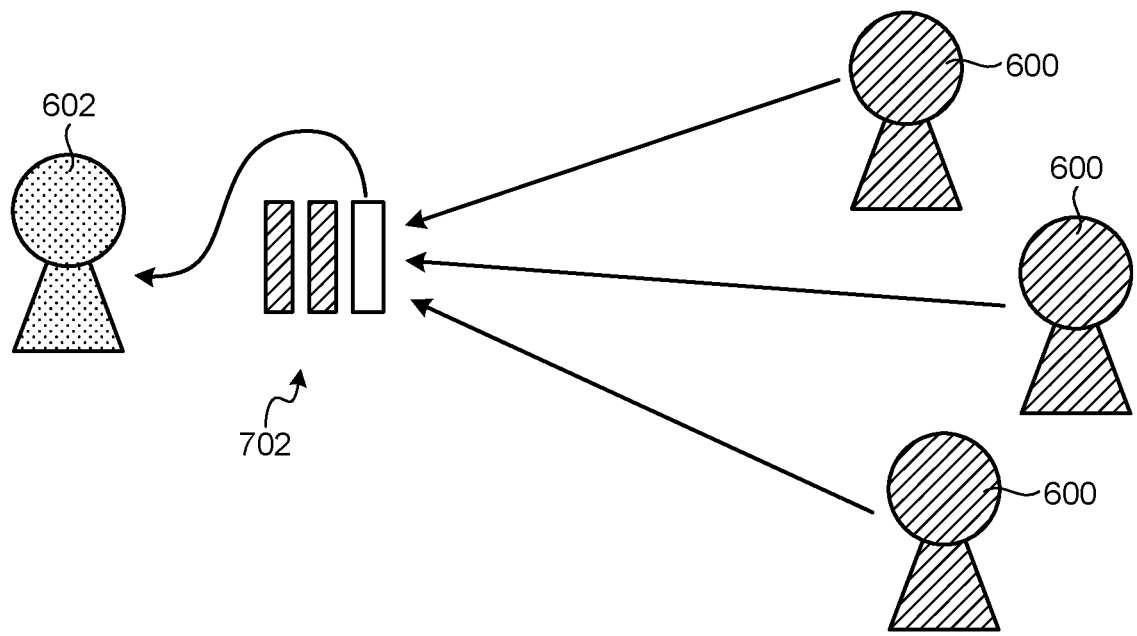
FIG. 19 is an explanatory diagram (No. 4) for explaining the third embodiment of the present disclosure.

Furthermore, in the embodiment, as illustrated in FIG. 19, the server 200 may perform the processing in the order according to the amount paid by the viewer 600 at the time of input of the control command 702 (or, stamp 700) (predetermined rule). For example, the server 200 prioritizes a control command 702 with a high amount paid at the time of input of the control command 702. That is, since the viewer 600 purchases priority of interaction with the artist 602, the viewer 600 who intends to early interact with the artist 602 pays more money. In other words, this order of processing can motivate the viewer 600 to pay more money.

Figure 20:
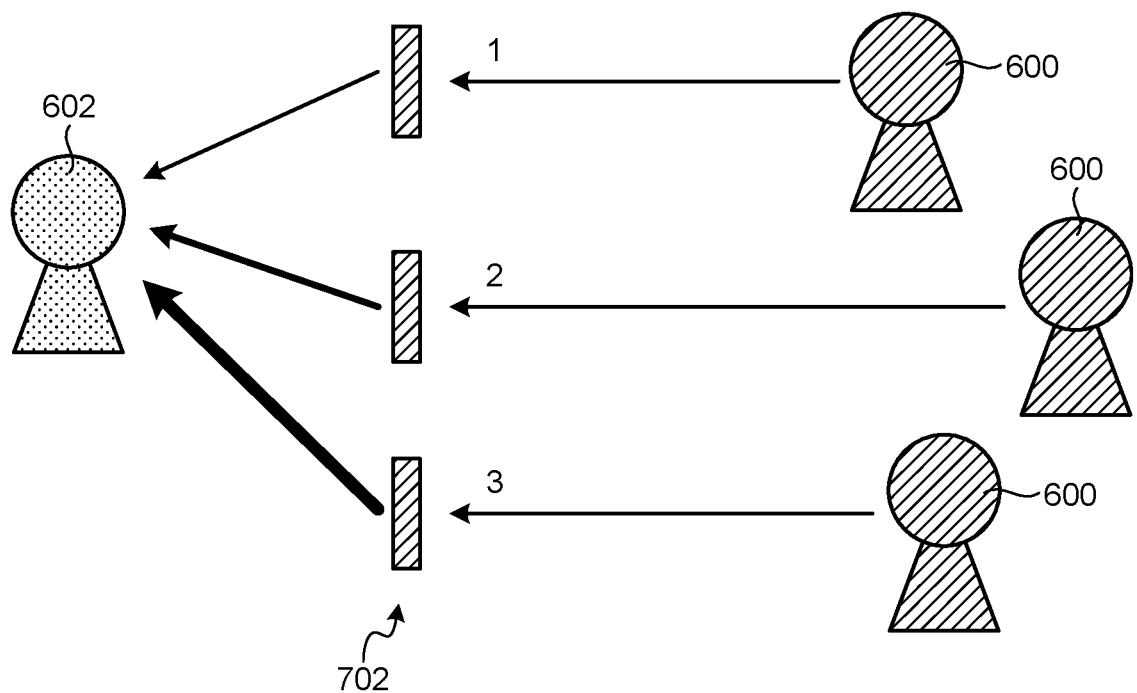
FIG. 20 is an explanatory diagram (No. 5) for explaining the third embodiment of the present disclosure.

Furthermore, in the embodiment, as illustrated in FIG. 20, in a case where a plurality of identical control commands 702 (or, stamps 700) is acquired within a predetermined time, the server 200 may increase, for example, the intensity of presentation of the tactile stimulus sequentially according to the order of the control commands 702 acquired. In this way, collaboration, or interaction, between the plurality of viewers 600 can be encouraged, resulting in acquiring higher value-added experiences.

Furthermore, in the embodiment, the server 200 may adjust the tactile stimulus according to the synchronicity of the transmission of the plurality of control commands 702 (or, stamps 700) of the plurality of viewers 600. More specifically, in a case where the control commands 702 having the same content are synchronously sent from different viewers 600 (so-called execution of "mission" by the plurality of viewers 600), the server 200 may adjust the intensity of the tactile stimulus according to the degree of synchronicity. Furthermore, in the embodiment, the server 200 may generate and send the tactile control signal only in a case where the number of control commands 702 having the same content acquired from different viewers 600 exceeds a predetermined number (predetermined condition). Alternatively, the server 200 may generate and send the tactile control signal only in a case where the type of the plurality of control commands 702 acquired from different viewers 600 is of a predetermined type.

Furthermore, in the embodiment, in a case where control commands 702 (or, stamps 700) for designating a plurality of identical perceptual locations are continuously acquired within a predetermined time, and where the control commands 702 are directly presented as-is to the artist 602 as a plurality of tactile stimuli, the artist 602 may experience discomfort due to the plurality of tactile stimuli. In view of this, in the embodiment, the server 200 (specifically, the viewer side input unit 214) may receive and process only a control command 702 that designates a perceptual location away, by a predetermined distance, from the perceptual location presented immediately before.

Furthermore, in the embodiment, for example, in a case where a plurality of viewers 600 sends a plurality of control commands 702 (or, stamps 700), the server 200 basically acquires the control commands 702 sequentially in the order that the control commands 702 have been inputted; however, in a case where the amount of the control command 702 to be acquired next (amount paid at the time of input of the control command 702) is equal to or more than a predetermined amount, the server 200 may stop the processing on the control command 702 acquired before on the way, and preferentially process the next control command 702 that is equal to or more than the predetermined amount. Alternatively, in the embodiment, in a case where a plurality of viewers 600 sends a plurality of control commands 702 (or, stamps 700), the server 200 basically acquires the control commands 702 sequentially in the order that the control commands 702 have been inputted; however, the server 200 may compare the amount of the previous control command 702 with the amount of the next control command 702, and, in a case where the amount of the next control command 702 is equal to or lower than the amount of the previous control command 702, the server 200 may proceed with the processing of the previous control command 702.

Furthermore, in the embodiment, in a case where the amount of the next control command 702 is higher than that of the previous control command 702, the server 200 may stop the processing of the control command 702 previously obtained on the way, and preferentially process the next control command 702. In addition, in the embodiment, in a case where, during the processing of the next control command 702, a control command 702 that is more expensive than the next control command 702 (control command 702 after the next control command 702) is sent, the server 200 may stop the processing of the next control command 702 on the way, and preferentially process the control command 702 after the next control command 702.

5. Fourth Embodiment

Furthermore, in the fourth embodiment of the present disclosure, the price of the stamp 700 with tactile stimulus effect may be dynamically determined according to the contact rate between the tactile presentation device 100 and the body of the artist 602, the perceptual location, the attribute information of the viewer 600 or the artist 602, and the like. In the embodiment, the price of the stamp 700 is determined according to the value of the experience felt by the viewer 600 due to the determination of the price of the stamp 700 in accordance with such conditions, which can convince and satisfy the viewer 600 of the purchase of the stamp 700.

5.1 Detailed Configuration of Server 200a

Figure 21:
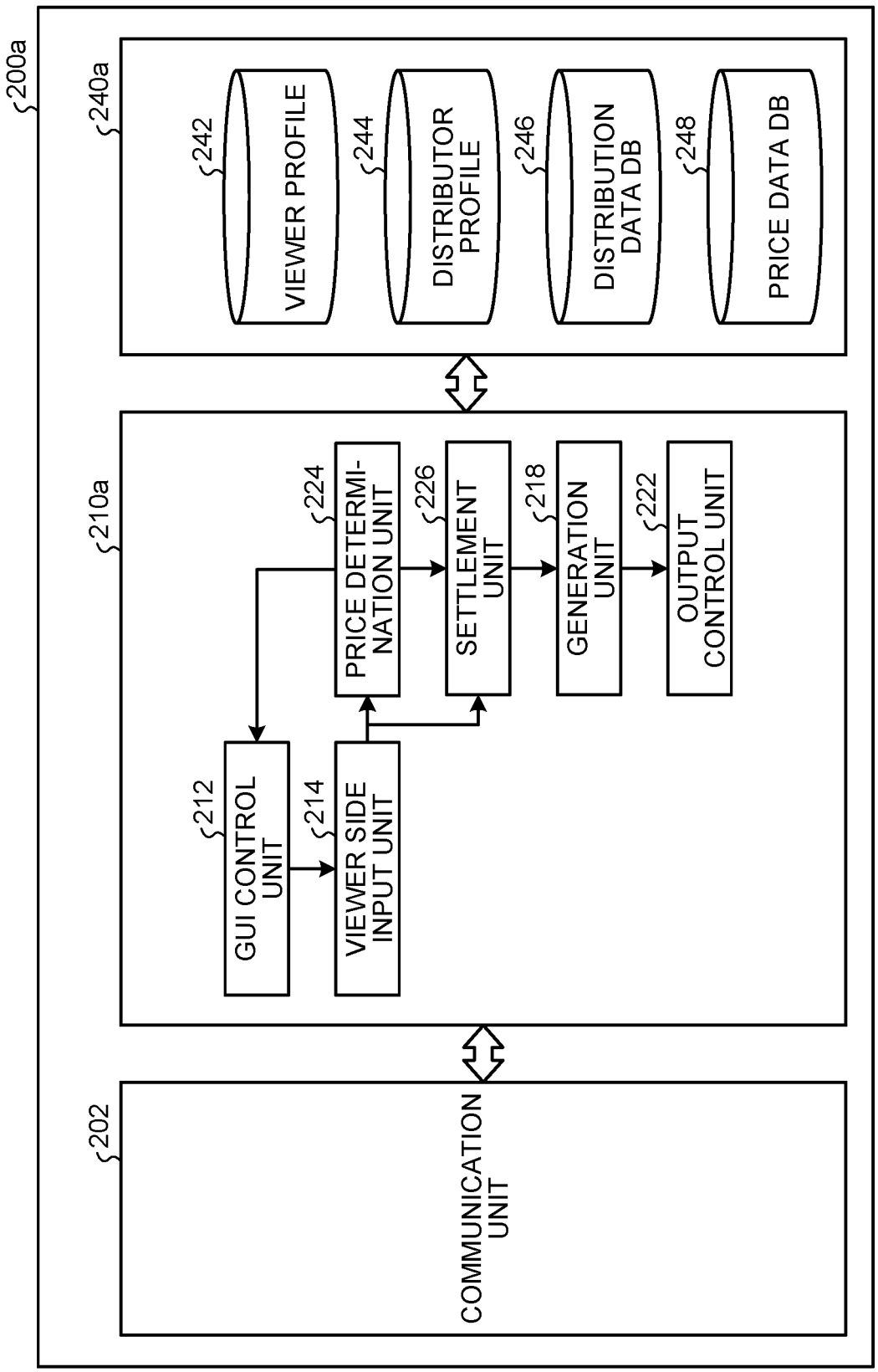
FIG. 21 is a diagram illustrating an example of the functional configuration of a server 200a according to a fourth embodiment of the present disclosure.

First, an example of the detailed configuration of the server 200a according to the embodiment is described with reference to FIG. 21. FIG. 21 is a diagram illustrating an example of the functional configuration of the server 200a according to the embodiment. As illustrated in FIG. 21, the server 200a mainly includes the communication unit 202, a control unit 210a, and a storage unit 240a as with the first embodiment. The individual functional blocks of the server 200a are sequentially described below; however, since the communication unit 202 is common to that of the first embodiment, the description thereof is omitted here.

(Control Unit 210a)

The control unit 210a is a controller, and as illustrated in FIG. 21, the control unit 210a includes the GUI control unit 212, the viewer side input unit 214, the distributor side input unit 216 (not illustrated in FIG. 21), the generation unit 218, and the output control unit (first distribution unit) 222 as with the first embodiment, and further includes a price determination unit 224 and a settlement unit 226. Note that, since the GUI control unit 212, the viewer side input unit 214, the distributor side input unit 216, the generation unit 218, and the output control unit 222 are common to those of the first embodiment, the description thereof is omitted here, and only the price determination unit 224 and the settlement unit 226 are described.

Price Determination Unit 224

The price determination unit 224 determines a price of the stamp 700 (or, for the input of the control command 702) on the basis of the positional information and the mode information included in the control command 702 correlated with the stamp 700 acquired, the contact rate between the body of the artist 602 and the tactile presentation device 100 acquired from the distributor side input unit 216 (not illustrated in FIG. 21), or the attribute information of the viewer 600 or the artist 602 acquired from the storage unit 240a. At this time, the price determination unit 224 may determine the price with reference to information in a price data DB 248 stored in the storage unit 240a described later.

Settlement Unit 226

For example, in a case where the settlement unit 226 receives a settlement command from the user terminal 300 via the communication unit 202, the settlement unit 226 makes a settlement related to the purchase of the stamp 700 (or, for the input of the control command 702) on the basis of the price determined by the price determination unit 224.

(Storage Unit 240a)

As illustrated in FIG. 21, the storage unit 240a includes the viewer profile 242, the distributor profile 244, and the distribution data DB 246 as with the first embodiment, and further includes the price data DB 248 for storing information used to determine a price of the stamp 700 (or, for the input of the control command 702).

Although the example of the detailed configuration of the server 200a according to the embodiment has been specifically described above, the detailed configuration of the server 200a according to the embodiment is not limited to the example illustrated in FIG. 21, and, for example, the server 200a may further include the determination unit 220 as with the first embodiment.

5.2 Information Processing Method

Figure 22:
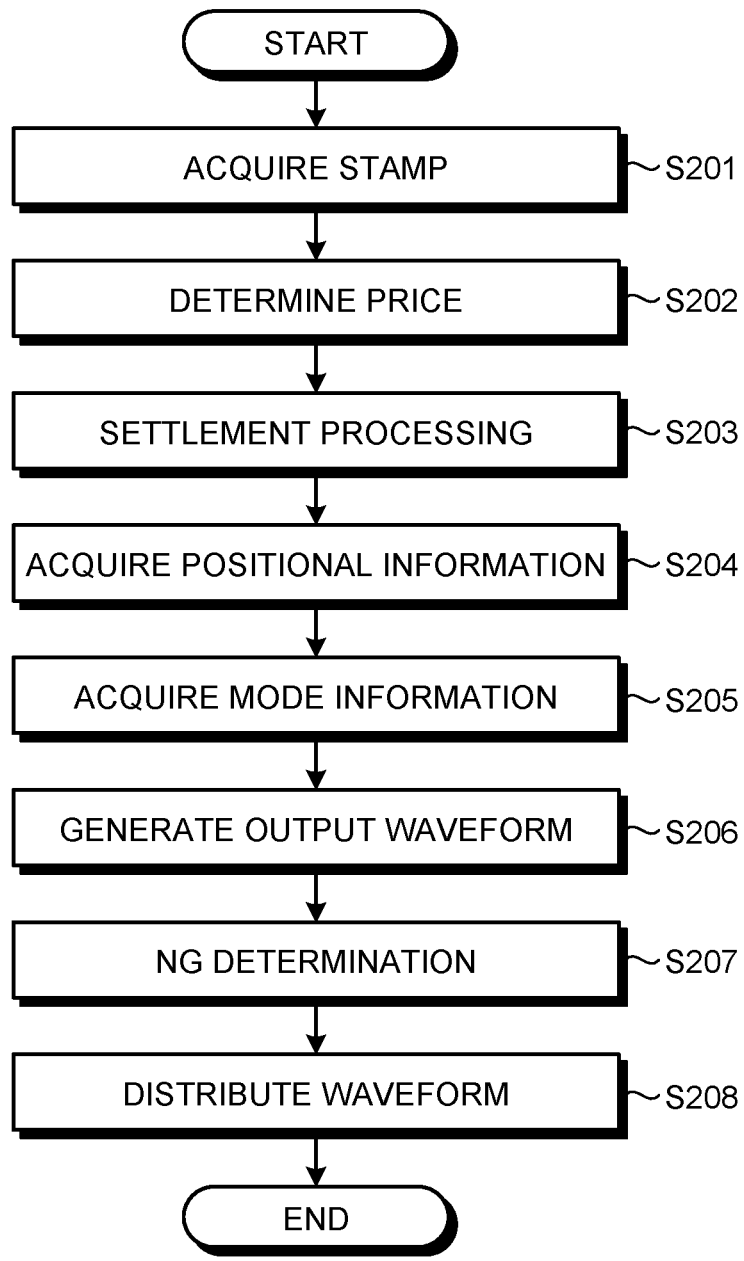
FIG. 22 is a flowchart depicting an example of an information processing method according to the fourth embodiment of the present disclosure.

The server 200a according to the embodiment is described above. Next, an example of the information processing method according to the embodiment is described with reference to FIG. 22. FIG. 22 is a flowchart of an example of an information processing method according to the embodiment. As illustrated in FIG. 22, the information processing method according to the embodiment includes a plurality of steps from Step S201 to Step S208. The details of the steps included in the information processing method according to the embodiment are described below.

First, the viewer 600 selects one stamp 700 with tactile stimulus effect from the stamps 700 with tactile stimulus effect displayed on the display unit 302 of the user terminal 300, and sends the selected stamp 700 to the server 200a. The server 200a then acquires information on the stamp 700 with tactile stimulus effect that is sent from the user terminal 300, selected by the viewer 600, and is correlated with the control command 702 (Step S201) as with Step S101 of the first embodiment.

Next, the server 200a refers to the information of the price data DB 248, and determines the price of the stamp 700 in accordance with the positional information and the mode information included in the control command 702 acquired, the contact rate between the tactile presentation device 100 and the body of the artist 602, or the attribute information of the viewer 600 or the artist 602 (Step S202). Details of the determination of the price are described later as an example.

Then, in a case where a settlement command is received from the user terminal 300, the server 200a makes a settlement related to the purchase of the stamp 700 on the basis of the price determined in Step S202 (Step S203). At this time, the server 200a preferably notifies the viewer 600 of the availability of the settlement processing.

Next, the server 200a performs the processing from Step S204 to Step S208, which is similar to Step S102 to Step S106 in the first embodiment illustrated in FIG. 8, and thus the description thereof is omitted here. Note that, in the embodiment, the settlement processing in Step S203 may be performed only in a case where Step S207 (NG determination) of FIG. 22 is performed and it is determined that the generated tactile control signal is to be sent to the tactile presentation device 100, that is, the steps may not be performed in the order illustrated in FIG. 22.

5.3 Example

Figure 23:
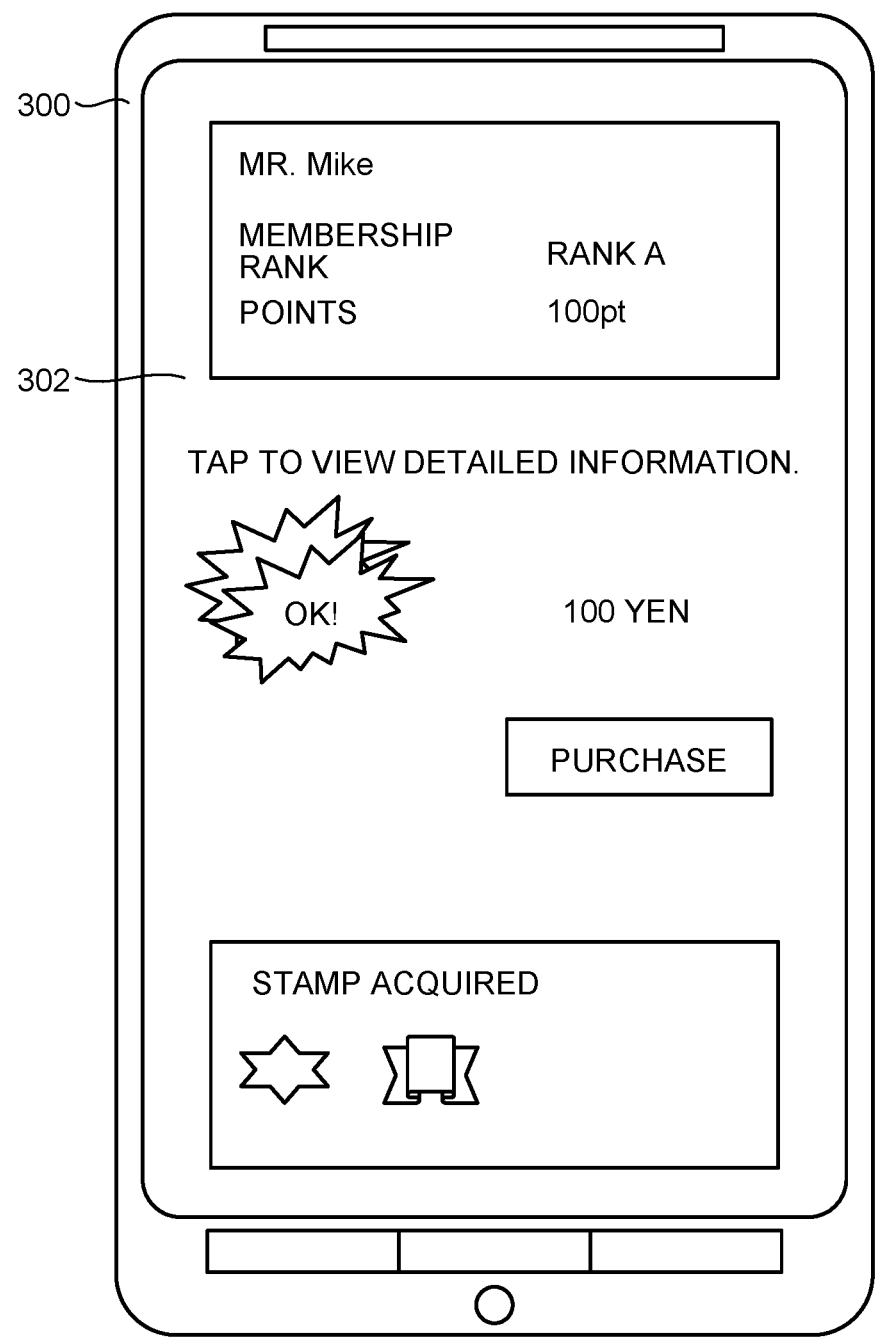
FIG. 23 is an explanatory diagram (No. 1) for explaining a display example according to an example of the fourth embodiment of the present disclosure.
Figure 24:
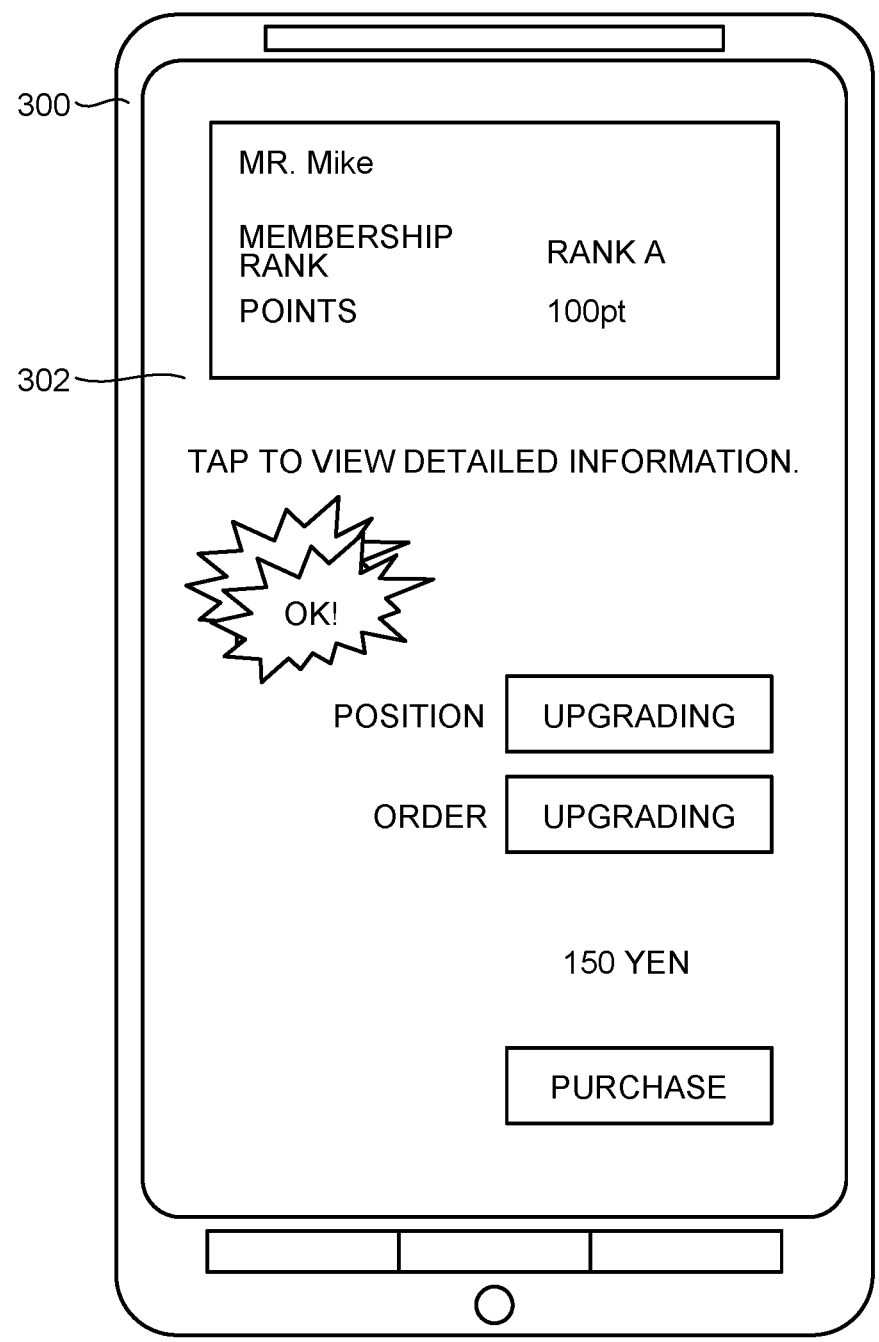
FIG. 24 is an explanatory diagram (No. 2) for explaining a display example according to an example of the fourth embodiment of the present disclosure.
Figure 25:
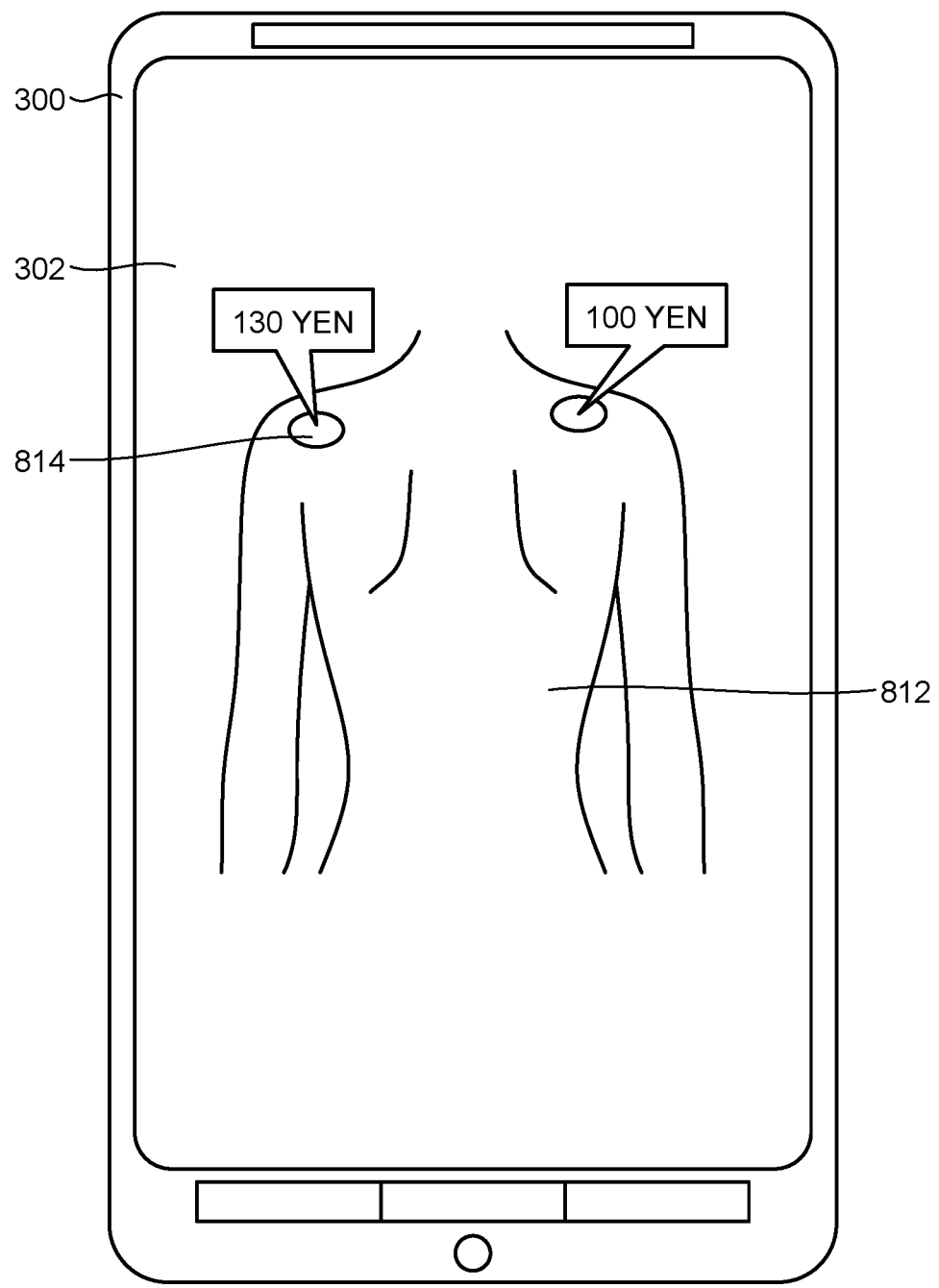
FIG. 25 is an explanatory diagram (No. 3) for explaining a display example according to an example of the fourth embodiment of the present disclosure.

The embodiment is described above. Next, an example of the embodiment is described more specifically with reference to FIGS. 23 to 25, illustrating specific examples. FIGS. 23 to 25 are explanatory diagrams for explaining a display example according to an example of the embodiment. Note that the following examples are merely examples of the embodiment, and the embodiment is not limited to the following examples.

Example 1

Meanwhile, depending on the body shape of the artist 602, contact between the tactile stimulus unit 106 of the tactile presentation device 100 and the body of the artist 602 may be poor, and the tactile stimulus may not be presented as intended by the viewer 600. Then, in a case where a tactile stimulus that is presented as intended and a tactile stimulus that is not presented as intended are set at a uniform price, it may cause a feeling of unfairness to the viewer 600. In view of this, in the example, in order to avoid such unfairness, a tactile stimulus that is presented as intended and a tactile stimulus that is not presented as intended are set at different prices. Specifically, in the example, the server 200a determines the price of the stamp 700 (or, for the input of the control command 702) on the basis of sensing data of a worn state detection sensor for detecting a worn state (for example, a zipper-type sensor, a pressure sensor, or the like) (not illustrated) of the tactile presentation device 100. For example, in a case where the control command 702 correlated with the selected stamp 700 includes a command to use the tactile stimulus unit 106 having a high contact rate with the body of the artist 602, the server 200a sets the price of the stamp 700 higher. On the other hand, in a case where the control command 702 includes a command to use the tactile stimulus unit 106 having a low contact rate with the body of the artist 602, the server 200a sets the price of the stamp 700 lower. It is assumed that, in the example, the sensing data of the worn state detection sensor can be imported into the server 200a, for example, with detection that the artist 602 has worn the tactile presentation device 100 used as a trigger.

Example 2

In the example, since each artist 602 has a perceptual location with high perceptual sensitivity to a tactile stimulus and a perceptual location with low perceptual sensitivity to a tactile stimulus, the server 200a determines the price of the stamp 700 for the tactile stimulus presented at each perceptual location according to the difference in perceptual sensitivity for each perceptual location. For example, in a case where the control command 702 correlated with the selected stamp 700 includes a command to use the tactile stimulus unit 106 that is present at a perceptual location with high perceptual sensitivity, the server 200a sets the price of the stamp 700 higher. On the other hand, in a case where the control command 702 includes a command to use the tactile stimulus unit 106 that is present at a perceptual location with low perceptual sensitivity, the server 200a sets the price of the stamp 700 lower. In view of this, in the example, the server 200a stores an index or the like indicating the perceptual sensitivity for each perceptual location of the artist 602 as the distributor profile 244, and determines the price of the stamp 700 (or, for the input of the control command 702) on the basis of the index stored. Furthermore, the example is not limited to the determination of the price according to the perceptual sensitivity, and for example, the price may be determined according to popularity (which can be estimated on the basis of the frequency of selection or the like) among the viewer 600 or the artist 602 for the stamp 700 or the tactile stimulus (waveform, perceptual location, etc.), and the present disclosure is not particularly limited to this example.

Example 3

In the example, the server 200a determines the price of the stamp 700 (or, for the input of the control command 702) according to the attribute information (for example, a purchase record, a membership rank, a membership course, and the like) of the viewer 600. For example, in the example, the server 200a stores, as the viewer profile 242, the amount of money that the viewer 600 has paid so far for the purchase of the stamp 700 in correlation with the identification information of the viewer 600, and determines the price of the stamp 700 (or, for the input of the control command 702) newly purchased by the viewer 600 on the basis of the total amount stored. In the example, the server 200a may, for example, set the purchase price of the stamp 700 lower the more money the viewer 600 has paid so far, or alternatively, may set the purchase price of the stamp 700 higher the more money the viewer 600 has paid so far. Furthermore, the example is not limited to the determination of the price according to the amount purchased so far, and for example, the price may be determined according to a membership rank that is set according to the amount purchased so far, or a membership course (e.g., trial course, new membership course, advanced course, and the like) to which the viewer 600 subscribes before purchasing the stamp, and the present disclosure is not particularly limited to this example. At this time, the server 200a may display, on the display unit 302 of the user terminal 300, a screen as illustrated in FIG. 23 as the selection screen of the stamp 700. The screen shows, for example, the price of the stamp 700, the membership rank of the viewer 600, and purchase points given to the viewer 600 according to his/her purchase record.

Furthermore, in the example, the range of the waveform type, intensity, perceptual location, and the like of the tactile stimulus selectable by the viewer 600 may be determined according to not only the price but also the attribute information (e.g., purchase record, membership rank, membership course, and the like) of the viewer 600. For example, the server 200a sets the upper limit of selectable tactile stimulus larger the more money the viewer 600 has paid so far. Furthermore, in the example, the server 200a may set to give priority to the order in which the stamp 700 can be sent according to not only the selectable range but also the attribute information of the viewer 600. For example, the server 200a gives priority to the order in which the stamp 700 can be sent as the amount of money paid by the viewer 600 so far is larger. At this time, the server 200a may display, on the display unit 302 of the user terminal 300, a screen as illustrated in FIG. 24 as the selection screen of the stamp 700. On the screen, for example, buttons for upgrading the position and the order are displayed, and for example, in a case where the viewer 600 performs an operation on the button for upgrading the position, the screen transitions to a position selection screen as illustrated in FIG. 25. On the position selection screen, the human body model display 812 is shown, and on the human body model display 812, a region 814 corresponding to the tactile stimulus unit 106 selectable by the viewer 600 is shown, and the price thereof is also displayed. The viewer 600 can select a desired tactile location by performing an operation on the region 814 while checking the price on the position selection screen. In the example described above, it is possible to provide a mechanism for preferentially treating the viewer 600 who has purchased a large amount of stamps 700 or has paid a large amount of money for example, which can further motivate the viewer 600 to purchase the stamp 700.

6. Fifth Embodiment

Furthermore, in the embodiment, the stamp 700 with tactile stimulus effect can be exchanged among the plurality of viewers 600 or collected by the viewer 600, which can further motivate the viewer 600 to purchase the stamp 700.

Specifically, in the embodiment, for example, during streaming of performance video of the artist 602, the selection screen for the stamp 700 with tactile stimulus effect or the stamp 700 itself is automatically distributed to the user terminal 300 of the viewer 600. The viewer 600 is then encouraged to send the stamp 700 to the artist 602 during streaming. Furthermore, it is possible to distribute, to the viewer 600, a valuable stamp 700 with tactile stimulus effect which is not normally distributed (so-called "rare stamp"), which means limiting the location and the date and time of the distribution (e.g., limiting to the date and time when the artist is performing at a live concert venue). In this way, the viewers 600 visit a live concert venue, for example, in order to obtain rare and valuable stamps 700, which improves the ability of the live concert venue to attract customers. Note that, only during streaming, the viewer 600 may be able to automatically acquire the rare stamp by communication connection or may be able to acquire the rare stamp by performing processing such as purchase procedure, and the present disclosure is not particularly limited to this example.

Furthermore, the stamps 700 with tactile stimulus effect acquired via such a stamp selection screen may be exchanged among the plurality of viewers 600 via a social networking service (SNS), or the number and types of collected stamps 700 may be published as ranking. For example, in the embodiment, the server 200 stores, as the viewer profile 242, information on the stamps 700 acquired by the viewer 600 so far in correlation with the identification information of the viewer 600. Furthermore, in the embodiment, in a case where a predetermined type of stamp 700 with tactile stimulus effect can be collected (in a case where a predetermined condition is satisfied), the server 200 may give a new stamp 700 with tactile stimulus effect (e.g., "rare stamp") to the viewer 600. In this way, the viewer 600 collects and purchases a predetermined type of stamp in order to obtain a valuable stamp 700, which can further motivate the viewer 600 to purchase the stamp 700.

7. Sixth Embodiment

Furthermore, in the embodiment, it is possible to further motivate the viewer 600 to purchase a stamp 700 with tactile stimulus effect by adding a game element.

7.1 Detailed Configuration of Server 200b

Figure 26:
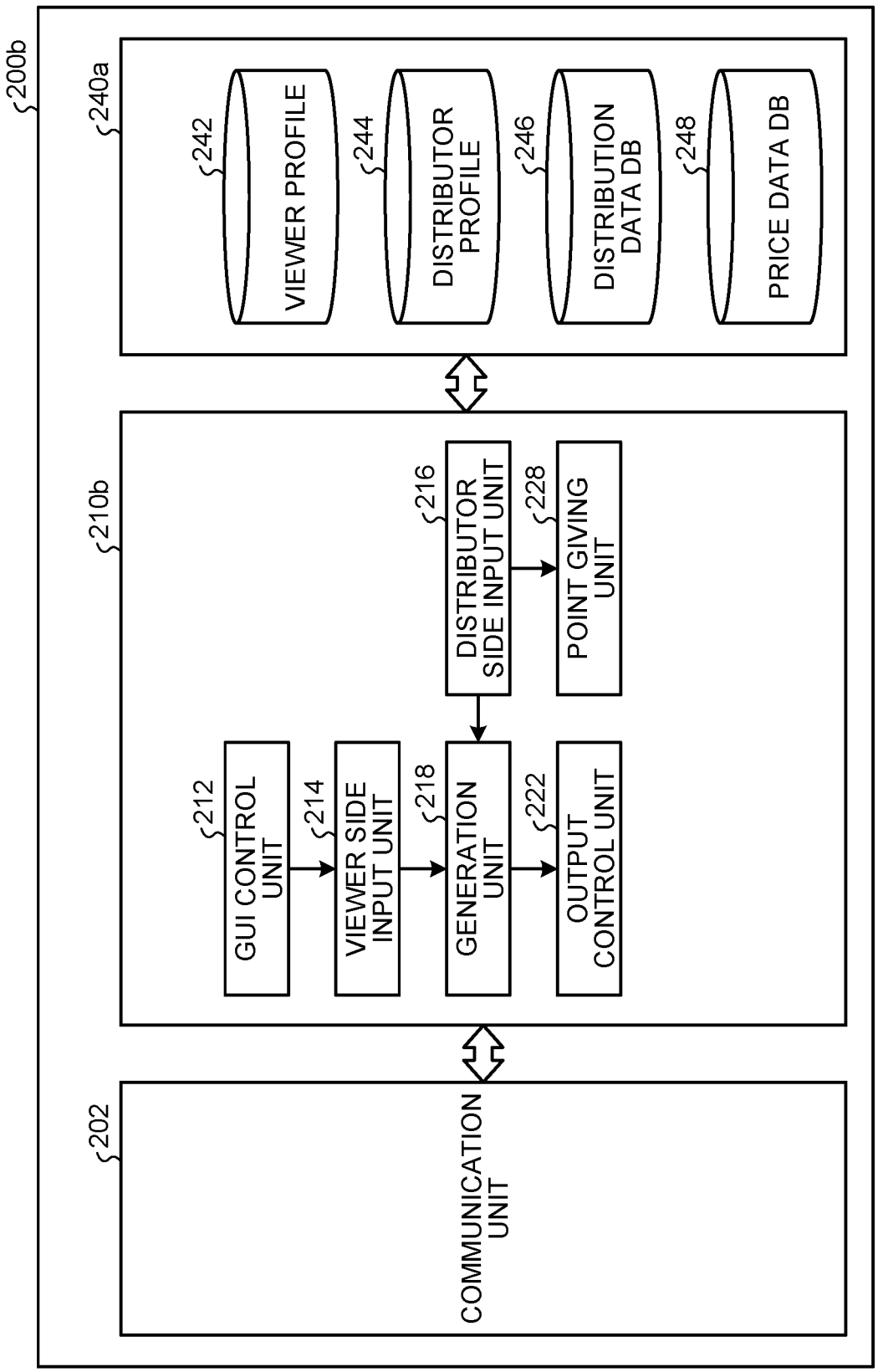
FIG. 26 is a diagram illustrating an example of the functional configuration of a server 200b according to a sixth embodiment of the present disclosure.

First, the detailed configuration of the server 200b according to the embodiment is described with reference to FIG. 26. FIG. 26 is a diagram illustrating an example of the functional configuration of the server 200b according to the embodiment. As illustrated in FIG. 26, the server 200b mainly includes the communication unit 202, a control unit 210b, and the storage unit 240a as with the first and fourth embodiments. The individual functional blocks of the server 200b are sequentially described below; however, since the communication unit 202 and the storage unit 240a are common to those of the first and fourth embodiments, the description thereof is omitted here.

(Control Unit 210b)

The control unit 210b is a controller, and as illustrated in FIG. 26, the control unit 210b includes the GUI control unit 212, the viewer side input unit 214, the distributor side input unit 216, the generation unit 218, and the output control unit (first distribution unit) 222 as with the first embodiment, and further includes a point giving unit 228. Note that, since the GUI control unit 212, the viewer side input unit 214, the distributor side input unit 216, the generation unit 218, and the output control unit 222 are common to those of the first embodiment, the description thereof is omitted, and only the point giving unit 228 is described below.

Point Giving Unit 228

The point giving unit 228 acquires an evaluation for the tactile stimulus that is inputted by the artist 602 who has perceived the tactile stimulus via the distributor side input unit 216, and grants a point to the viewer 600 according to the acquired evaluation. Note that the granted point is stored in the viewer profile 242 of the storage unit 240a in correlation with the identification information of the viewer 600.

7.2 Embodiment

Figure 27:
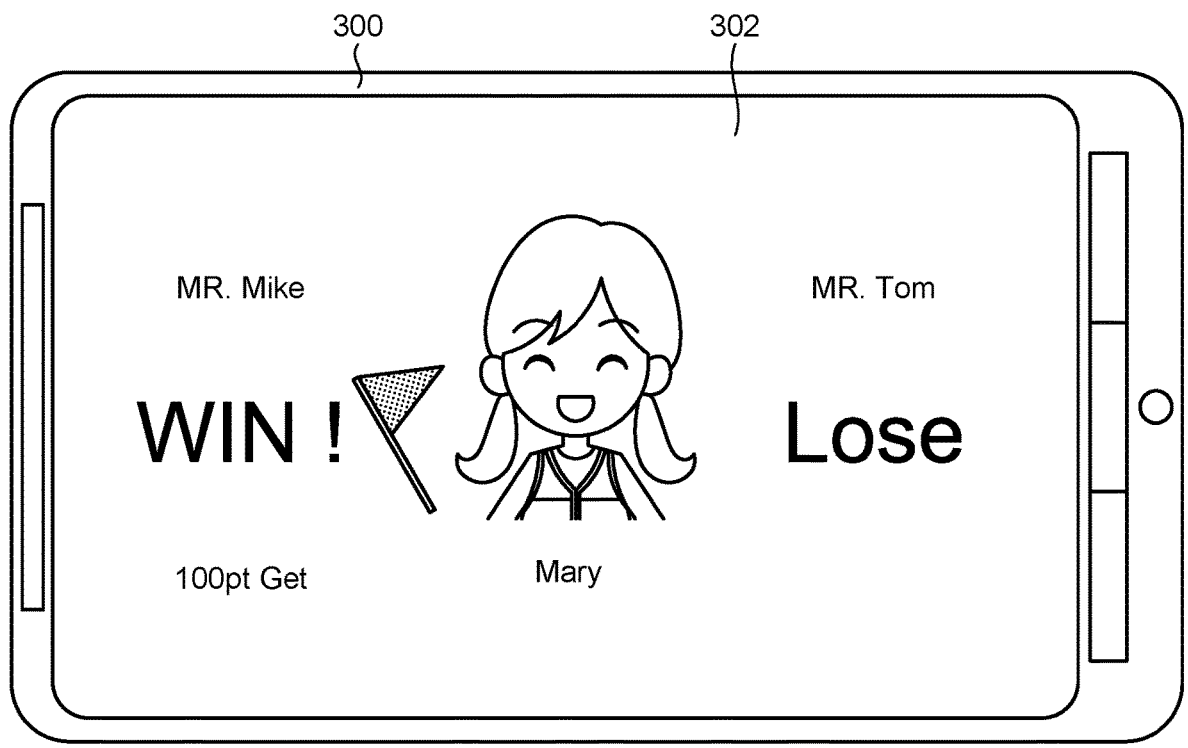
FIG. 27 is an explanatory diagram (No. 1) for explaining a display example according to the sixth embodiment of the present disclosure.
Figure 28:
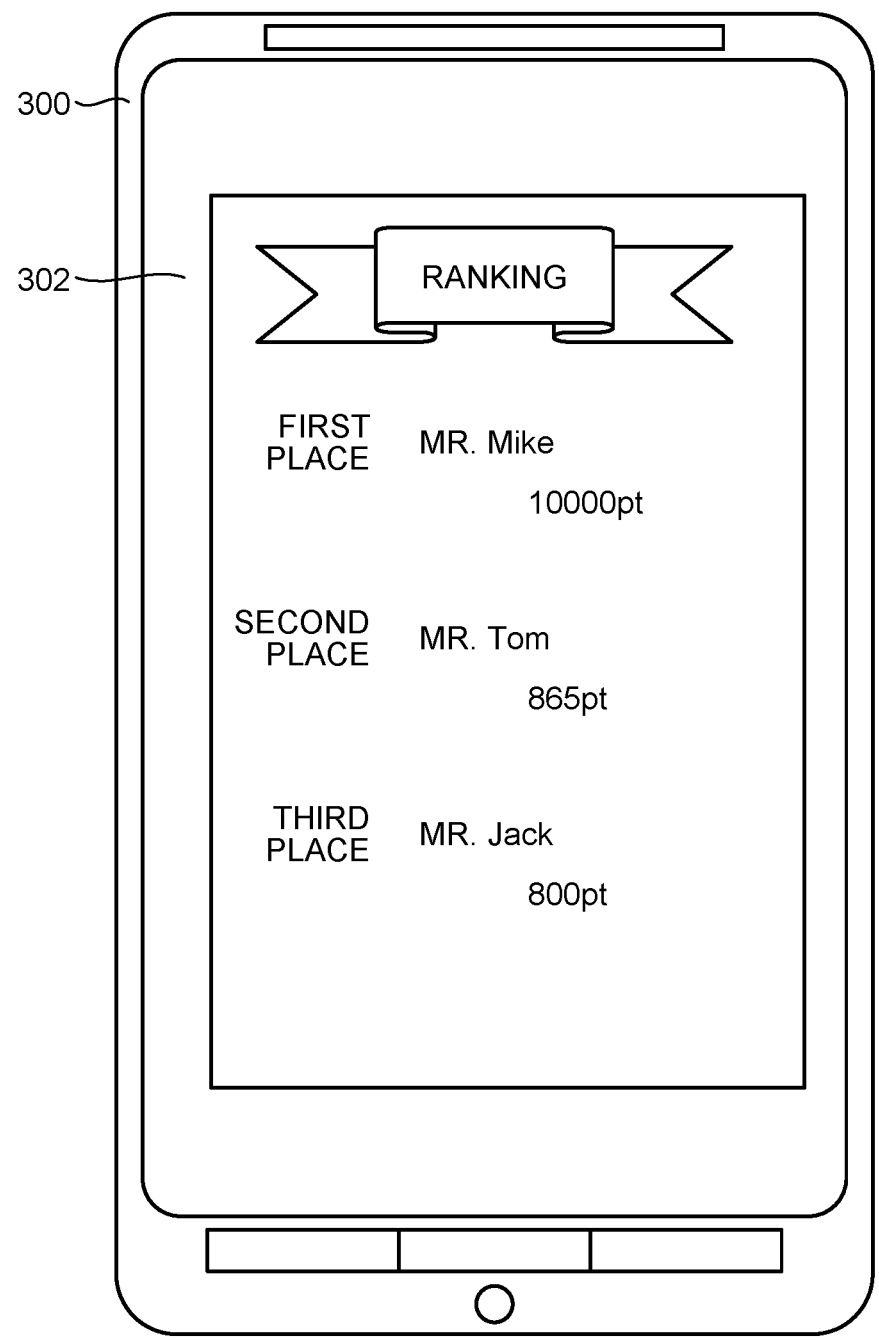
FIG. 28 is an explanatory diagram (No. 2) for explaining a display example according to the sixth embodiment of the present disclosure.

The server 200b according to the embodiment is described above. Next, the embodiment is described with reference to FIGS. 27 and 28. FIGS. 27 and 28 are explanatory diagrams for explaining a display example according to the embodiment.

Here, a game is assumed, for example, in which two viewers 600 throw (send) stamps 700 with tactile stimulus effect to one artist 602 and compete with each other for evaluation. First, the artist 602 evaluates tactile stimuli by the stamps 700 thrown, and the server 200b gives a point to each viewer 600 in accordance with the evaluation. The server 200b then may determine the win or lose of the two viewers 600 according to the number of points granted, and display, on the display unit 302 of the user terminal 300, a screen as illustrated in FIG. 27 as a screen indicating the win or lose result. Furthermore, as illustrated in FIG. 28, the server 200b may show, after a series of such matches, a ranking based on the total number of points granted to each viewer 600.

Furthermore, in the embodiment, the evaluation by the artist 602 is not limited to the one manually entered by the artist 602, and for example, may be an evaluation based on sensing data of a biometric information sensor (not illustrated) attached to the body of the artist 602. For example, the larger the increase in heart rate of the artist 602 caused by the tactile stimulus is, the higher evaluation is given. Note that, in the embodiment, the sensing data by the biometric information sensor of the artist 602 may be displayed on the user terminal 300, for example.

As described above, in the embodiment, it is possible to further motivate to purchase a stamp 700 with tactile stimulus effect by adding a game element.

7.3 Modification Example 1

Furthermore, in the embodiment, a game including the artist 602 can be so configured that, not only in a case where the viewer 600 throws the stamp 700 with tactile stimulus effect, but also in a case where the artist 602 performs a predetermined operation in response to the stamp 700 thrown, a tactile stimulus related to the stamp 700 is not presented. Hereinafter, a modification example related to such a game is described.

(Detailed Configuration of Server 200c)

Figure 29:
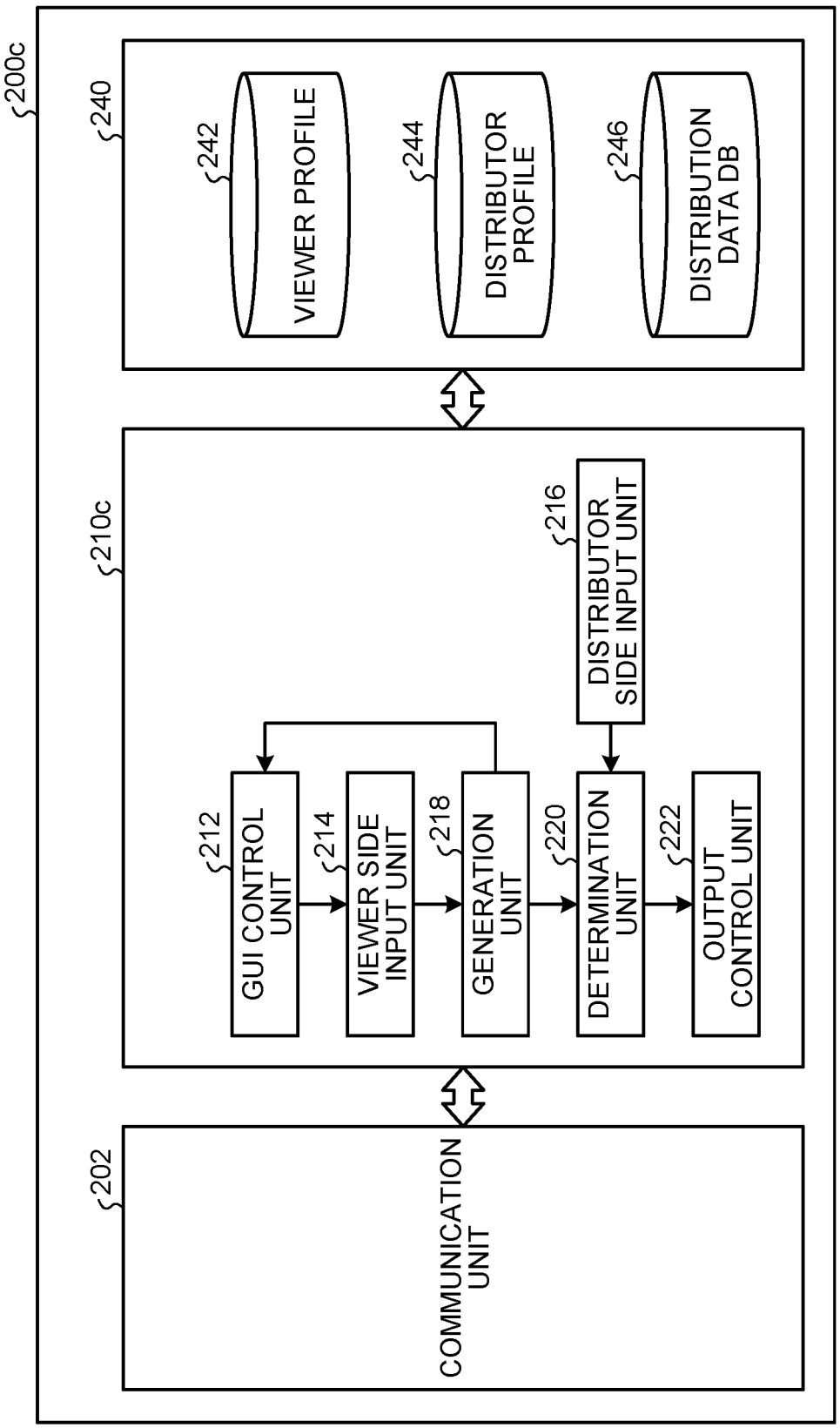
FIG. 29 is a diagram illustrating an example of the functional configuration of a server 200c according to a modification example to the sixth embodiment of the present disclosure.

First, the detailed configuration of the server 200c according to the modification example is described with reference to FIG. 29. FIG. 29 is a diagram illustrating an example of the functional configuration of the server 200c according to the modification example. As illustrated in FIG. 29, the server 200c mainly includes the communication unit 202, a control unit 210c, and the storage unit 240 as with the first embodiment. The individual functional blocks of the server 200c are sequentially described below; however, since the communication unit 202 and the storage unit 240 are common to those of the first embodiment, the description thereof is omitted and only the control unit 210c is described.

The control unit 210c is a controller, and as illustrated in FIG. 29, the control unit 210c includes the GUI control unit 212, the viewer side input unit 214, the distributor side input unit 216, the generation unit 218, the determination unit 220, and the output control unit (first distribution unit) 222 as with the first embodiment. Furthermore, in the modification example, the distributor side input unit 216 acquires, for example, sensing data and the like of various sensors of the tactile presentation device 100, and outputs the sensing data and the like to the determination unit 220.

(Information Processing Method)

Figure 30:
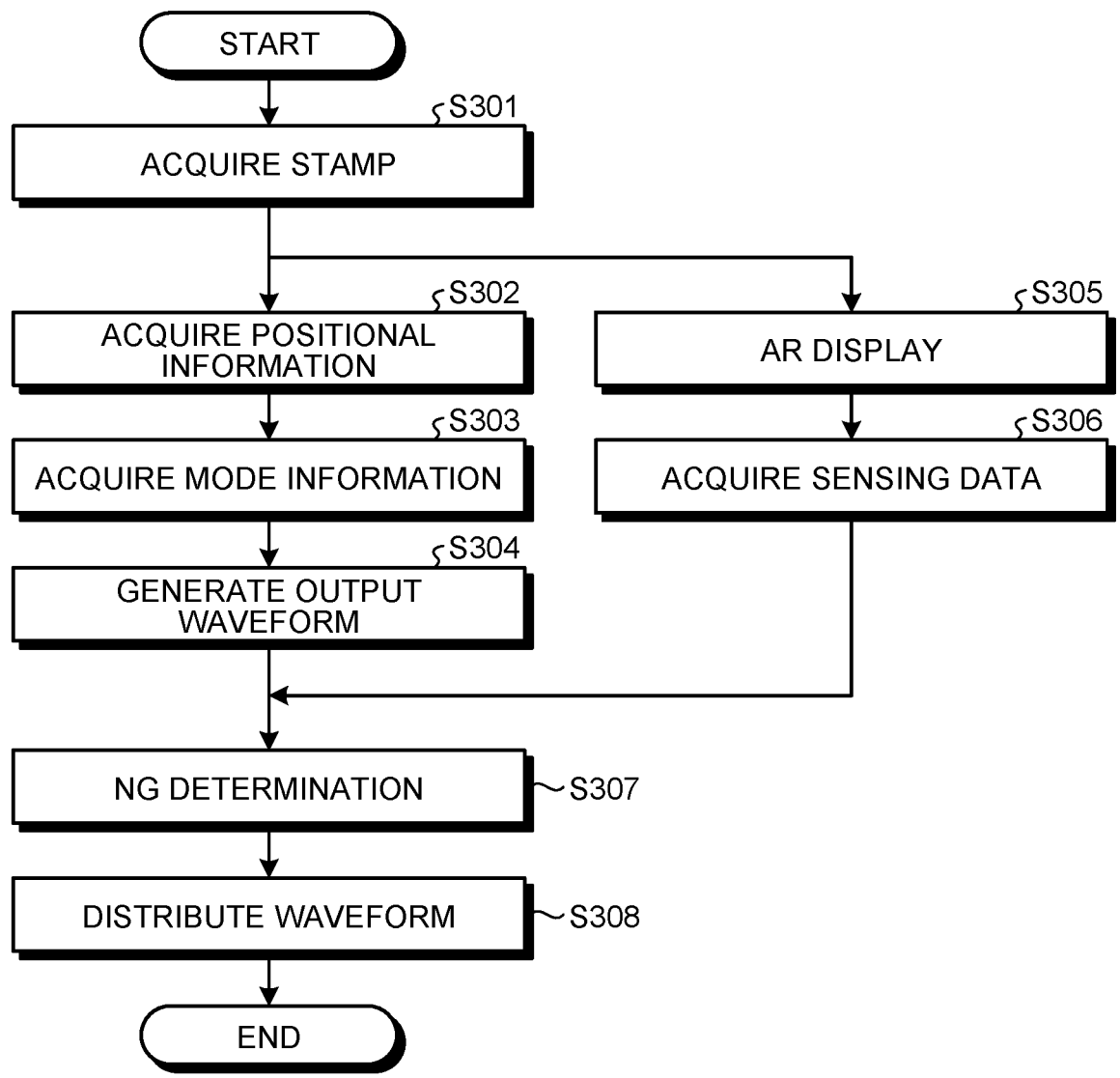
FIG. 30 is a flowchart depicting an example of an information processing method according to a modification example to the sixth embodiment of the present disclosure.
Figure 31:
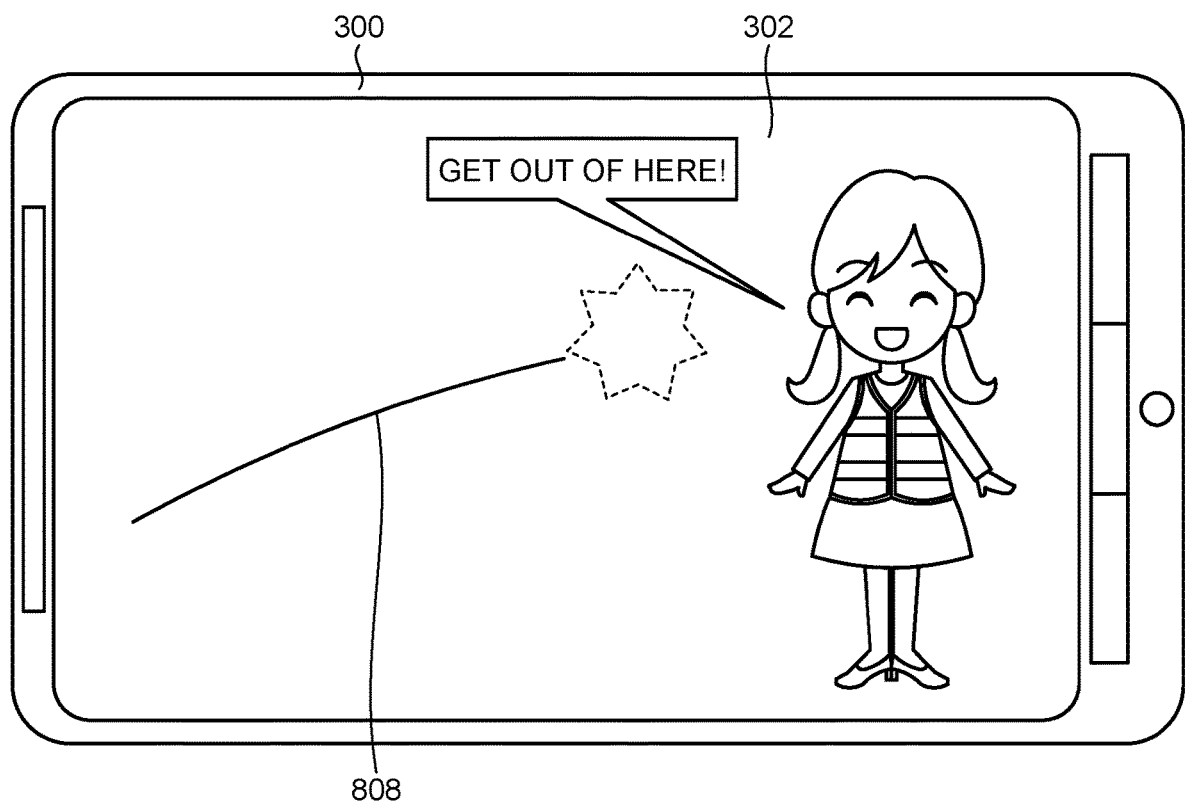
FIG. 31 is an explanatory diagram (No. 1) for explaining a display example according to a modification example to the sixth embodiment of the present disclosure.

The server 200c according to the modification example is described above. Next, an information processing method according to the modification example is described with reference to FIGS. 30 and 31. FIG. 30 is a flowchart of an example of an information processing method according to a modification example to the embodiment, and FIG. 31 is an explanatory diagram for explaining a display example according to the modification example to the embodiment. As illustrated in FIG. 30, the information processing method according to the modification example includes a plurality of steps from Step S301 to Step S308. The details of the steps included in the information processing method according to the modification example are described below.

First, the server 200c performs the processing from Step S301 to Step S304, which is similar to Step S101 to Step S104 in the first embodiment illustrated in FIG. 8, and thus the description thereof is omitted here.

Next, the server 200c displays, on the display unit 302 of the user terminal 300 and the display unit (not illustrated) of the monitor 110, an icon of a coin and the trajectory 808 along which the icon moves from the viewer 600 side to the artist 602 as illustrated in FIG. 31, for example, in augmented reality (AR) (Step S305). Note that, in the modification example, the viewer 600 can set the trajectory 808 and a speed at which the trajectory 808 is displayed before throwing the stamp 700 with tactile stimulus effect, or can modify the same after the display. Furthermore, in the modification example, a predetermined sound may be outputted from a speaker (not illustrated) or the like of the user terminal 300 or the monitor 110 at the time of AR display.

Then, the artist 602 visually recognizes the trajectory 808 displayed on the display unit (not illustrated) or the like of the monitor 110 and acts in response thereto (e.g., escaping from the fall position of the icon estimated from the trajectory 808, performing a touch operation on a predetermined terminal (e.g., the monitor 110), uttering a keyword, and so on). Next, the server 200c acquires sensing data regarding the action of the artist 602 (Step S306). For example, the escaping motion of the artist 602 can be detected by the camera 120, the touch operation can be detected by a touch panel (not illustrated) of the monitor 110, and the utterance of the artist 602 can be detected by a microphone (not illustrated) of the tactile presentation device 100.

Next, the server 200c determines whether or not to present a tactile stimulus in the tactile presentation device 100 on the basis of the sensing data acquired in Step S306 (Step S307). For example, the server 200c determines not to present the tactile stimulus in a case where the artist 602 performs an escaping operation at predetermined timing, in a case where the timing of the touch operation of the artist 602 is predetermined timing, or in a case where the utterance of the artist 602 is a predetermined keyword (e.g., get out of here, as illustrated in FIG. 31). Furthermore, in the modification example, in a case where a predetermined number of stamps 700 or more (or, control command 702) are simultaneously sent, a tactile stimulus may be presented even in a case where a predetermined motion of the artist 602 is detected. Furthermore, in the modification example, when the viewer 600 throws the stamp 700 with tactile stimulus effect, a desired keyword can be inputted or selected, and the keyword may be displayed on the monitor 110. In such a case, in a case where it is detected that the artist 602 has correctly uttered the keyword displayed on the monitor 110, the server 200c may determine not to present or to present the tactile stimulus. In this way, according to the modification example, the viewer 600 can not only have a unidirectional experience such as watching the performance of the artist 602, but can also have a real-time, interactive, and higher value-added experience such as interacting with the artist 602.

Then, the server 200c performs the processing of Step S308, which is similar to Step S106 in the first embodiment illustrated in FIG. 8, and thus the description thereof is omitted here.

In the modification example, not only viewers 600 but also the artist 602 can play a kind of virtual game such as a dodgeball-like game, throwing the stamps 700 each other and avoiding the thrown stamps 700. As a result, the viewer 600 can feel as if he/she directly interacts with the artist 602 in a thrilling manner, and can obtain a higher value-added experience.

Note that the modification example is not limited to not presenting the tactile stimulus in a case where the predetermined motion of the artist 602 is detected, and the intensity or the like of the tactile stimulus may be changed in a case where the predetermined motion of the artist 602 is detected. Furthermore, in a case where no tactile stimulus is presented, a predetermined sound (e.g., an extinction sound or the like) may be outputted via the user terminal 300, or the user terminal 300 may be vibrated. Furthermore, in the modification example, the server 200c may determine whether or not to present a tactile stimulus according to a combination of the type of the stamp 700, the attribute information of the artist 602, the attribute information of the viewer 600, and the like.

7.4 Modification Example 2

Figure 32:
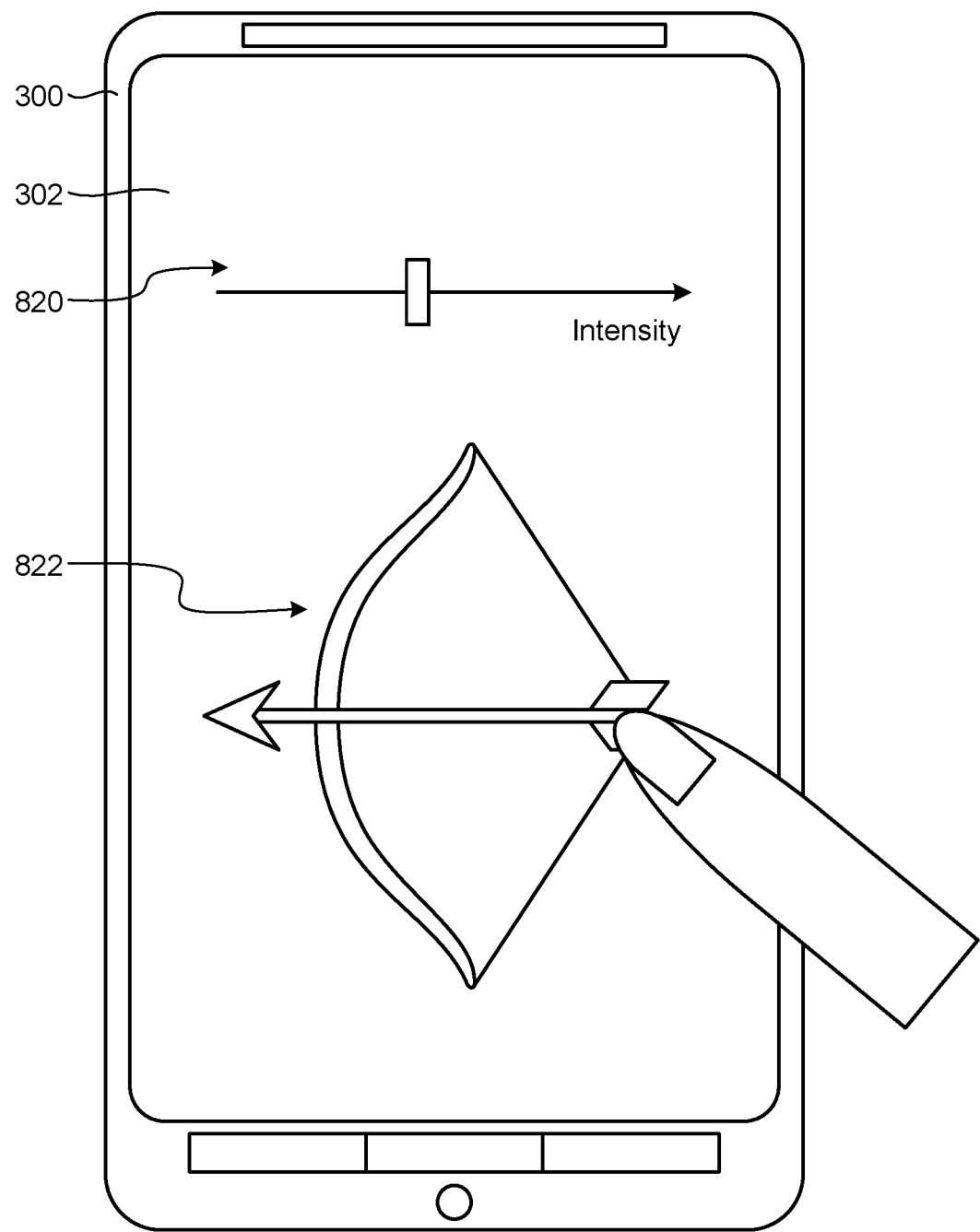
FIG. 32 is an explanatory diagram (No. 2) for explaining a display example according to a modification example to the sixth embodiment of the present disclosure.

Furthermore, the game element may be further enhanced by a configuration in which when the viewer 600 throws the stamp 700 with tactile stimulus effect, the content of the stamp 700 to be thrown may be determined in consideration of chance and skill. Such a modification example is described with reference to FIG. 32. FIG. 32 is an explanatory diagram for explaining a display example according to the modification example to the embodiment.

In the modification example, for example, it is assumed that the intensity of the tactile stimulus is determined by a value of a level meter when the stamp 700 with tactile stimulus effect is thrown. Specifically, as illustrated in FIG. 32, an animation of a cursor 820 for designating the intensity of the tactile stimulus is displayed on the display unit 302 of the user terminal 300. In the animation, it is assumed that the cursor 820 always moves left and right. Furthermore, an icon 822 such as a bow and arrow is displayed on the display unit 302, for example. The viewer 600 can throw the stamp 700 by swiping the icon 822 and releasing the fingertip from the screen. The viewer side input unit 214 of the server 200*c* then acquires the intensity corresponding to the position of the cursor 820 when the release operation is performed as the intensity of the tactile stimulus related to the thrown stamp 700.

In the modification example, the intensity to be set is determined by chance because the cursor 820 is always moving left and right. In addition, in order to set the intensity to a desired level, the viewer 600 needs to carefully perform operation on the icon 822 based on the movement of the cursor 820, which requires skill. Therefore, in a case where the viewer 600 cannot set the intensity to the desired level, for example, the viewer 600 throws the stamp 700 over and over again until the desired intensity can be set. That is, since the modification example provides a game with both skill and chance, it is possible to provide the viewer 600 with a more entertaining experience.

Note that the modification example is not limited to the operation on the icon 822, and for example, the intensity of the tactile stimulus or the like may be set according to the speed of the motion operation, by the viewer 600, for changing the held angle of the user terminal 300, and the present disclosure is not particularly limited to this example. Furthermore, in the modification example, the cursor 820 is not limited to an animation, and may be a cursor 820 that can be moved in response to the operation by the viewer 600. In such a case, the viewer side input unit 214 of the server 200*c* acquires the intensity corresponding to the position to which the cursor 820 has been moved in response to the operation of the viewer 600 as the intensity of the tactile stimulus related to the thrown stamp 700.

7.5 Modification Example 3

In the embodiments and modification examples of the present disclosure, there is sometimes a noise due to vibrations of the tactile stimulus unit 106 of the tactile presentation device 100 in a microphone (not illustrated) provided on a shoulder part of the tactile presentation device 100. In view of this, a modification example for canceling a noise due to vibrations of the tactile stimulus unit 106 in the microphone is described below.

Specifically, the server 200 predicts a noise according to a waveform given to the tactile stimulus unit 106. For example, the server 200 can predict a noise by referring to a database (DB) (not illustrated) obtained by applying various waveforms to the tactile stimulus unit 106 in advance and machine learning the generated noise. The server 200 then can avoid deterioration of a sound due to the noise by canceling the predicted noise from the sound collected by the microphone (not illustrated) provided on the shoulder part of the tactile presentation device 100.

Note that, in the modification example, the server 200 may adjust a waveform to be canceled in accordance with a distance between the microphone (not illustrated) provided on the shoulder part of the tactile presentation device 100 and the tactile stimulus unit 106. Furthermore, in a case where the artist 602 is performing in a studio for example, the microphone may collect a noise that is reflected on a wall of the studio. In such a case, the server 200 may adjust the waveform to be canceled in accordance with a distance between the wall and the microphone provided on the shoulder part of the tactile presentation device 100.

Furthermore, in the modification example, as a means for canceling the noise caused by vibrations of the tactile stimulus unit 106, the microphone (not illustrated) may be made directional so that the microphone intensively collects the sound of the artist 602, or a frequency region where the microphone can collect a sound may be limited to avoid collecting the noise caused by vibrations of the tactile stimulus unit 106.

8. Modification Example to Information Processing System 10 of Present Disclosure Furthermore, a modification example to the information processing system 10 according to the embodiment of the present disclosure is described with reference to FIGS. 33 to 38. FIGS. 33 to 38 are system diagrams illustrating an example of the schematic configuration of the information processing system 10 according to a modification example to the embodiment of the present disclosure.

Figure 33:
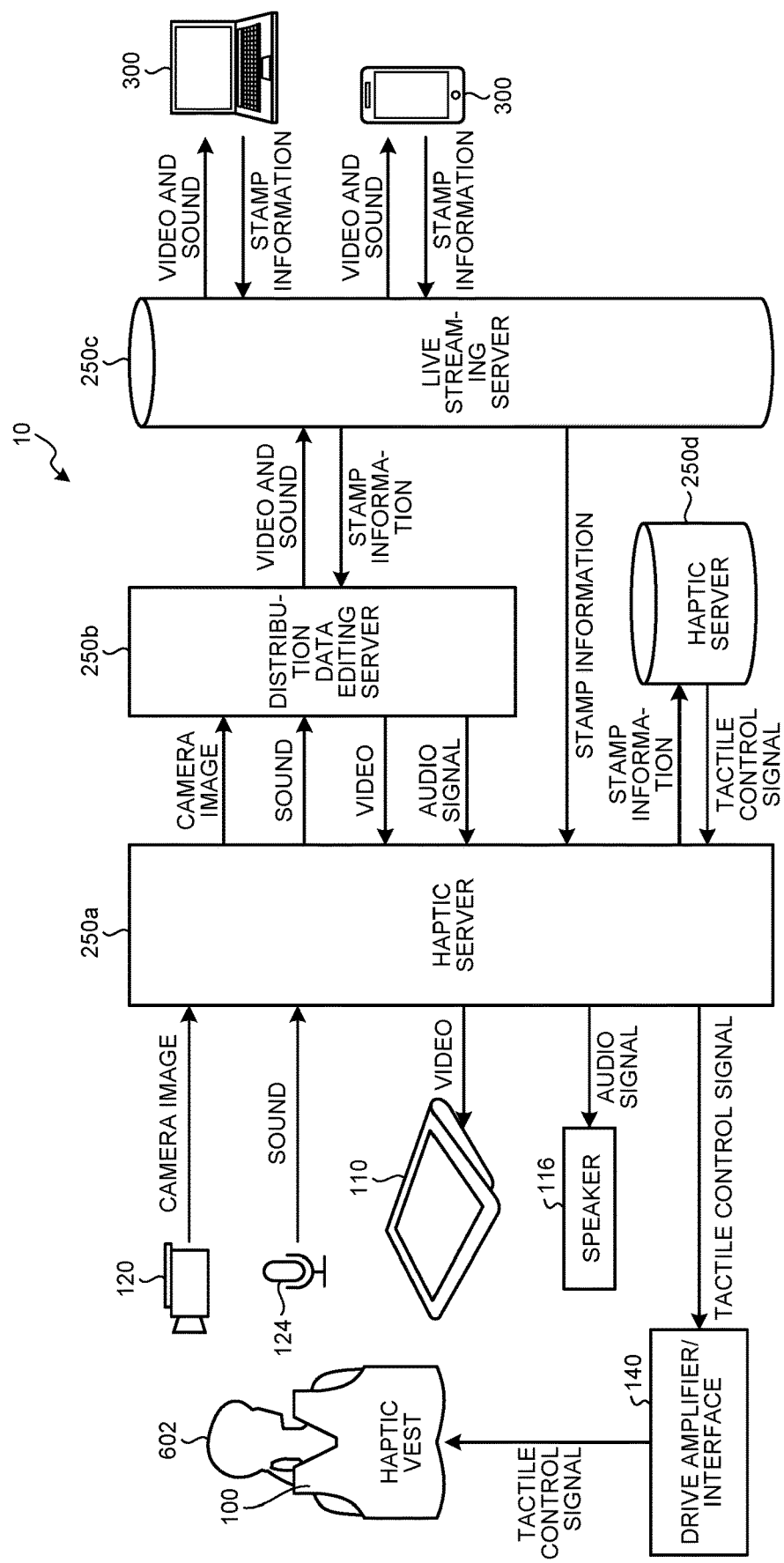
FIG. 33 is a system diagram (No. 1) illustrating an example of a schematic configuration of an information processing system 10 according to a modification example to an embodiment of the present disclosure.

First, in the information processing system 10 illustrated in FIG. 33, the server 200 illustrated in FIG. 3 is implemented by a haptic server 250*a*, a distribution data editing server 250*b*, a live streaming server 250*c*, and a haptic server 250*d*.

Specifically, as illustrated in FIG. 33, in the information processing system 10 according to the embodiment, for example, the tactile presentation device (haptic vest) 100, a drive amplifier/interface 140, a speaker 116, the monitor 110, a microphone 124, and the camera 120 are arranged on the artist 602 side. Furthermore, in the information processing system 10, for example, the haptic server (information processing device) 250*a*, the distribution data editing server 250*b*, the live streaming server (another information processing device) 250*c*, and the haptic server 250*d* are placed between the artist 602 side and the viewer 600 side. Furthermore, in the information processing system 10, a smartphone or a tablet terminal as an example of the user terminal 300 is placed on the viewer 600 side. The individual devices included in the information processing system 10 can send and receive data via various communication networks, such as a wired/wireless local area network (LAN), Wi-Fi (registered trademark), Bluetooth (registered trademark), a mobile communication network (long term evolution (LTE), and 5G (5th generation mobile communication system). Note that the number of devices included in the information processing system 10 is not limited to the number illustrated in FIG. 33, and may be further greater. Furthermore, the information processing system 10 may include a device that is not illustrated in FIG. 33. For example, the information processing system 10 may include a general-purpose personal computer (PC), a game machine, a cell phone, a portable media player, a speaker, a projector, a display (digital signage, etc.), a wearable device such as headphones, smart glasses, or a smart watch.

Note that, in the information processing system 10 illustrated in FIG. 33, for example, the haptic server 250*a* that manages presentation of a tactile stimulus may be operated by a business operator different from a business operator of the distribution data editing server 250*b* with a built-in application for editing video and sound to be distributed to the viewer 600 and the live streaming server 250*c* that manages distribution to the viewer 600. The following is a brief description of the drive amplifier/interface 140, the monitor 110, the camera 120, the haptic server 250*a*, the distribution data editing server 250*b*, the live streaming server 250c, and the haptic server 250d included in the information processing system 10 according to the embodiment.

(Drive Amplifier/Interface 140)

The drive amplifier/interface 140 is an interface that sends and receives a tactile control signal between the tactile presentation device 100 and the haptic server 250a. For example, the drive amplifier/interface 140 acquires the profile information (functional information or the like) of the tactile presentation device 100 from the tactile presentation device 100, or converts and amplifies a tactile control signal generated by the haptic server 250a, and sends the signal to the tactile presentation device 100.

(Monitor 110)

The monitor 110 can display, for the artist 602, video of the artist 602 captured by the camera 120 described later for example, and the monitor 110 further can superimpose text, an icon, an animation, or the like on the image of the artist 602. The monitor 110 is implemented by, for example, a liquid crystal display (LCD) device and an organic light emitting diode (OLED) device. Furthermore, in the embodiment, a display unit (not illustrated) of the monitor 110 may be provided as a unit integrated with an input unit (not illustrated), and in such a case, the input unit is implemented by a touch panel superimposed on the display unit. Furthermore, in the embodiment, the monitor 110 may be provided with the speaker 116 for outputting a sound to the artist 602.

(Camera 120)

The camera 120 is one or more visible light cameras that capture images of the artist 602 from one or multiple viewpoints, and a video captured by the camera 120 is sent to the user terminal 300 of the viewer 600 via the haptic server 250a, the distribution data editing server 250b, and the live streaming server 250c. The camera 120 may capture an image of the surroundings of the artist 602 or a real object that is present around the artist 602. Specifically, the camera 120 includes a lens system having an image pickup lens, a diaphragm, a zoom lens, and a focus lens, and a drive system that causes the lens system to perform a focus operation and a zoom operation. The camera 120 also includes a solid-state imaging element array that photoelectrically converts imaging light captured by the lens system to generate an imaging signal. The solid-state imaging element array may be implemented by, for example, a charge coupled device (CCD) sensor array or a complementary metal oxide semiconductor (CMOS) sensor array.

(Haptic Server 250a)

The haptic server 250a can receive a stamp (control command) 700 with tactile stimulus effect inputted by the viewer 600 via the live streaming server 250c, generate a tactile control signal in accordance with the stamp 700, and send the generated tactile control signal to the tactile presentation device 100. Each stamp 700 with tactile stimulus effect is correlated with each predetermined control command 702, and each control command 702 includes information for designating a perceptual location where a vibration stimulus is to be presented (positional information), and information for designating a waveform type and intensity of the vibration stimulus for example (mode information). Furthermore, the control command 702 can include identification information (ID) for identifying a tactile stimulus unit (not illustrated) of the tactile presentation device 100 and the mode information. Specifically, the haptic server 250a generates a tactile control signal (waveform data) to be inputted to the individual tactile stimulus units 106 of the tactile presentation device 100 so as to present a vibration stimulus with the intensity and waveform designated in the control command 702 at the perceptual location designated therein, and sends the tactile control signal to the tactile presentation device 100.

(Distribution Data Editing Server 250b)

The distribution data editing server 250b can edit video by the camera 120 received via the haptic server 250a, and can edit a sound by the microphone 124 received via the haptic server 250a. The distribution data editing server 250b can further send the edited video and sound data to the user terminal 300 via the live streaming server 250c, and can output the edited video and sound data to the speaker 116 and the monitor 110 via the haptic server 250a. For example, the distribution data editing server 250b can generate video data for distribution by superimposing a video effect correlated with an image of the stamp 700 inputted by the viewer 600 or the stamp 700 on the image of the artist 602 captured by the camera 120.

(Live Streaming Server 250c)

The live streaming server 250c can distribute, to the user terminal 300, an image of the artist 602 or the like, an image for selecting a stamp 700 with tactile stimulus effect, or the like. For example, the live streaming server 250c can authenticate via a web application programming interface (web API) and monitor the stamp 700 with tactile stimulus effect sent by the viewer 600 and the like.

(Haptic Server 250d)

The haptic server 250d stores a tactile data library (vibration waveform pattern, and so on) generated in advance in correlation with the identification information (ID) of each stamp 700. Furthermore, the haptic server 250d may store, as the profile information of the tactile presentation device 100, for example, information such as the number of tactile stimulus units 106 of the tactile presentation device 100, the locations thereof, frequency characteristics, and maximum input voltage.

Furthermore, in the embodiment, the haptic server 250a, the distribution data editing server 250b, the live streaming server 250c, and the haptic server 250d may be implemented by a single device or a plurality of devices, and the present disclosure is not particularly limited to this example. The details are described later.

Figure 34:
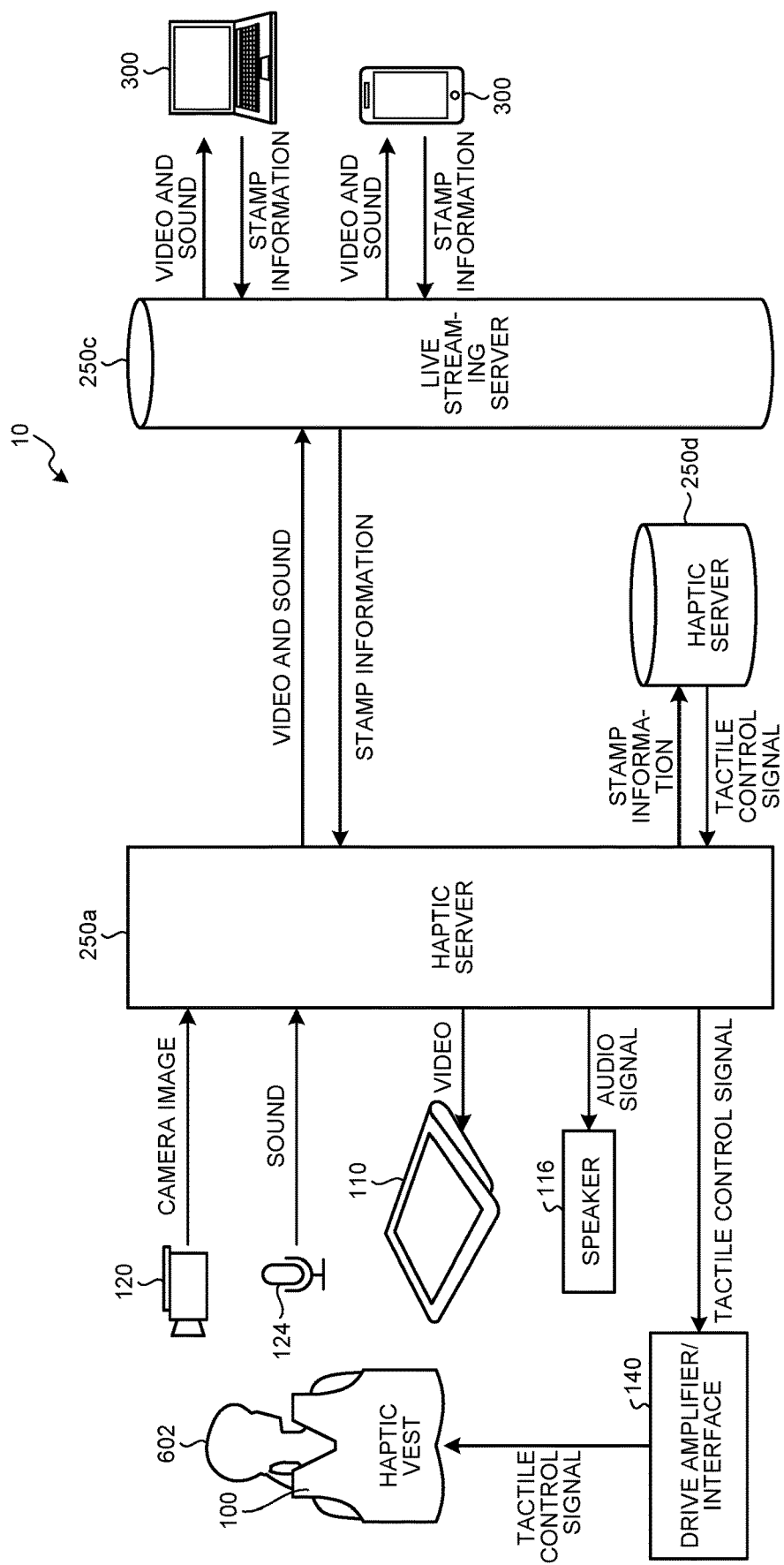
FIG. 34 is a system diagram (No. 2) illustrating an example of a schematic configuration of the information processing system 10 according to a modification example to an embodiment of the present disclosure.

Furthermore, in the information processing system 10 illustrated in FIG. 34, the haptic server 250a also has the function of the distribution data editing server 250b described above. In such a case, a business operator that manages presentation of tactile stimulus can be different from a business operator that manages distribution.

Figure 35:
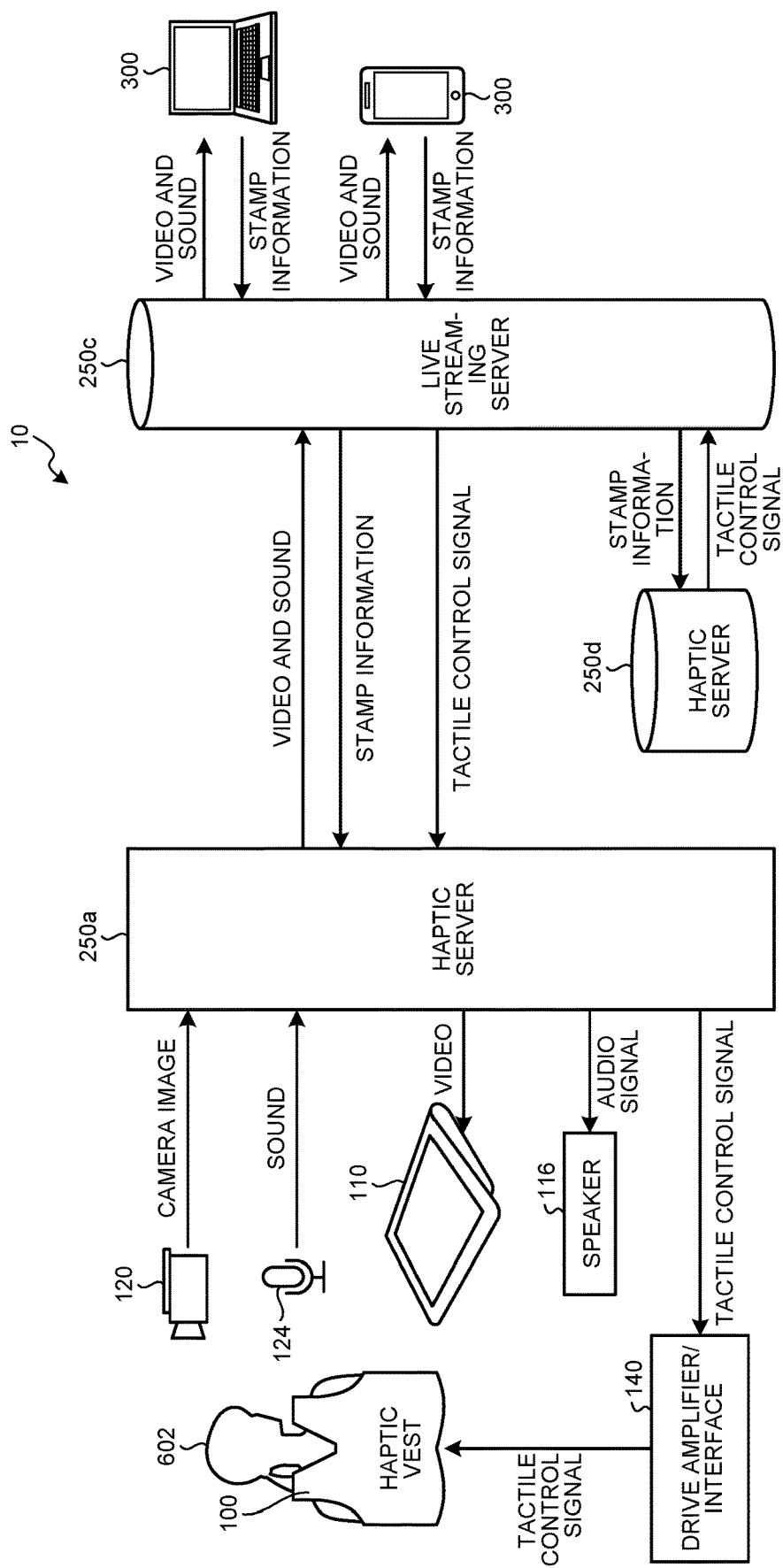
FIG. 35 is a system diagram (No. 3) illustrating an example of a schematic configuration of the information processing system 10 according to a modification example to an embodiment of the present disclosure.

Furthermore, in the information processing system 10 illustrated in FIG. 35, unlike the example of FIG. 34, the information stored in the haptic server 250d is provided to the haptic server 250a via the live streaming server 250c.

Figure 36:
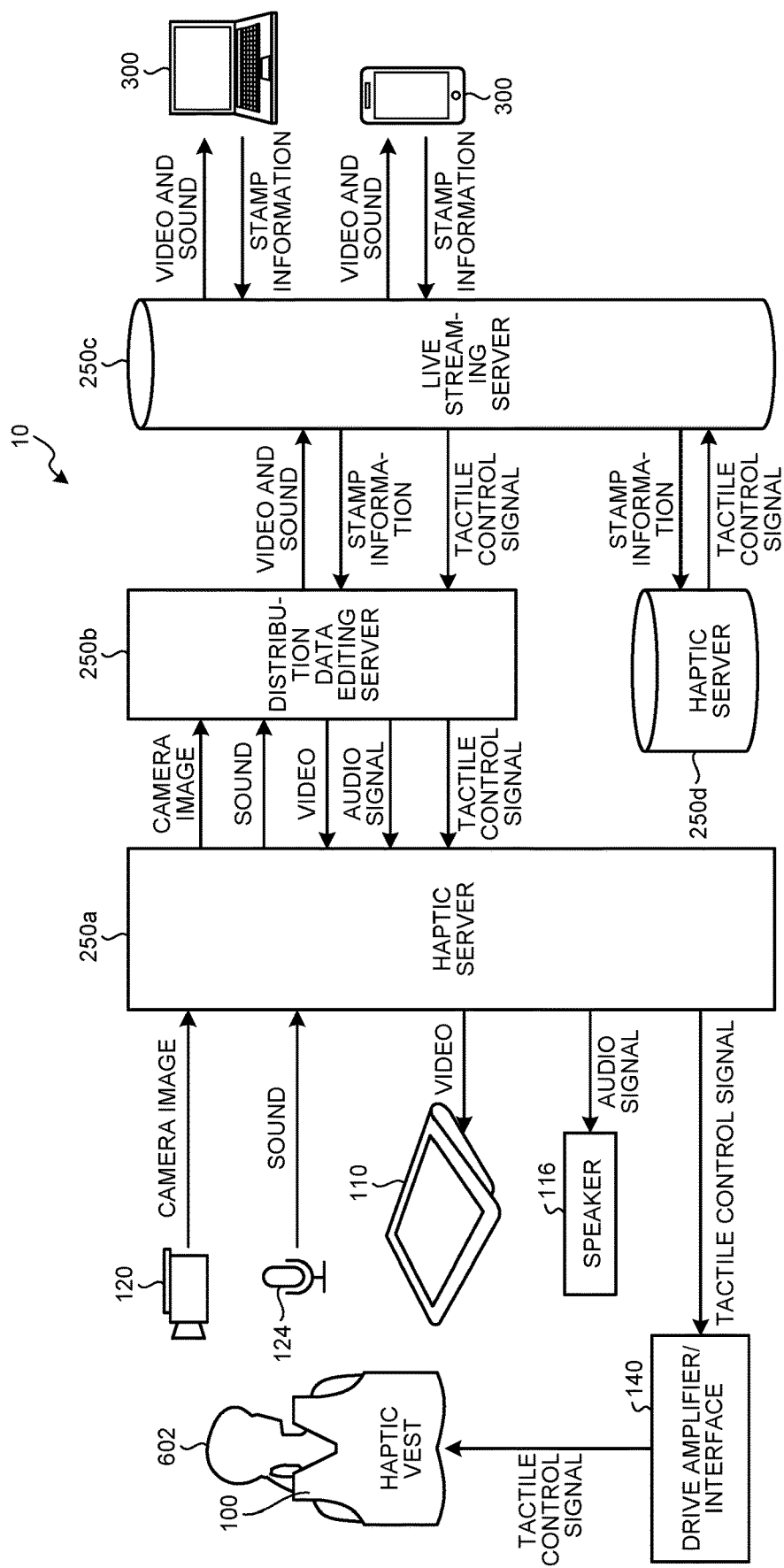
FIG. 36 is a system diagram (No. 4) illustrating an example of a schematic configuration of the information processing system 10 according to a modification example to an embodiment of the present disclosure.

Furthermore, in the information processing system 10 illustrated in FIG. 36, the information stored in the haptic server 250d is provided to the haptic server 250a via the live streaming server 250c and the distribution data editing server 250b.

Figure 37:
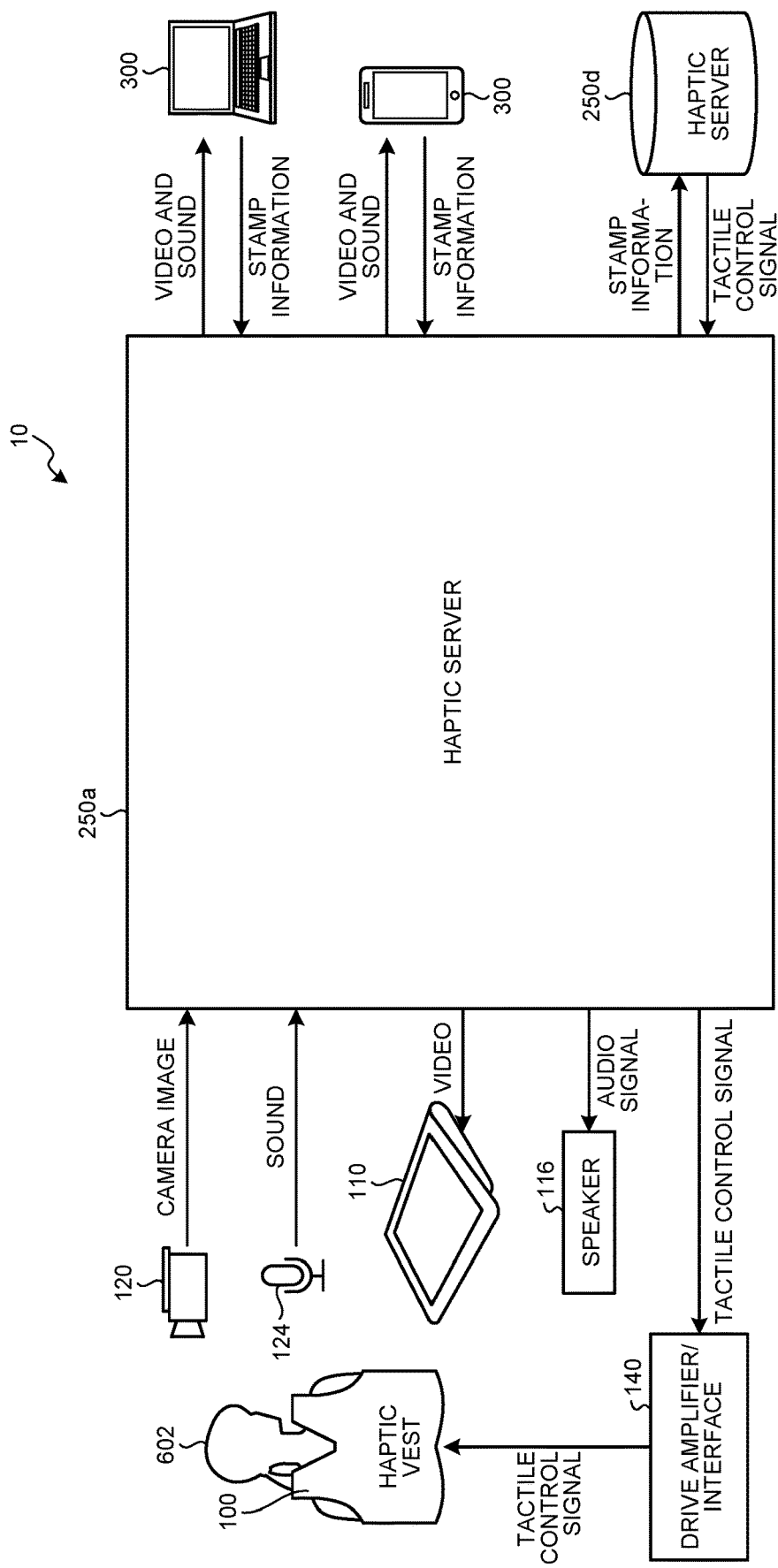
FIG. 37 is a system diagram (No. 5) illustrating an example of a schematic configuration of the information processing system 10 according to a modification example to an embodiment of the present disclosure.

Furthermore, in the information processing system 10 illustrated in FIG. 37, the haptic server 250a serving as the server 200 is provided with a haptic server 250d, external thereto, serving as a part of the function of the storage unit 240.

Figure 38:
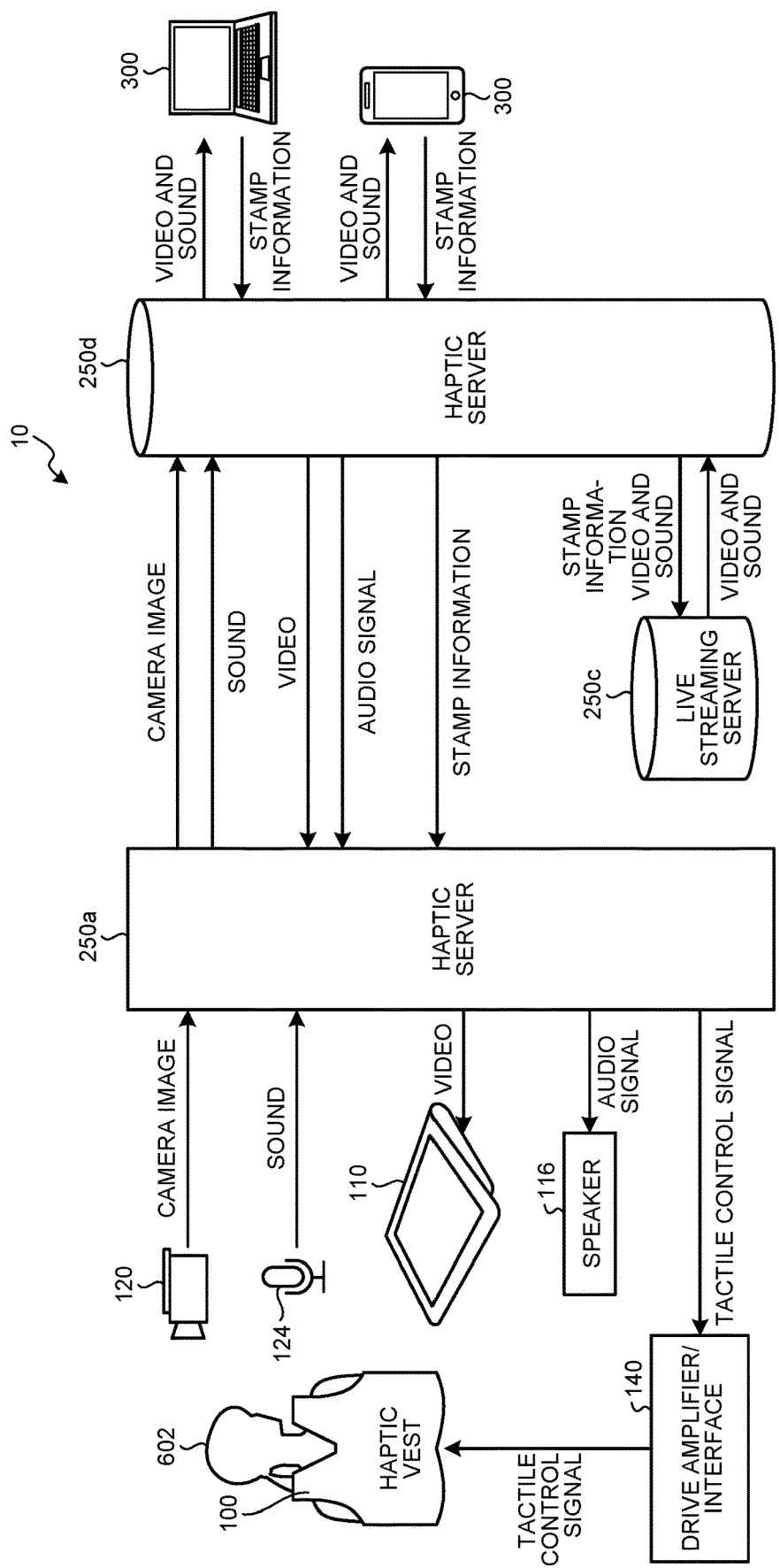
FIG. 38 is a system diagram (No. 6) illustrating an example of a schematic configuration of the information processing system 10 according to a modification example to an embodiment of the present disclosure.

Furthermore, in the information processing system 10 illustrated in FIG. 38, the haptic server 250d may cooperate with the live streaming server 250c for distribution to the user terminal 300.

9. Summary

As described above, in the embodiment of the present disclosure, a tactile stimulus corresponding to the stamp 700 with tactile stimulus effect selected by the viewer 600 can be presented to the artist 602. Therefore, in the embodiment, if the artist 602 perceives the presented tactile stimulus and takes action, then the viewer 600 can confirm, in real time, the action induced by the tactile stimulus presented by the stamp 700 that the viewer 600 has sent. Then, according to the embodiment, if the viewer 600 can confirm, in real time, the action induced by the tactile stimulus related to the stamp 700 that he/she has sent, then the viewer can feel as if he/she directly interacts with the artist 602, that is, the viewer 600 can obtain a real-time, interactive, and value-added experience.

The embodiment of the present disclosure is applicable not only to the live streaming or the like but also to, for example, the stamp 700 or the like exchanged on the SNS. In such a case, for example, instead of the tactile presentation device 100, the user terminal 300 can vibrate to provide a tactile stimulus to a person to whom the stamp 700 has been sent.

10. About Hardware Configuration

Figure 39:
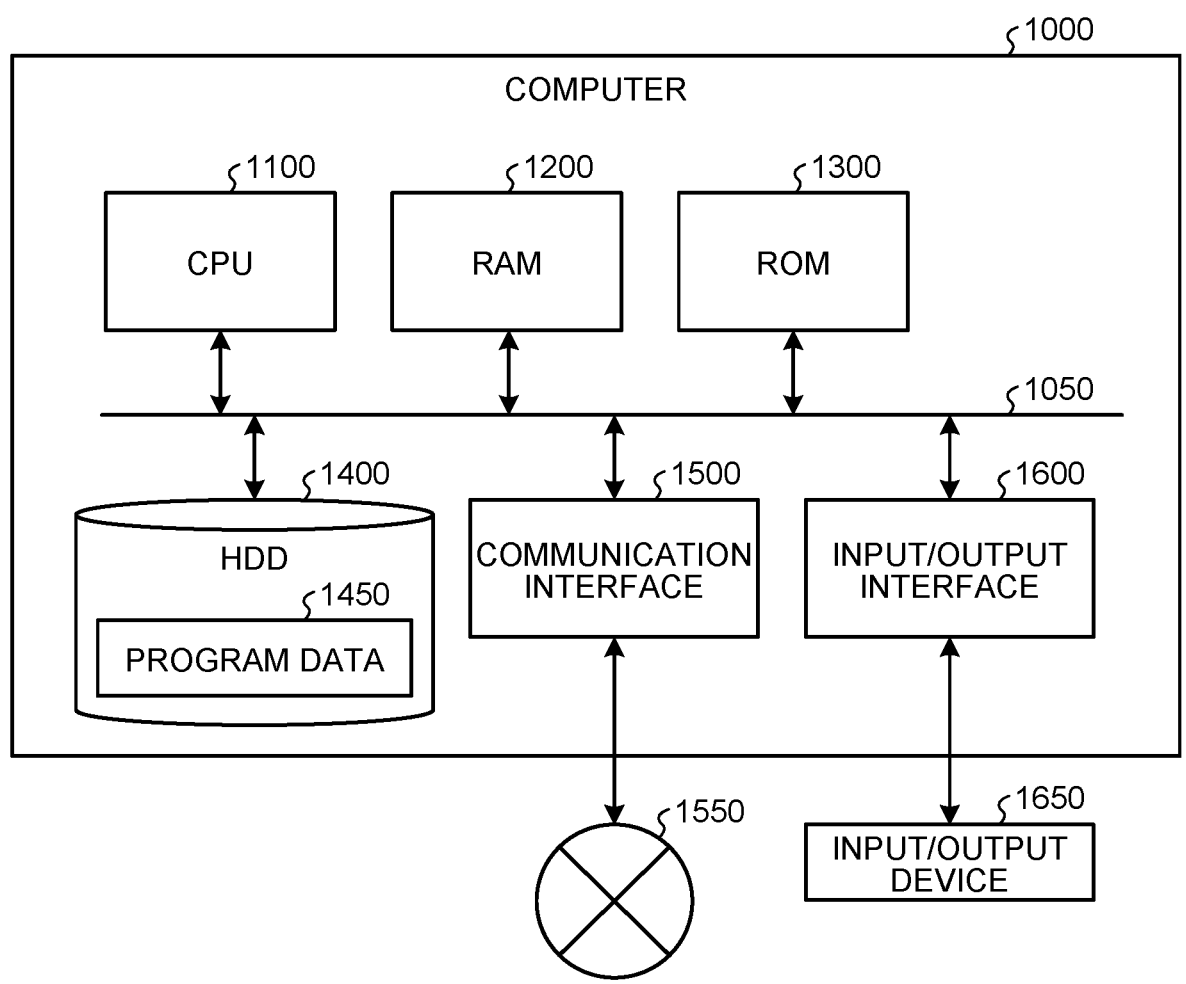
FIG. 39 is a hardware configuration diagram illustrating an example of a computer that implements the functions of the server 200.

The information processing device such as the server 200 according to the embodiments described above is implemented by a computer 1000 having a configuration as illustrated in FIG. 39, for example. The following describes an example of the server 200 according to the embodiments of the present disclosure. FIG. 39 is a diagram of the hardware configuration illustrating an example of a computer that implements the functions of the server 200. The computer 1000 includes a CPU 1100, RAM 1200, read only memory (ROM) 1300, a hard disk drive (HDD) 1400, a communication interface 1500, and an input/output interface 1600. The units of the computer 1000 are connected to one another by a bus 1050.

The CPU 1100 operates on the basis of a program stored in the ROM 1300 or the HDD 1400 to control the units. For example, the CPU 1100 expands a program stored in the ROM 1300 or the HDD 1400 into the RAM 1200, and executes processing corresponding to various programs.

The ROM 1300 stores a boot program such as a basic input output system (BIOS) executed by the CPU 1100 at the start of the computer 1000, a program that depends on the hardware of the computer 1000, and the like.

The HDD 1400 is a computer-readable recording medium that non-transiently records a program executed by the CPU 1100, data used by the program, and the like. Specifically, the HDD 1400 is a recording medium that records an information processing program, which is an example of the program data 1450, according to the present disclosure.

The communication interface 1500 is an interface for the computer 1000 to connect to an external network 1550 (for example, the Internet). For example, the CPU 1100 receives data from another device or sends data generated by the CPU 1100 to another device via the communication interface 1500.

The input/output interface 1600 is an interface for connecting an input/output device 1650 to the computer 1000. For example, the CPU 1100 receives data from an input device such as a keyboard and a mouse via the input/output interface 1600. The CPU 1100 also sends data to an output device such as a display or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the server 200 according to the embodiment of the present disclosure, the CPU 1100 of the computer 1000 executes an information processing program loaded onto the RAM 1200 to implement a function to generate a tactile control signal or the like. Furthermore, the HDD 1400 stores an information processing program and the like according to the embodiment of the present disclosure. Note that the CPU 1100 reads the program data 1450 out of the HDD 1400 for execution; however, as another example, the programs may be acquired from another device via the external network 1550.

Furthermore, the information processing device according to the embodiment may be applied to a system including a plurality of devices that are assumed to be connected to a network (or communication between devices), such as cloud computing. That is, the information processing device according to the embodiment described above can also be implemented as an information processing system that performs processing related to the information processing method according to the embodiment by a plurality of devices, for example.

11. Supplements

Furthermore, the embodiments described above may include, for example, a program for causing the computer to function as the information processing device according to the embodiment, and a non-transitory tangible medium on which the program is recorded. Furthermore, the program may be distributed via a communication line (including wireless communication) such as the Internet.

Furthermore, the steps in the processing of the embodiments may not necessarily be processed in the described order. For example, the steps may be processed in a different order as appropriate. Furthermore, the steps may be partially processed in parallel or individually instead of being processed chronologically. Furthermore, the processing method of the steps does not necessarily have to be processed according to the method described, and may be processed in another way by another functional block, for example.

Although the preferred embodiments of the present disclosure have been described above with reference to the accompanying drawings, the technical scope of the present disclosure is not limited to the above examples. It is obvious that a person skilled in the art may find various alterations and modifications within the scope of the appended claims, and it should be understood that they will naturally come under the technical scope of the present disclosure.

Furthermore, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An information processing device comprising:
  a first acquisition unit configured to acquire a control command, inputted by a first user, including positional information for designating a presentation position at which to present a tactile stimulus by a tactile presentation device and mode information for designating a mode of the tactile stimulus;

a generation unit configured to generate a tactile control signal for presenting the tactile stimulus to the presentation position in response to the control command; and a first distribution unit configured to distribute the tactile control signal to the tactile presentation device worn on a body of a second user; wherein the first distribution unit distributes, according to a predetermined rule, the tactile control signal related to the control command inputted by each of a plurality of the first users to the tactile presentation device.

(2) The information processing device according to (1), wherein the first distribution unit distributes the tactile control signal related to the control command inputted by each of the plurality of the first users in an input order of the control commands.

(3) The information processing device according to (1), wherein the first distribution unit distributes the tactile control signal related to the control command inputted by each of the plurality of the first users in an order according to an amount paid at a time when each of the control commands is inputted.

(4) The information processing device according to any one of (1) to (3), wherein the generation unit generates the tactile control signal including a signal for instructing at least one of a presentation timing, frequency, interval, waveform, presentation time, and intensity of the tactile stimulus on a basis of the mode information.

(5) The information processing device according to (4), wherein the generation unit adjusts an intensity of the tactile stimulus according to a number of the control commands acquired within a predetermined time.

(6) The information processing device according to (4), wherein the generation unit adjusts a time for presenting the tactile stimulus according to a number of the control commands acquired within a predetermined time.

(7) The information processing device according to (4), wherein the generation unit adjusts a location at which the tactile stimulus is to be perceived according to the positional information designated in a plurality of the control commands acquired within a predetermined time.

(8) An information processing device comprising:

a first acquisition unit configured to acquire a control command, inputted by a first user, including positional information for designating a presentation position at which to present a tactile stimulus by a tactile presentation device and mode information for designating a mode of the tactile stimulus;

a generation unit configured to generate a tactile control signal for presenting the tactile stimulus to the presentation position in response to the control command; and a first distribution unit configured to distribute the tactile control signal to the tactile presentation device worn on a body of a second user; wherein the first distribution unit distributes the tactile control signal to the tactile presentation device in a case where the control command acquired satisfies a predetermined condition.

(9) The information processing device according to (8), wherein the first acquisition unit acquires the control command including the positional information corresponding to a location away, by a predetermined distance, from a location at which the tactile stimulus is to be perceived designated in the control command acquired immediately before.

(10) The information processing device according to (8), wherein the first distribution unit distributes the tactile control signal to the tactile presentation device in a case where a number of the control commands acquired exceeds a predetermined number.

(11) The information processing device according to (8), wherein the first distribution unit distributes the tactile control signal to the tactile presentation device in a case where a predetermined time is reached.

(12) The information processing device according to (8), wherein the first distribution unit distributes the tactile control signal to the tactile presentation device in a case where a type of the plurality of control commands acquired is a predetermined type.

(13) The information processing device according to (1), wherein the tactile control signal corresponds to a predetermined image that is superimposed on an image of a real space distributed for the first user and generated on a basis of the input.

(14) The information processing device according to (13), wherein the predetermined image and the image of the real space are distributed from a different information processing device capable of communicating with a display device that displays an image for the first user to the display device.

(15) The information processing device according to (14), wherein the different information processing device acquires the control command according to an input of the first user.

(16) The information processing device according to (1), further comprising a second acquisition unit configured to acquire, according to an input from the first user, a predetermined image that is superimposed on an image of a real space in synchronization with presentation of the tactile stimulus, a third acquisition unit configured to acquire the image of the real space, and a second distribution unit configured to distribute the predetermined image and the image of the real space to a display device that displays an image for the first user.

(17) An information processing terminal comprising:

an input unit configured to receive an input of a control command including positional information for designating a presentation position at which to present a tactile stimulus by a tactile presentation device and mode information for designating a mode of the tactile stimulus; and a transmission unit configured to send the control command inputted to an information processing device that generates a tactile control signal according to the control command and distributes the tactile control signal to the tactile presentation device.

REFERENCE SIGNS LIST

10 INFORMATION PROCESSING SYSTEM
100 TACTILE PRESENTATION DEVICE
102, 202, 308 COMMUNICATION UNIT
104, 210, 210a, 210b, 210c, 310 CONTROL UNIT
106 TACTILE STIMULUS UNIT
110 MONITOR
116, 306 SPEAKER
120, 322 CAMERA
124, 324 MICROPHONE
140 DRIVE AMPLIFIER/INTERFACE 200, 200a, 200b, 200c, 250a, 250b, 250c, 250d SERVER
212 GUI CONTROL UNIT
214 VIEWER SIDE INPUT UNIT
216 DISTRIBUTOR SIDE INPUT UNIT
218 GENERATION UNIT
220 DETERMINATION UNIT
222 OUTPUT CONTROL UNIT
224 PRICE DETERMINATION UNIT
226 SETTLEMENT UNIT
228 POINT GIVING UNIT
240, 240a, 312 STORAGE UNIT
242 VIEWER PROFILE
244 DISTRIBUTOR PROFILE
246 DISTRIBUTION DATA DB
248 PRICE DATA DB
300 USER TERMINAL
300a SMARTPHONE
300b TABLET TERMINAL
302 DISPLAY UNIT
304 OPERATION INPUT UNIT
320 SENSOR UNIT
326 GYRO SENSOR
328 ACCELERATION SENSOR
600 VIEWER
602 ARTIST
700 STAMP
702 CONTROL COMMAND
800 DISPLAY
802 AVATAR
804 NOTIFICATION
806, 822 ICON
808 TRAJECTORY
810 COMMENT
812 MODEL DISPLAY
814 REGION
816 MARKER
820, 824 CURSOR
826 WAVEFORM

The invention claimed is:

1. An information processing device comprising:
a first acquisition unit configured to acquire a control command, inputted by each first user of a plurality of first users, including positional information for designating a presentation position at which to present a tactile stimulus by a tactile presentation device and mode information for designating properties of the tactile stimulus;
a generation unit configured to generate a tactile control signal for presenting the tactile stimulus to the presentation position in response to the control command; and
a first distribution unit configured to distribute the tactile control signal to the tactile presentation device worn on a body of a second user, wherein
the first distribution unit distributes the tactile control signal related to the control command inputted by each first user of the plurality of the first users to the tactile presentation device in an input order according to an amount paid at a time when the control command is inputted, and
the first acquisition unit, the generation unit, and the first distribution unit are each implemented via at least one processor.

2. The information processing device according to claim 1, wherein the generation unit is further configured to generate the tactile control signal including a signal for instructing at least one of a presentation timing, frequency, interval, waveform, presentation time, or intensity of the tactile stimulus on a basis of the mode information.

3. The information processing device according to claim 2, wherein the generation unit is further configured to adjust an intensity of the tactile stimulus according to a number of the control commands acquired within a predetermined time.

4. The information processing device according to claim 2, wherein the generation unit is further configured to adjust a time for presenting the tactile stimulus according to a number of the control commands acquired within a predetermined time.

5. The information processing device according to claim 2, wherein the generation unit is further configured to adjust a location at which the tactile stimulus is to be perceived according to the positional information designated in a plurality of the control commands acquired within a predetermined time.

6. The information processing device according to claim 1, wherein the tactile control signal corresponds to a predetermined image that is superimposed on an image of a real space distributed for the first user and generated on a basis of the control command.

7. The information processing device according to claim 6, wherein
the predetermined image and the image of the real space are distributed from a different information processing device capable of communicating with a display device that displays an image for the first user to the display device.

8. The information processing device according to claim 7, wherein
the different information processing device acquires the control command according to an input of the first user.

9. The information processing device according to claim 1, further comprising
a second acquisition unit configured to acquire, according to an input from the first user, a predetermined image that is superimposed on an image of a real space in synchronization with presentation of the tactile stimulus,
a third acquisition unit configured to acquire the image of the real space, and
a second distribution unit configured to distribute the predetermined image and the image of the real space to a display device that displays an image for the first user, wherein
the second acquisition unit, the third acquisition unit, and the second distribution unit are each implemented via at least one processor.

10. The information processing device according to claim 1, wherein the first distribution unit sequentially distributes the tactile control signal related to the control command inputted by each first user of the plurality of the first users to the tactile presentation device in an input order corresponding to an order in which the control command is inputted by each user of the plurality of first users.

11. An information processing device comprising:
a first acquisition unit configured to acquire a control command, inputted by a first user, including positional information for designating a presentation position at which to present a tactile stimulus by a tactile presentation device and mode information for designating a mode of the tactile stimulus;
a generation unit configured to generate a tactile control signal for presenting the tactile stimulus to the presentation position in response to the control command; and a first distribution unit configured to distribute the tactile control signal to the tactile presentation device worn on a body of a second user, wherein the first distribution unit distributes the tactile control signal to the tactile presentation device based on a predetermined condition designated in the control command being satisfied, the first distribution unit distributes the tactile control signal to the tactile presentation device in a case where a type of the control command acquired is a predetermined type, and the first acquisition unit, the generation unit, and the first distribution unit are each implemented via at least one processor.

12. The information processing device according to claim 11, wherein the first acquisition unit is further configured to acquire the control command including the positional information corresponding to a location away, by a predetermined distance, from a location at which the tactile stimulus is to be perceived designated in the control command acquired immediately before.

13. The information processing device according to claim 11, wherein the first distribution unit is further configured to distribute the tactile control signal to the tactile presentation device in a case where a number of the control commands acquired exceeds a predetermined number.

14. The information processing device according to claim 11, wherein the first distribution unit is further configured to distribute the tactile control signal to the tactile presentation device in a case where a predetermined time is reached.

15. An information processing terminal comprising:

an input unit configured to receive an input of a control command including positional information for designating a presentation position at which to present a tactile stimulus by a tactile presentation device and mode information for designating properties of the tactile stimulus; and a transmission unit configured to send the control command to an information processing device that generates a tactile control signal according to the control command and distributes the tactile control signal to the tactile presentation device, wherein the tactile control signal related to the control command is distributed to the tactile presentation device based on a predetermined condition designated in the control command being satisfied, the tactile control signal is distributed to the tactile presentation device in a case where a type of the control command acquired is a predetermined type, and the input unit and the transmission unit are each implemented via at least one processor.

* * * * *